(12) United States Patent
Lindell

(10) Patent No.: US 6,571,596 B1
(45) Date of Patent: Jun. 3, 2003

(54) AUTOMATIC TWO-STATION ADIABATIC BLANK CUT-OFF AND PART FORMING SYSTEM

(76) Inventor: Lennart J. Lindell, 1859 Park Ave., Sycamore, IL (US) 60178

( * ) Notice: Subject to any disclaimer, the term of this patent is extended or adjusted under 35 U.S.C. 154(b) by 0 days.

(21) Appl. No.: 09/726,090

(22) Filed: Nov. 29, 2000

(51) Int. Cl.7 .............................................. B21D 28/00
(52) U.S. Cl. .................... 72/339; 72/361; 72/405.01; 72/427; 83/42; 83/170; 83/404
(58) Field of Search .................... 72/336, 337, 339, 72/361, 357, 405.01, 426, 427; 83/690, 167, 170, 42, 404; 470/95, 109, 154

(56) References Cited

U.S. PATENT DOCUMENTS

| | | | | |
|---|---|---|---|---|
| 1,150,479 A | * | 8/1915 | Swiker | 72/336 |
| 1,894,526 A | * | 1/1933 | Wilcox | 72/337 |
| 3,112,660 A | * | 12/1963 | Hoyt | 72/337 |
| 4,245,493 A | * | 1/1981 | Lindell | 72/436 |
| 4,317,354 A | * | 3/1982 | Wisebaker | 72/339 |
| 4,470,330 A | * | 9/1984 | Lindell | 83/179 |
| 4,823,577 A | * | 4/1989 | Kawashima et al. | 72/336 |
| 4,899,570 A | * | 2/1990 | Mills et al. | 72/364 |

* cited by examiner

*Primary Examiner*—Daniel C. Crane
(74) *Attorney, Agent, or Firm*—Leydig, Voit & Mayer, Ltd.

(57) ABSTRACT

A system for automatically producing formed parts from feedstock using two successive adiabatic processing stations, a first station performing adiabatic cut-off of blanks from the feedstock, and the second station performing adiabatic forming of the blanks into the formed parts. The first station operates cooperatively with a feedstock feeder assembly which feeds feedstock to the first station and also charges blanks produced at the first station into a transfer capsule of a transferer assembly. The first and second stations cooperatively operate with the blank transferer assembly which transfers in the transfer capsule blanks from the first to the second station. The second station includes means for positioning blanks relative to a forming cavity before blanks are adiabatically shaped to conform to the forming cavity and also means for ejecting formed parts from tooling that defines the forming cavity. The system includes automation means that synchronizes and sequences subassembly operations.

35 Claims, 51 Drawing Sheets

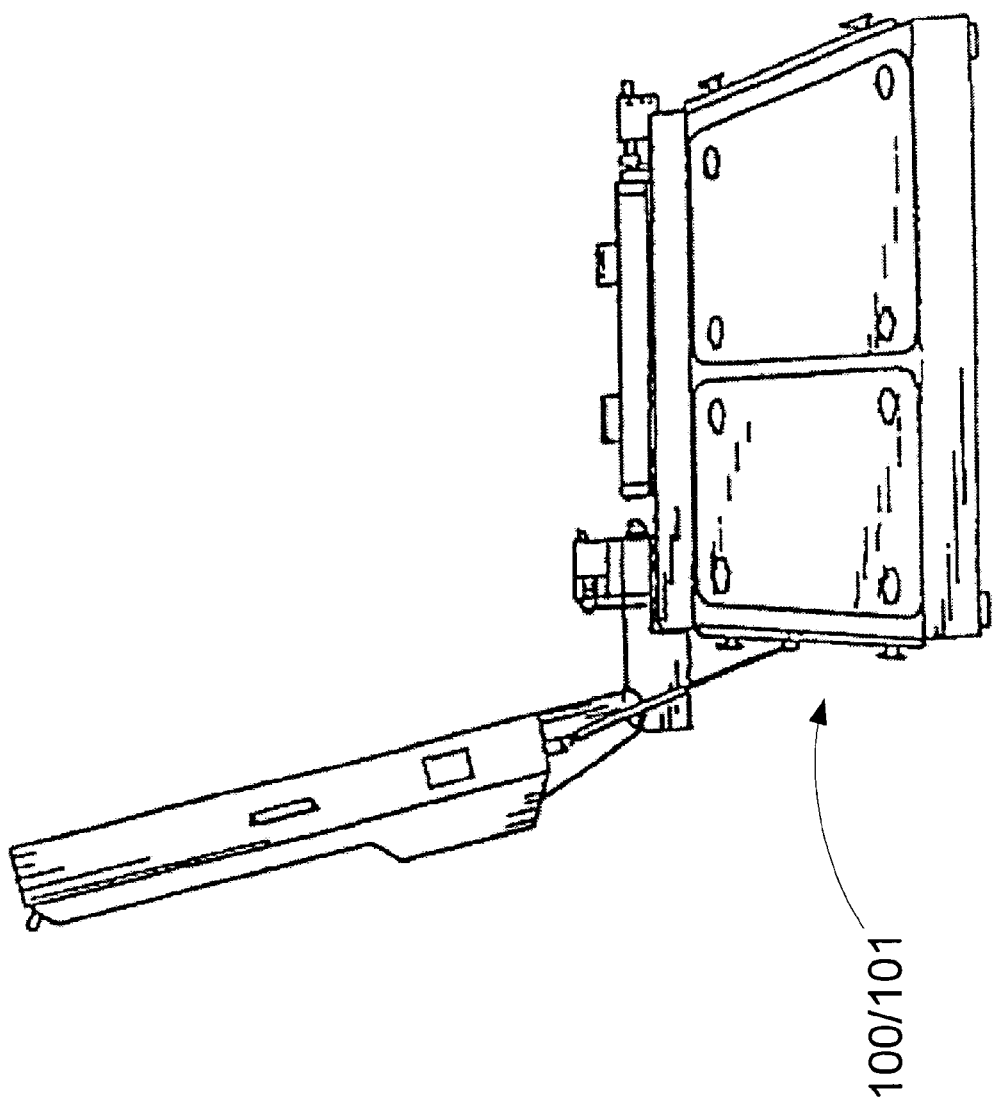

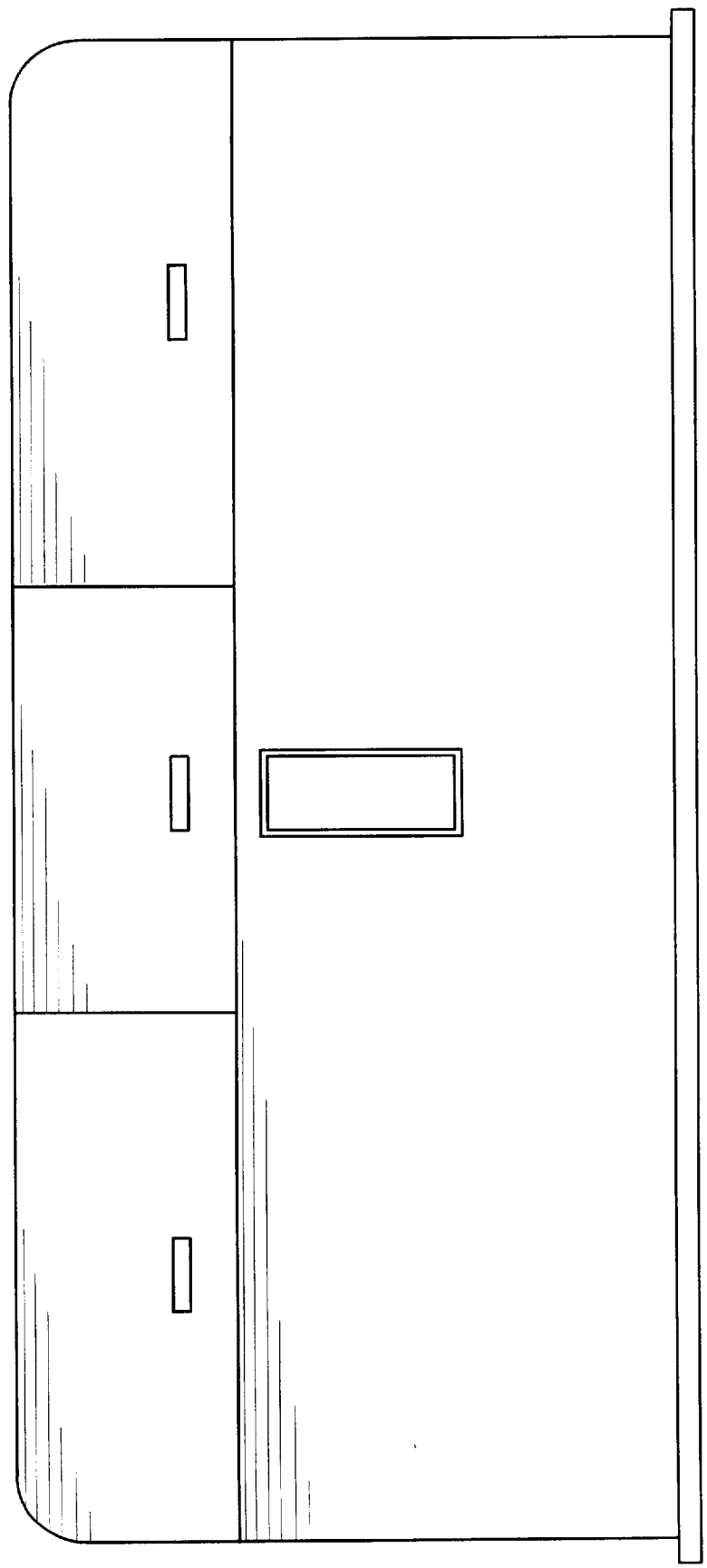

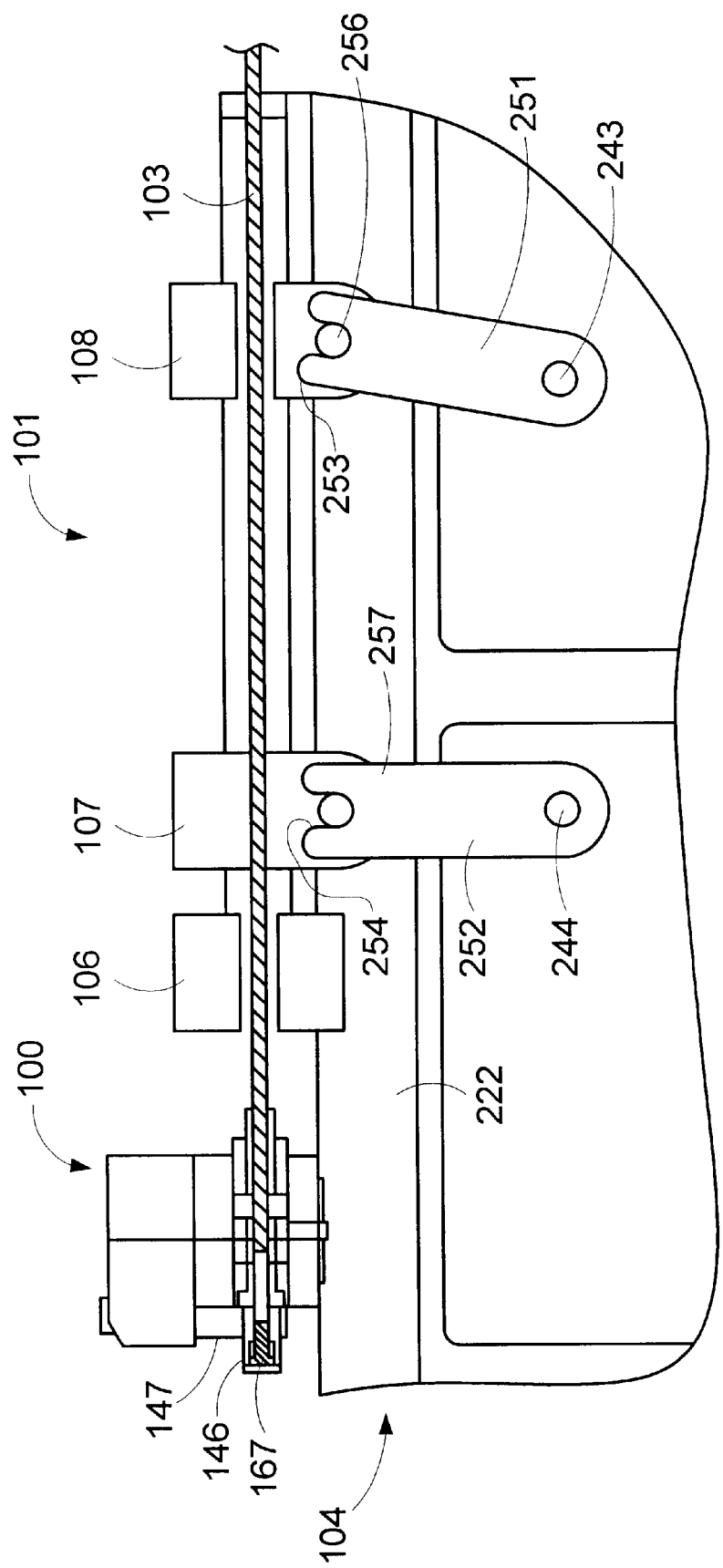

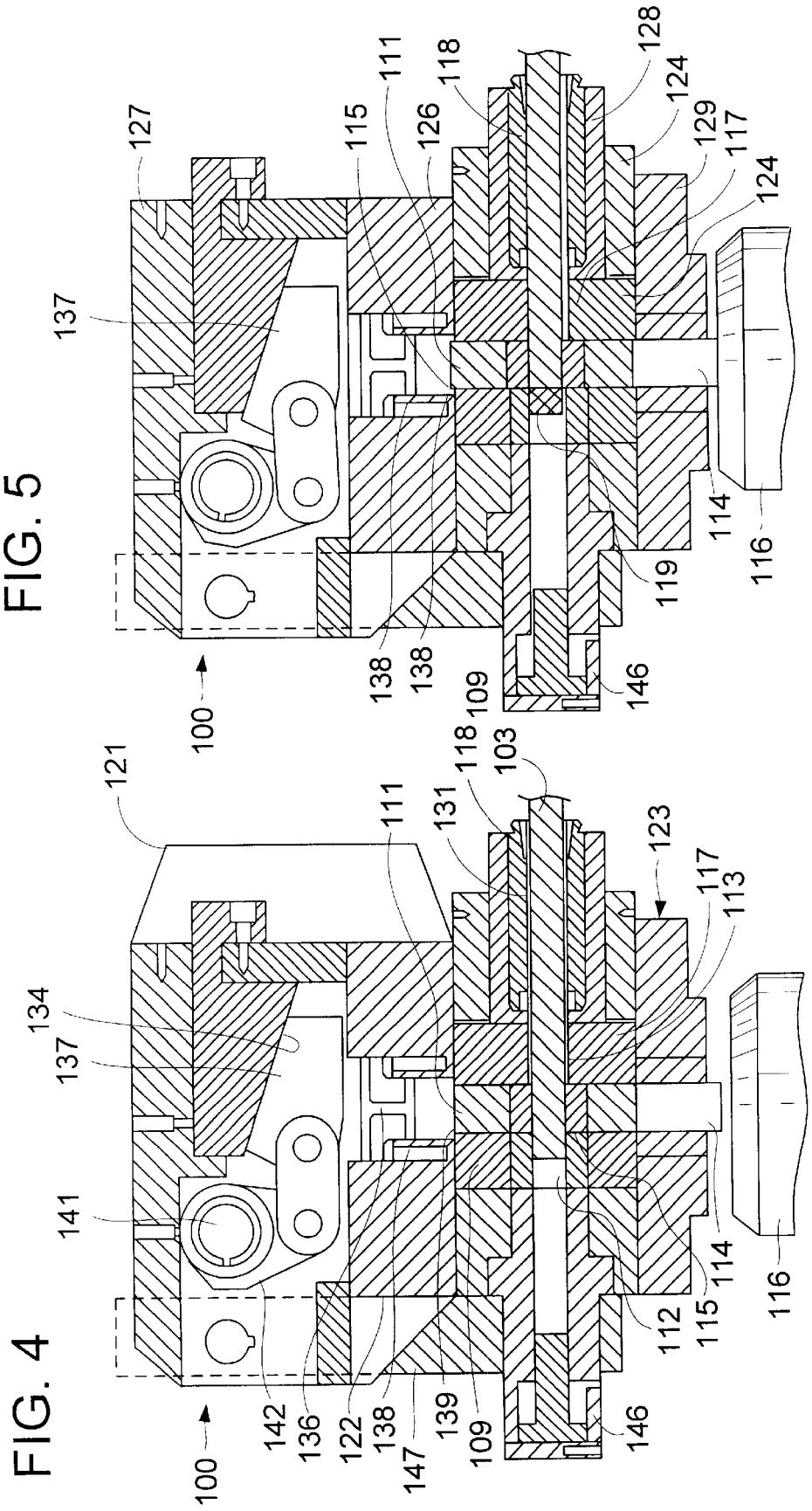

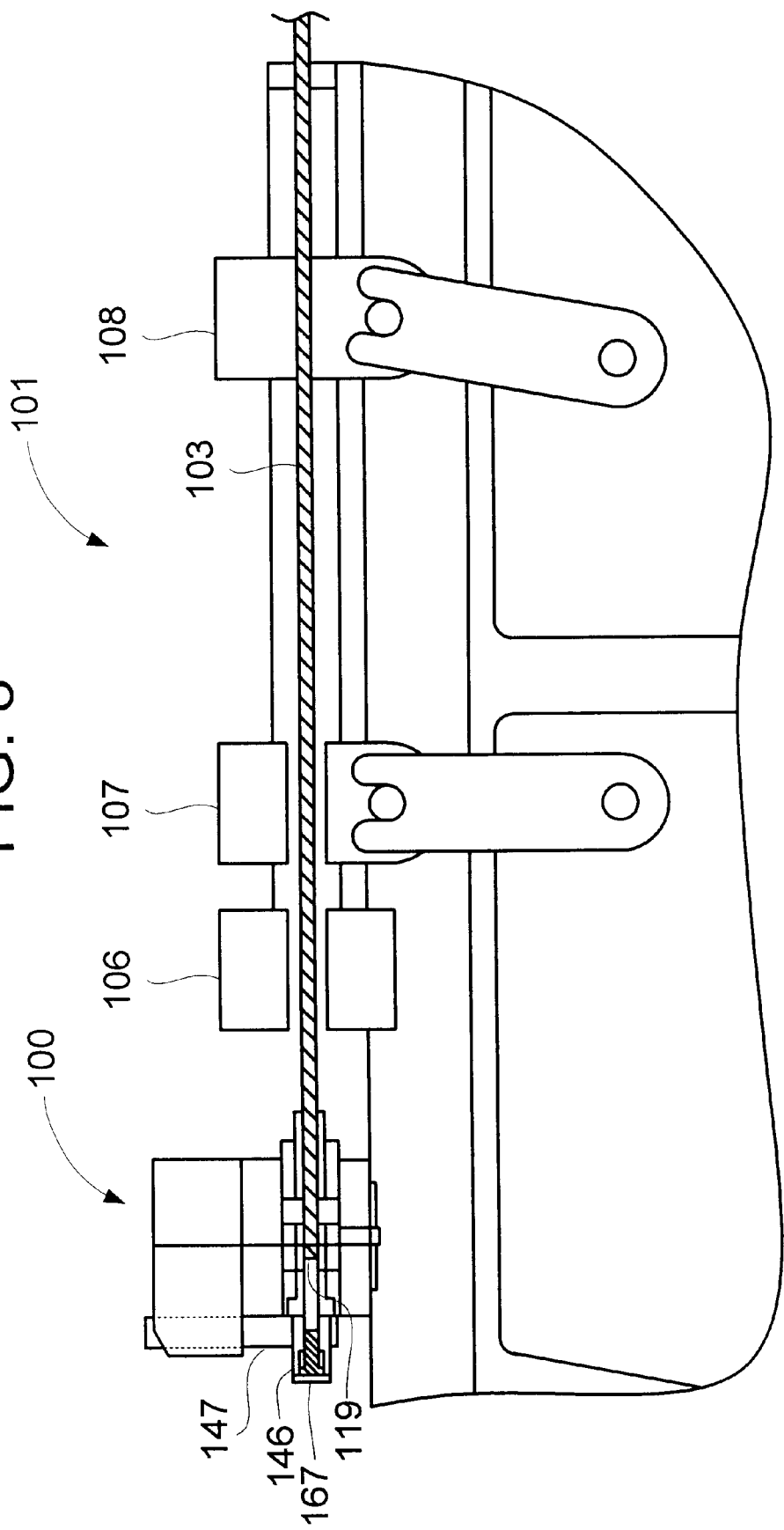

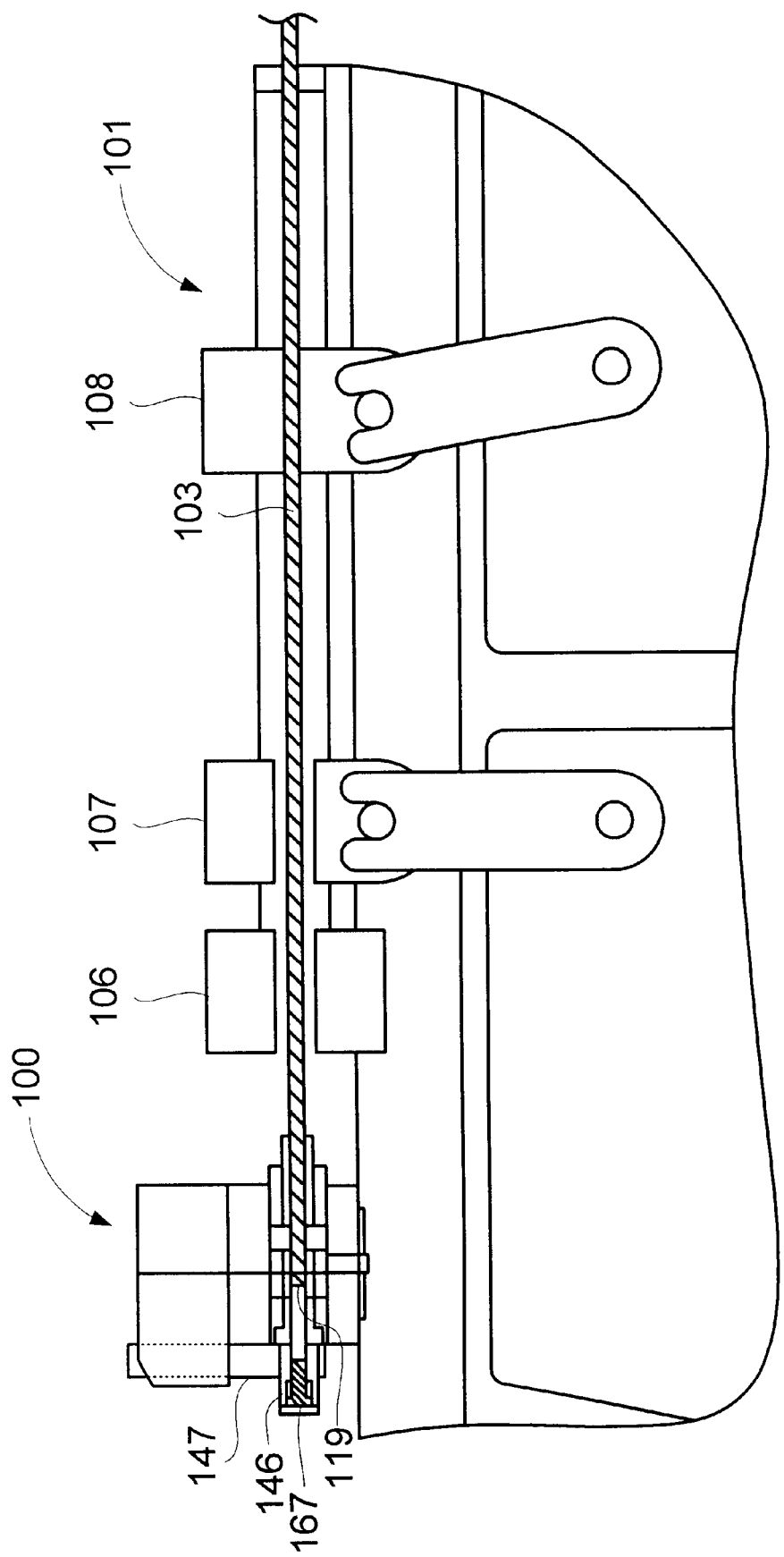

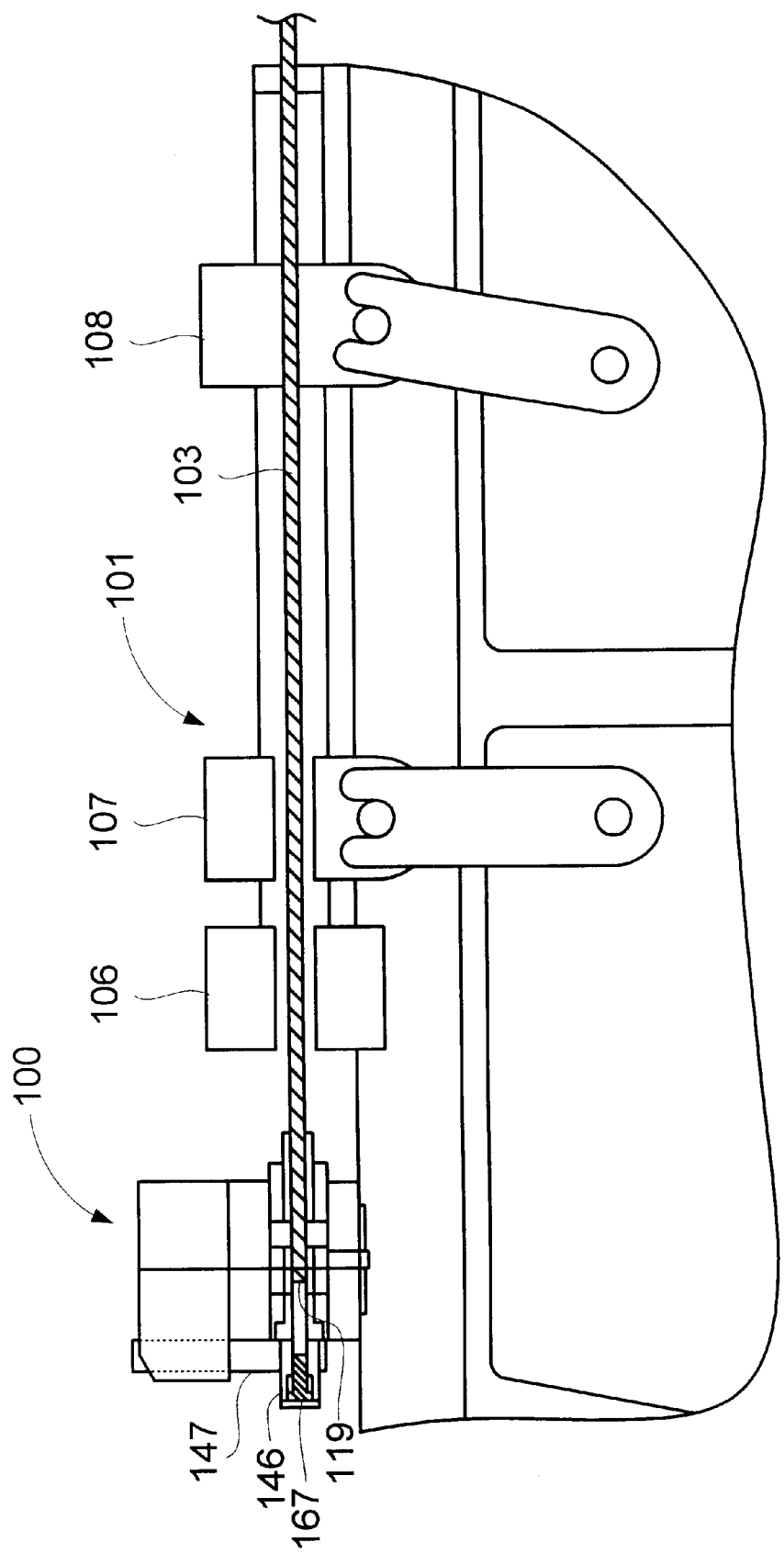

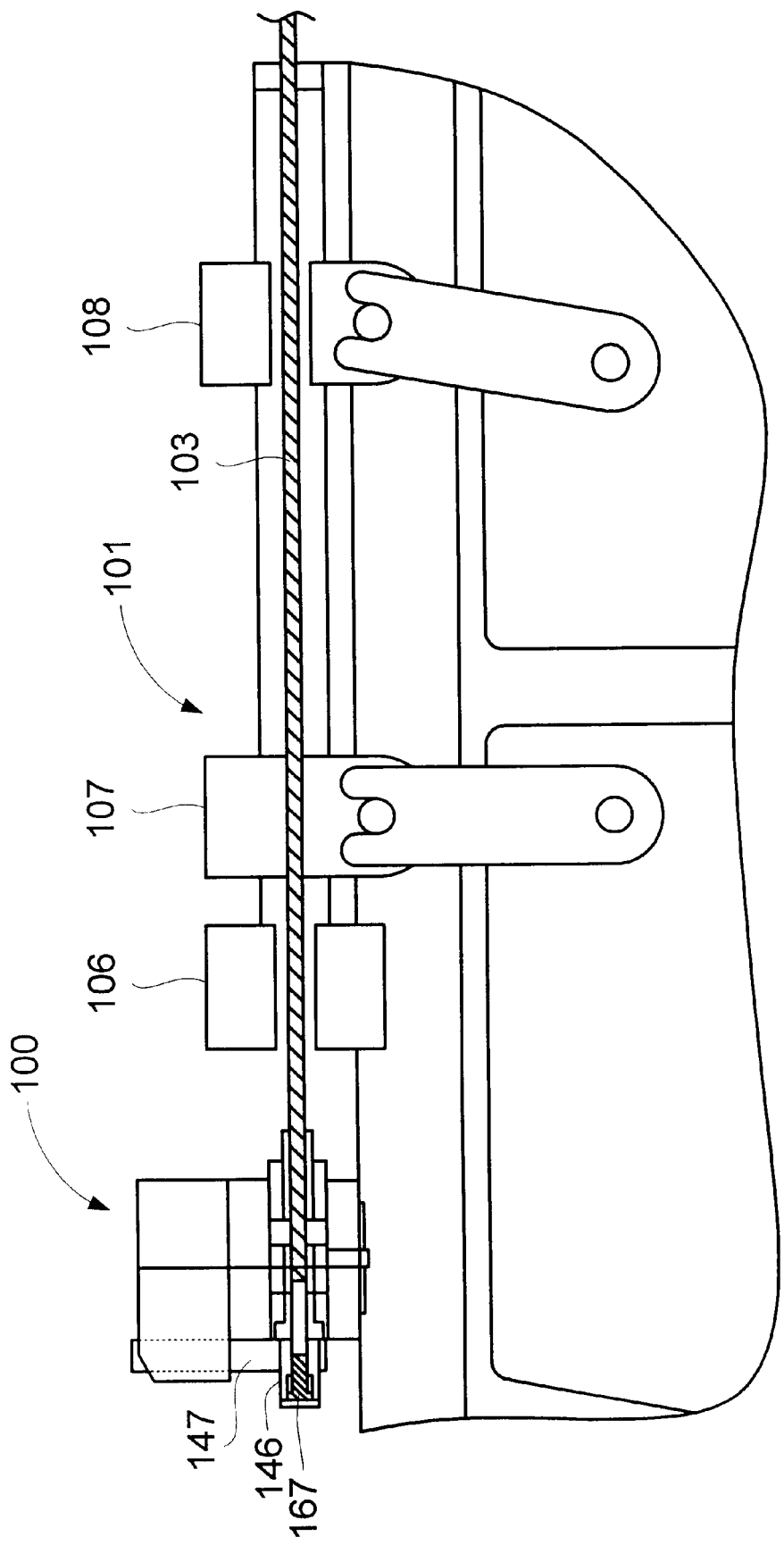

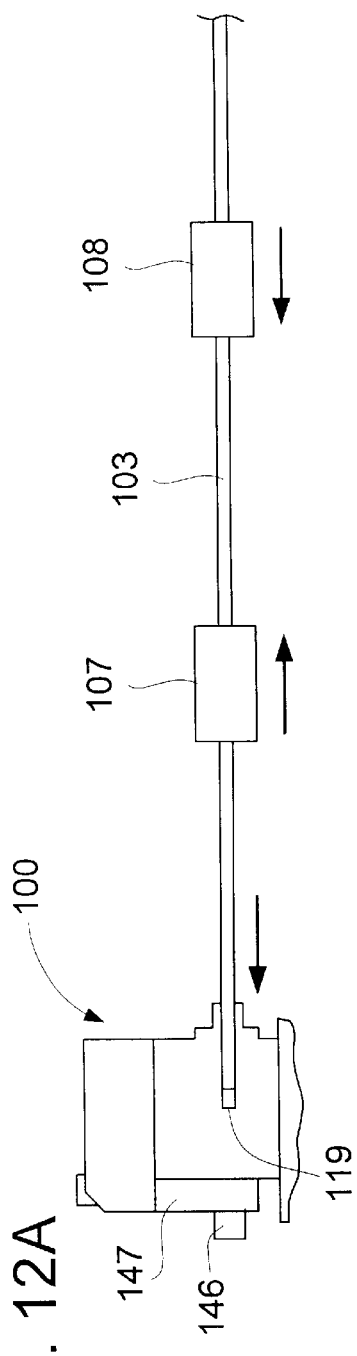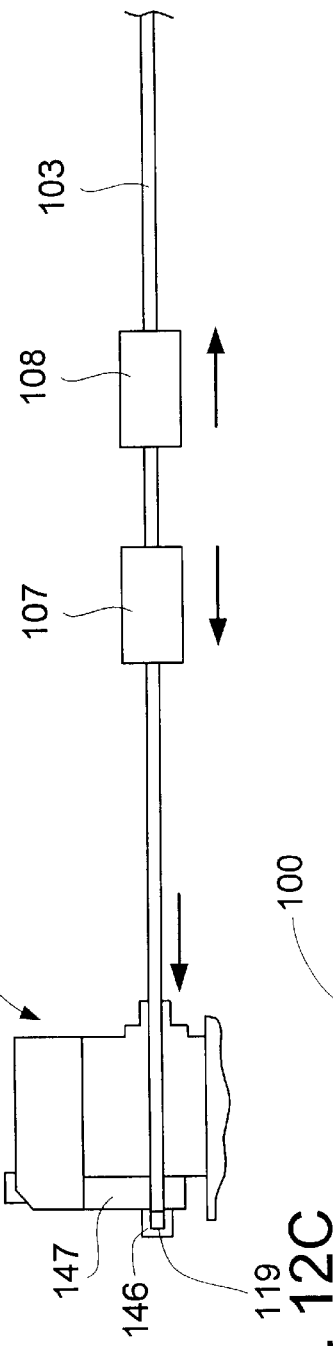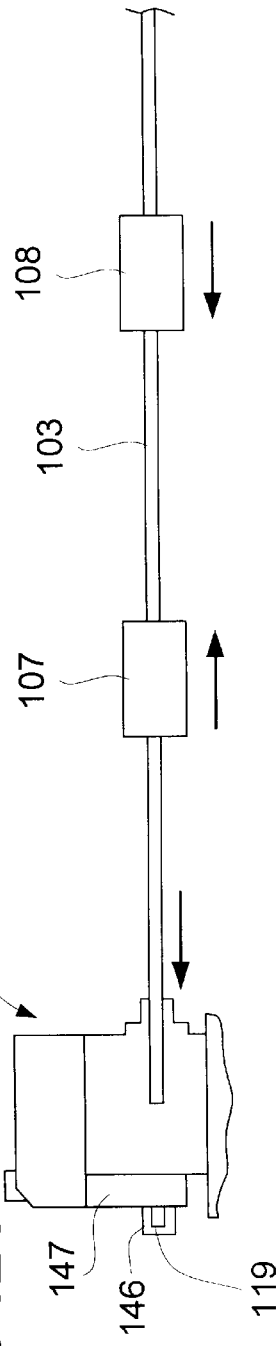

Section XIX-XIX

Section XX-XX

Section XXI-XXI

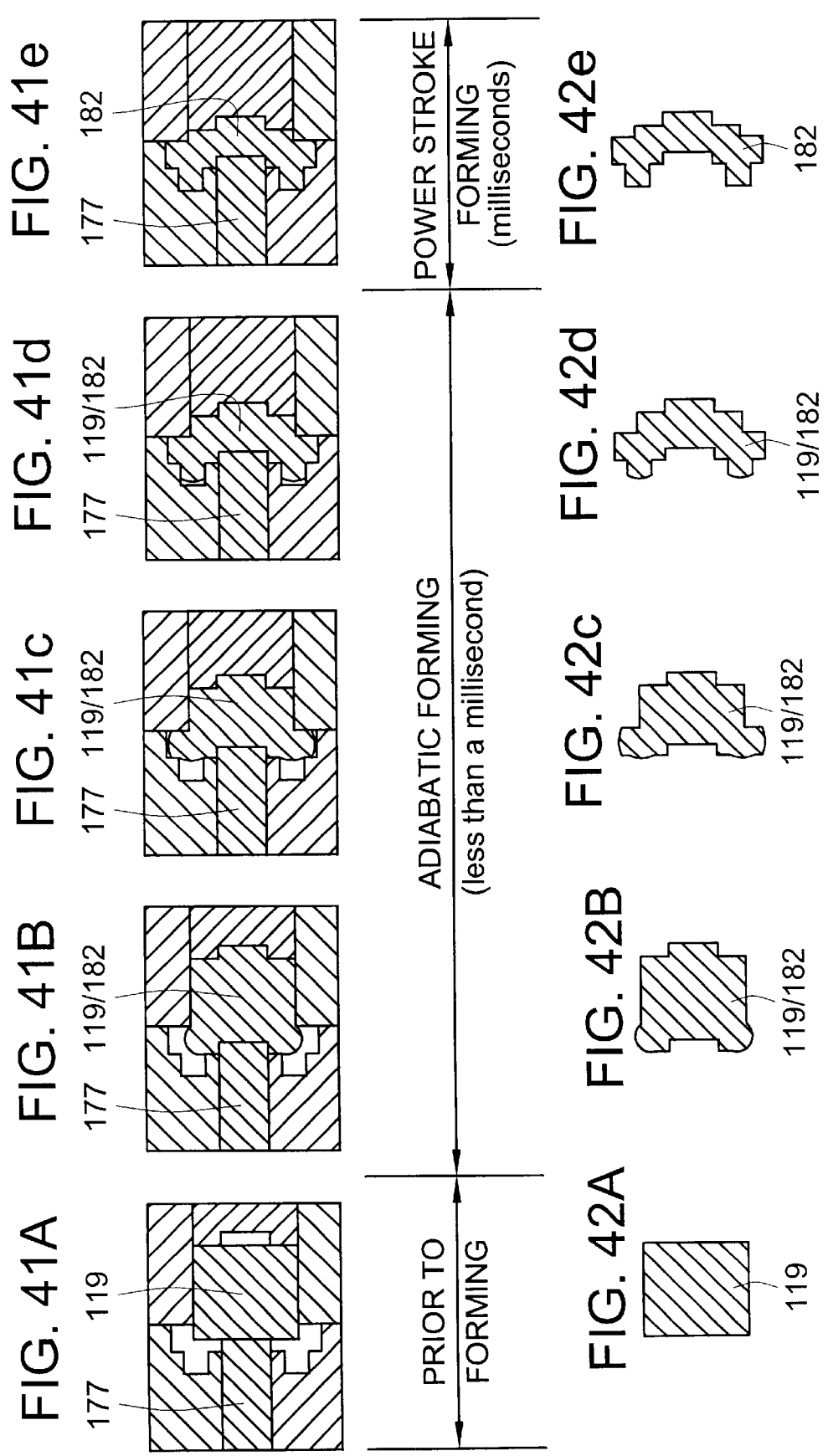

AUTOMATIC TWO-STATION ADIABATIC BLANK CUT-OFF AND PART FORMING SYSTEM

FIELD OF THE INVENTION

This invention relates to an automated, integrated, synchronized part forming system that incorporates two adiabatic processing stations which each have multiple operating stages whereby, progressively and successively, elongated feedstock is cut into blanks that are formed into parts.

BACKGROUND OF THE INVENTION

High speed impact systems for metal and plastic working, such as cut-off and forming or shaping, using the adiabatic softening phenomenon, although the subject of research and development since World War II, have proven to be difficult to achieve, control and use for mass production.

The energy utilized involves very high impact speeds and very short machine tool engagement times. In adiabatic forming, each part (or work piece) requires a certain amount of applied energy to be completely formed. That energy can be distributed and should never be provided by impact alone. In successful adiabatic forming, the energy delivered to a work piece is critical as no tooling can stand up to the magnitude of the shock waves created by full energy impacts.

It was discovered that limited forming and tool engagement time reduced the opportunity for heat to transfer into surrounding tooling. When a work piece cannot conduct heat away at the rate at which it is generated, the work piece temperature increases in a pre-determined, plastically strained zone, causing the work piece material to soften and experience decreased flow stresses, resulting in reduced energy requirements to move the material. It was found that a successful adiabatic forming operation could be achieved based on a two-part sequence of impact and immediately succeeding power stroke (or force application). In a work piece heated by impact, the heat pattern relates to the final form; some areas remain at ambient temperature while other areas may reach temperatures close to melting point. Such elevated temperatures minimize flow resistance and stresses, reduce tooling load and allow material flow into relatively small crevices. At this point, a power stroke immediately follows impact and completes a part forming operation with little resistance. Thereafter, the formed part is ejected. The adiabatic impact and power stroke part forming sequence and the part ejection from adjacent tooling are rapidly carried out.

An impact press device capable of providing a suitable impact for adiabatic forming is disclosed in Lindell U.S. Pat. No. 4,245,493. A tooling assembly that is suitable for use with such an impact press and that is adapted for the cut-off of elongated feedstock into blanks is disclosed in Lindell U.S. Pat. No. 4,470,330.

Adiabatically formed parts are desirable and even superior to parts produced by conventional forming processes because they can be rapidly produced, and are uniform and free from defects, such as burrs, work/strain hardening, pull-down and micro-cracks.

For use in the mass production of parts, practical automatic adiabatic forming systems are desirable and needed, but the systems must also be reliable, operable at high piece throughput speeds, and require minimum manpower. An adiabatic part forming system that is capable of converting elongated starting stock into formed parts rapidly and in an automatic manner would be very useful. Such a system would require both an adiabatic processing station for the cut-off of elongated feedstock, such as stock in the form of a bar, tube or coil, for example, into blanks, as well as an adiabatic processing station for forming of blanks into parts. Each station and the entire system would have to be capable of high throughput rates.

Particularly when the stations are substantially independent, such a system would require a stock feeder, an interstage blank transferer, and sychronization means. The stock feeder would have to be integrated with the first station stock cut-off device, and be adapted both for feeding and positioning of elongated stock and also for the separation and advancing of blanks. The inter-station blank transferer would have to be integrated with both the first station and the second station, and be capable of receiving blanks from a first station location, of transporting blanks from the first station to the second station, and of depositing blanks at a second station location. The synchronization means for operating the system would not only have to control the operation of the respective multiple sequential operating stages of each station, but also have to integrate operations of the stock feeder and the interstage blank transferer with the operations of first station and the second station.

Mere adaptations by those of ordinary skill in the art of prior art adiabatic impact devices for accomplishing adiabatic cutting or shaping of work pieces with high throughput rates may be possible, but such adaptations by themselves, even if achieved, would be inadequate without suitable peripheral equipment, such as a suitable stock feeder, a suitable interstation blank transferer and suitable automation means. A combination of suitable components is needed to achieve an automatic, integrated, adiabatic forming system capable of operating at high throughput rates. Such a system has never previously existed so far as now known. Indeed, to create such a two-station adiabatic blank cut-off and part forming system, not only must significant, nonobvious advances in adiabatic cutting and shaping stations be achieved, but also the indicated coacting peripheral required subassemblies must be invented because such subassemblies have not previously existed.

The present invention aims not only to achieve the components necessary for such a system, but also to achieve the combination of such components into such a system, thereby to satisfy the need for such an adiabatic forming system. To create the present system, substantial technological advances in the art have been necessary.

SUMMARY OF THE INVENTION

This invention relates to an automated, integrated, synchronized part forming system that incorporates two adiabatic processing stations that operate sequentially relative to one another. First, an adiabatic blank cut-off station progressively and successively cuts elongated feedstock into identical blanks. Next, an adiabatic part forming station progressively and successively forms the blanks into identical parts. Each station has its own multiple, sequential, cyclical operating stages.

The cut-off station cooperatively operates with a stock feeder subassembly. The cut-off station and the forming station cooperatively operate with an interstation blank transferer subassembly. The system includes synchronizing, sequencing and regulating automation means effective for all components.

The invention also relates to component subassemblies that are incorporated into the system and make possible the practical operation of the inventive system which includes the respective adiabatic forming stations, the stock feeder subassembly, the interstation blank transferer subassembly and the automation means.

The invention involves apparatus including the system itself, its component assemblies and subassemblies, and various combinations thereof. The invention also involves methods, including the sequential adiabatic method of part formation progressing from starting feedstock through intermediate blank to formed part.

The invention is not limited to the cut-off of one blank at a time from elongated feedstock. In a cut-off station two or more blanks can be concurrently cut-off.

Also, the invention is not limited to the forming of one part at a time from a blank. In a forming station, a double forming die or cartridge arrangement can be employed. Two forming stations that are either successively operated relative to each other in part formation or that each receive blanks from a cut-off station can be utilized.

The first adiabatic station in which feedstock is cut-off into blanks can advantageously incorporate two separate, independently operating, but integrated and synchronously functioning, adiabatic cut-off devices, each one of which is provided with an independent stock feeder subassembly. Similarly, the second adiabatic station in which blanks are successively formed into parts can advantageously incorporate two separate, independently operating, but integrated and synchronously functioning, adiabatic blank forming devices, each one of which is provided with a separate blank transferer subassembly.

Accordingly, it is an object of the present invention to provide an automated integrated, progressively operating, synchronized, two station adiabatic forming system, one station of which cuts feedstock into blanks, the other station of which shapes blanks into formed parts.

Another object is to provide such an automated system which operates at high work piece throughput speeds yet which operates with precision so that the system produces consistent formed parts that are free from imperfections and defects.

Another object is to provide such an automated system wherein each of the two stations operates mechanically and independently at high speed and progresses through multiple operating steps in a cyclical manner yet wherein both stations operate in a coordinated and synchronized manner.

Another object is to provide improved tooling adapted for use in a system for accomplishing adiabatic stock cut-off and adiabatic blank forming.

Another object is to provide an automatic system for blank cut-off and part forming which utilizes a starting feedstock having any shape or configuration including feedstock that is solid or tubular in cross-section.

Another object is to provide an improved stock feeder subassembly for an adiabatic processing device, such as a stock cut-off device.

Another object is to provide, in a stock feeder subassembly of the type indicated, the capability of carrying out step-wise successive cycles involving the advancing of an elongated feedstock into an adiabatic cut-off apparatus, the positioning and clamping of the feedstock during feedstock cut-off and blank formation, the separating of a cut-off blank from the cut-off apparatus, and, especially, the loading of the separated blank into a blank transferer subassembly, the feedstock advancing and the blank separating and loading being carried out successively in coordination with operations of an associated adiabatic cut-off device.

Another object is to provide an improved blank transferer subassembly that is adapted for moving a work piece from one adiabatic tooling device to another, such as from a stock cut-off device to a work piece shaping device.

Another object is to provide, in a blank transferer subassembly of the type indicated, the function of carrying out successive cycles involving picking up a work piece at one location at one adiabatic tooling device, transporting the work piece, and discharging the work piece at a second location at a second adiabatic tooling device, the picking up and the discharging being accomplished while maintaining the work piece in a predetermined spatial orientation.

Another object is to provide automation means for an adiabatic forming system that is adapted for high part throughput operating rates, that accomplishes part formation from feedstock proceeding through blank formation to formed product part, and that incorporates two successive adiabatic processing stations that each has multiple operating steps.

Another object is to provide, in an automation means of the type indicated, the capacity to regulate and control sequential and synchronized functioning of a series of associated peripheral assemblies that are associated with the adiabatic stations, the peripheral stations including a stock feeder means, a blank removal means, a blank transferer means, and a formed part ejection means.

Other objects, aims, features, purposes, advantages, and the like will become apparent to those skilled in the art from the present specification taken with the accompanying drawings and the appended claims.

BRIEF DESCRIPTION OF THE DRAWINGS

In the drawings:

FIG. 2B is a side elevational view of the opposite side of the adiabatic cut-off assembly from that partially shown in FIG. 2A with the hood in a fully open position;

FIG. 2C is a side elevational detailed view of the adiabatic forming apparatus shown in FIG. 2A;

FIG. 3 is a diagrammatic view in side elevation of the adiabatic cut-off assembly in a side orientation similar to that of FIG. 2B, this view showing the coacting combination of the adiabatic impact press assembly and the stock feeder assembly in functional association with the inter-station blank transferer assembly, the cut-off assembly and the transferer assembly being in the operative configuration that occurs when the forward end of a feedstock is in position to be cut-off adiabatically in the impact press assembly and thereby create a blank;

FIG. 4 is an enlarged, fragmentary, longitudinal, vertical sectional, detail view taken through and along the axial feedstock pathway region in the adiabatic impact press assembly, the adiabatic impact press assembly being in the operative configuration shown in FIG. 3 where the stationary and the movable die blocks of the adiabatic impact press assembly are aligned;

FIG. 5 is a view similar to FIG. 4, but showing the adiabatic impact press assembly at the moment after adiabatic cut-off of a blank occurs with the stationary and movable die blocks being disaligned;

FIG. 8 is a view similar to FIG. 3, but illustrating the stock feeder assembly after the static gripper has released the feedstock and the second movable gripper clamps the feedstock;

FIG. 9 is a view similar to FIG. 3, but illustrating the stock feeder assembly after the second movable gripper has advanced the feedstock so that the feedstock's forward end is beyond the feedstock cutting plane in the impact press assembly and the cut-off blank that was produced as illustrated in FIG. 5 has been transferred into the blank-transfer capsule of the inter-station blank transferer apparatus;

FIG. 10 is a view similar to FIG. 3, but illustrating the stock feeder assembly after the second movable gripper has retracted the feedstock and positioned the feedstock's forward end before or at the blank cut-off position in the adiabatic impact press assembly;

FIG. 11 is a view similar to FIG. 3, but illustrating the stock feeder assembly after the second movable gripper has released the feedstock, and the first movable gripper has clamped and is ready to advance the feedstock to the preset feedstock cutting position shown in FIG. 3, whereby a new blank cut-off cycle of operation can begin;

FIGS. 12A, 12B and 12C each illustrate a different progressive operational stage in the operating cycle of the stock feeder assembly when this assembly is operated with two movable grippers and no fixed gripper;

FIGS. 41A through 41E shows in vertical section five progressive and successive illustrative stages of material flow in the forming cavity proceeding from the blank to the finished formed part as such stages occur during a blank forming operation carried out in the adiabatic blank forming assembly with FIG. 41B through FIG. 41D showing the part being formed from ram impact and with FIG. 41E showing the final part forming achieved through application of the power stroke;

FIGS. 42A through 42E correspond to the respective stages of FIGS. 41A through 41E and show illustratively the progressive blank forming stages apart from the forming cavity defined by the forming cartridges;

DETAILED DESCRIPTION

Figure 1A:
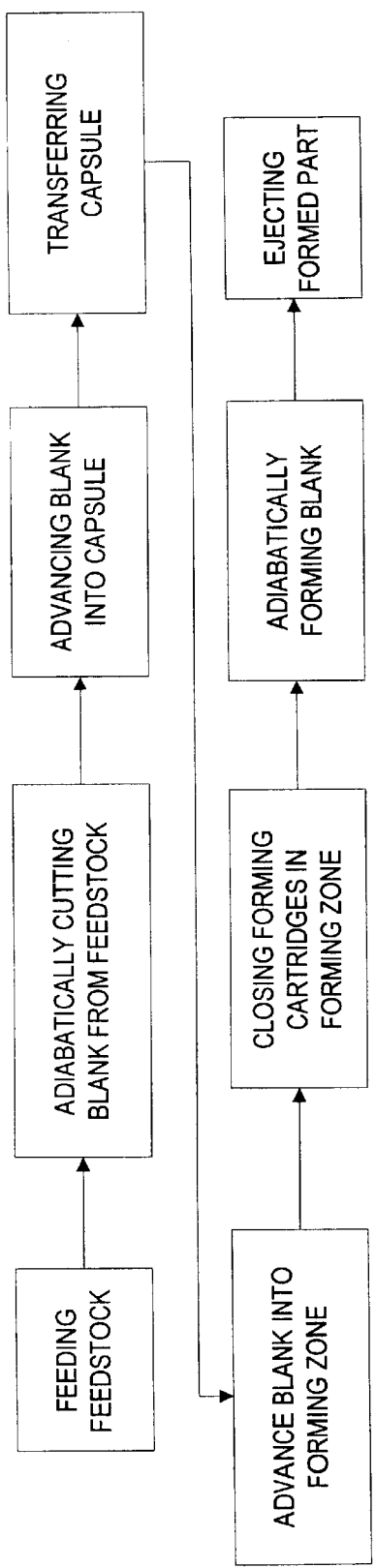
FIG. 1A is a flow diagram illustrating a preferred process operating step sequence for forming a part from a feedstock employing the two-station adiabatic part forming system of the invention.

Referring to FIG. 1A, a flow diagram illustrating the sequence for automatic part formation from feedstock is seen that illustrates one preferred sequence of process operating steps for practicing the present invention. In a first step, an elongated feedstock is fed incrementally to, and positioned in, an adiabatic cut-off zone. In a second step, in the adiabatic cut-off zone, a prechosen increment of the feedstock at the feedstock forward end is adiabatically cut-off by an impact applied along a transverse shear plane relative to the elongated feedstock, thereby to produce a blank in less than about one millisecond. In a third step, the blank is advanced into a transfer capsule. In a fourth step the capsule holding the blank is transferred from the adiabatic cut-off zone to an adiabatic forming zone. In a fifth step, the blank is located at a forming cavity in the adiabatic forming zone. In a sixth step, forming cartridges are closed in the adiabatic forming zone. In a seventh step, the blank is adiabatically formed to conform to the cavity by a sequentially applied combination of impact immediately followed by an application of a power stroke, thereby to produce a completely formed part in milliseconds. In an eighth step, the formed part is ejected.

Figure 1B:
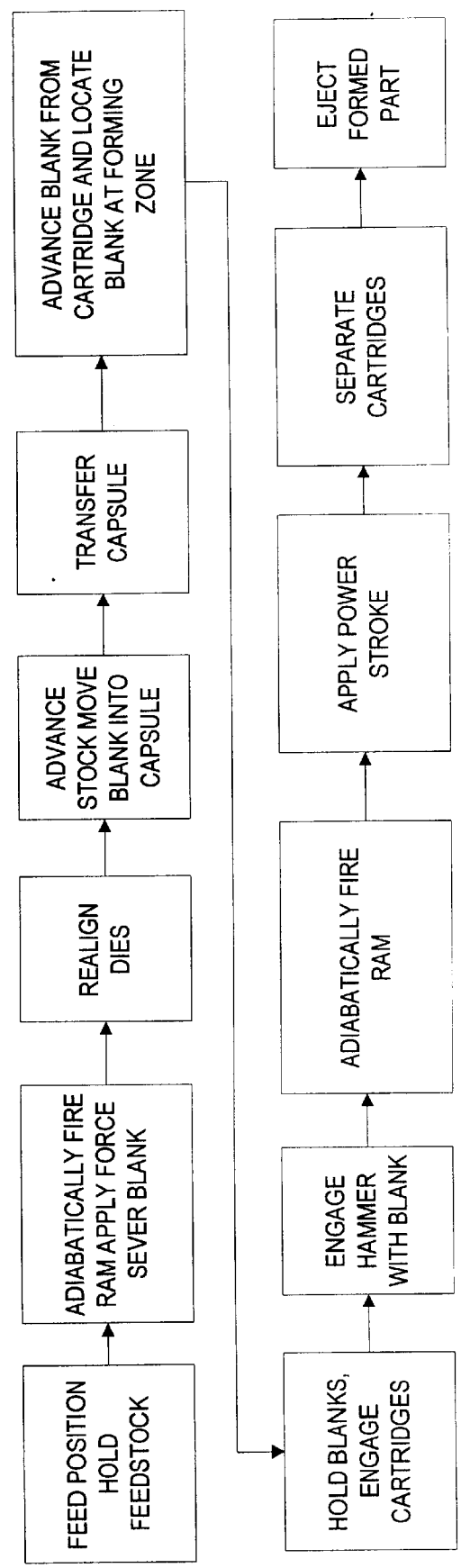
FIG. 1B is a flow diagram illustrating a preferred machine operating step sequence for executing the process step sequence of FIG. 1B.

Referring to FIG. 1B, a flow diagram is shown illustrating a preferred sequence of mechanized operations that are employed in accordance with the invention to carry out the process step sequence of FIG. 1A. First, feedstock is fed, positioned, and held in the adiabatic cut-off zone. Second, in that zone, a ram is fired, energy is applied, and a pair of initially aligned cut-off dies is disaligned, thereby to sever adiabatically a blank from the feedstock forward end. Third, the dies are realigned. Fourth, the feedstock is overadvanced, thereby to move the cut-off blank into a transfer capsule. Fifth, the capsule is transferred to an adiabatic forming zone. Sixth, in the forming zone, the blank is moved from the transfer capsule and transferred into a forming position, and the capsule is separated. Seventh, forming cartridges are engaged to define generally a forming adjacent portions of the blank. Eighth, an energy-transfer hammer is advanced and abutted against the blank adjacent the forming cavity. Ninth, a ram is fired against the hammer, the hammer is suddenly pushed against the blank, and the blank is partially formed. Tenth, power is applied against the ram, and, resultingly, the blank is formed into conforming relationship with the forming cavity, thereby producing a formed part. Eleventh, the forming cartridges are separated. Twelfth, the formed part is ejected from the forming zone.

The operations of FIG. 1A and FIG. 1B are practiced in the present invention. An embodiment 99 of the inventive two station adiabatic forming system, which utilizes and performs such operations, and which includes the incorporated subassemblies, is illustrated in FIGS. 3–48.

(a) System 99 Operation and Subassembly Cycles of Operation

The present section of the specification describes system 99 operation.

Structural details are described in subsequent sections.

Figure 2A:
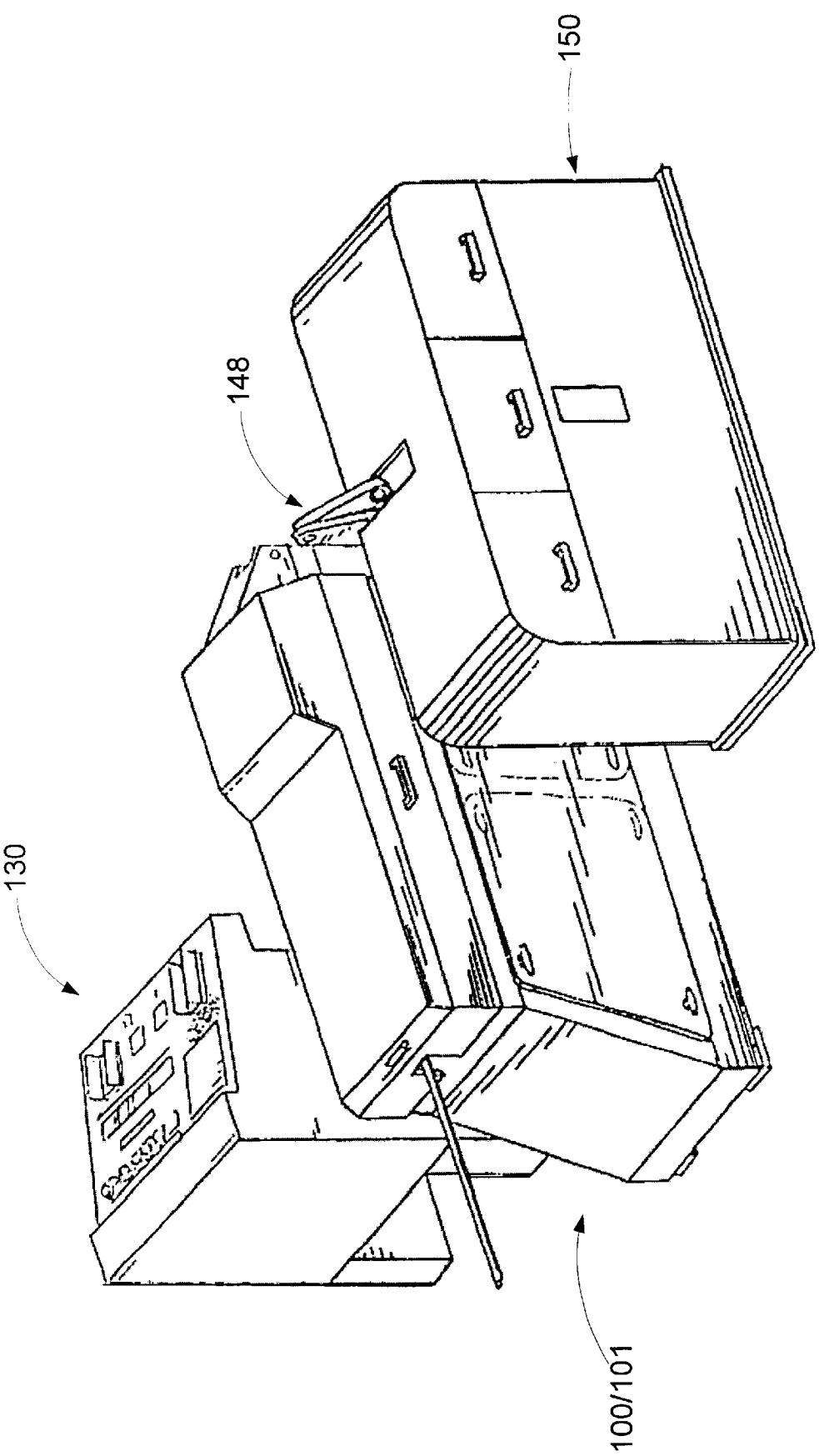
FIG. 2A is a perspective environmental view of one embodiment of the inventive two-station adiabatic forming system.

Referring to FIGS. 2A, 2B and 2C, there is seen the system 99 embodiment which comprises adiabatic cut-off assembly 100/101, forming assembly 150, transferor assembly 148, and control station 130.

Referring to FIG. 3, there is seen an illustrative diagrammatic representation in side elevation of an adiabatic cut-off assembly 100/101 which comprises an impact press assembly 100 in functional combination with a stock feeder assembly 101, the combination 100/101 being part of a system 99. As shown in FIG. 3, the cut-off assembly combination 100/101 is at one operating position or configuration that occurs in a complete cycle of automatic operation of system 99.

In FIG. 3, an elongated feedstock 103, such as a metal bar or the like, is being held by the stock feeder assembly 101 in position for a predetermined feedstock 103 forward end portion to be cut-off by the impact press assembly 100. The impact press assembly 100, the stock feeder assembly 101, and the feedstock 103, when present, are supported by a frame 104.

The stock feeder assembly 101 incorporates three grippers, identified as stationary gripper 106, first movable gripper 107, and second movable gripper 108. Each of the grippers 106, 107 and 108 is adapted to clamp and hold an adjacent portion of the elongated feedstock 103. In the combination 100/101 assembly operating position shown in FIG. 3, the first movable gripper 107 clamps the feedstock 103. The first movable gripper 107 has been advanced to a full forward position, and, when in this position, the gripper 107 has advanced the feedstock 103 to a predetermined position for cut-off by apparatus 100.

FIG. 4 shows mainly details of the adiabatic impact press assembly 100, the assembly 100 being in the operative configuration shown in FIG. 3. A further description of the assembly 100 is provided in the following section. The feedstock 103 forward end portion extends into or through the bores 112 and 113 of the die blocks 109 and 111 to the desired predetermined extent needed to place the plane of cutting desired for feedstock 103 into aligned relationship with the plane 115 defined between the die blocks 109 and 111. In the assembly 100, just before ram 116 impact on energy-transferring hammer 114 occurs, a cycle of operation of apparatus 100 can be considered to commence.

Figure 6:
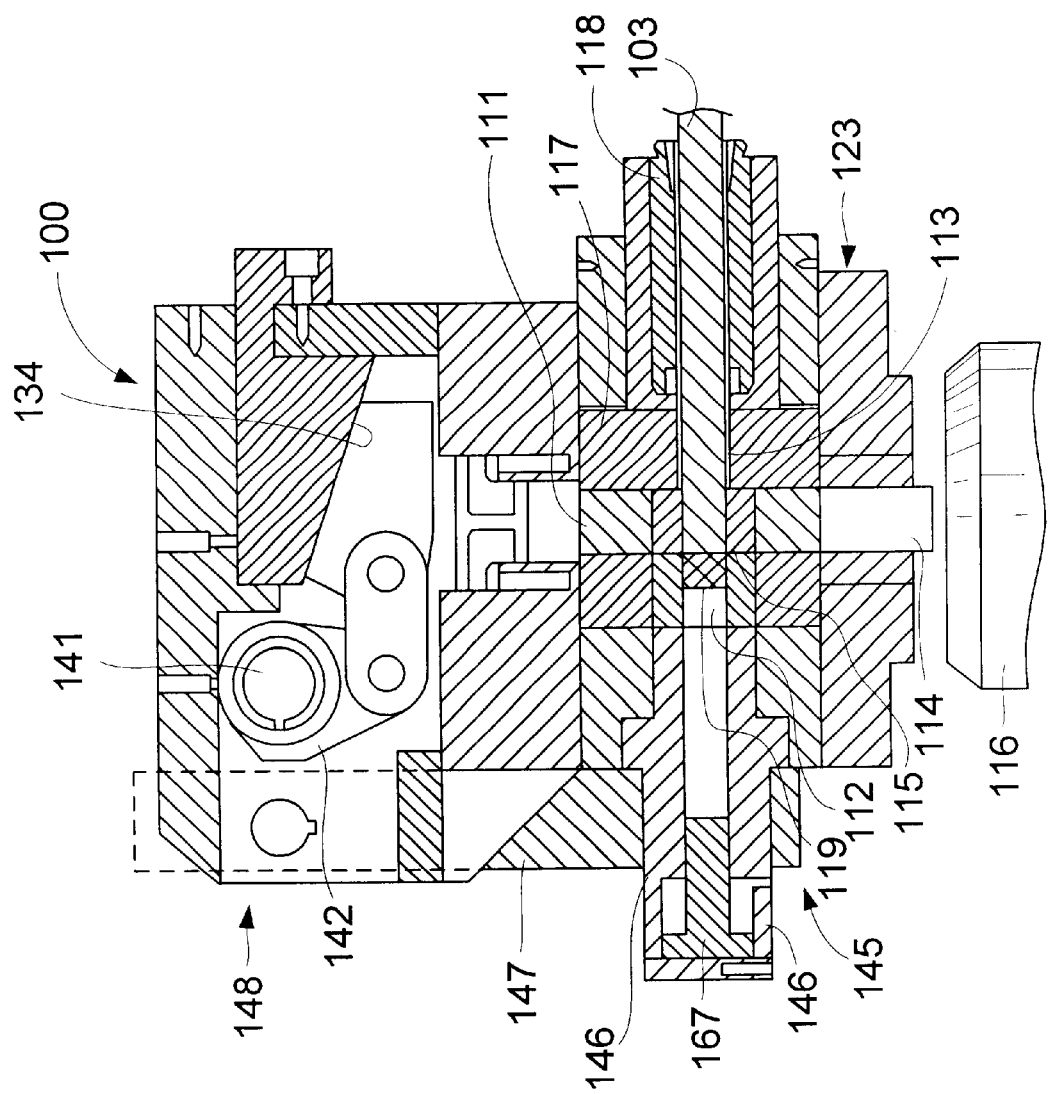
FIG. 6 is a view similar to FIG. 5, but showing the adiabatic impact press assembly at the moment after blank separation when the stationary and movable die blocks are realigned and in the axial configuration shown in FIG. 4.
Figure 7:
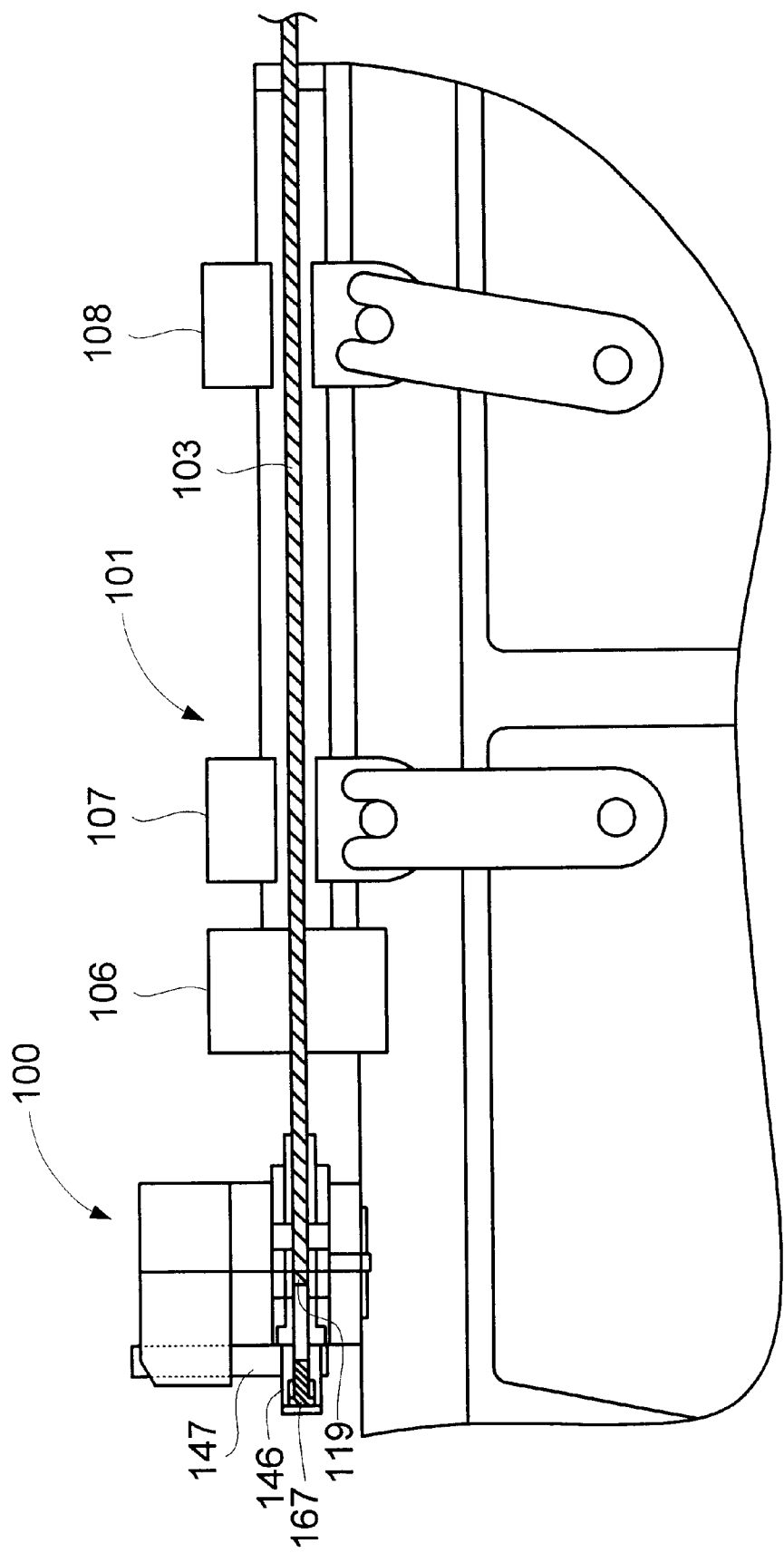
FIG. 7 is a view similar to FIG. 3, but illustrating the adiabatic cut-off assembly in the operative configuration where the adiabatic impact press assembly is in the configuration shown in FIG. 6 and where the static gripper of the stock feeder assembly still clamps the feedstock.
Figure 13:
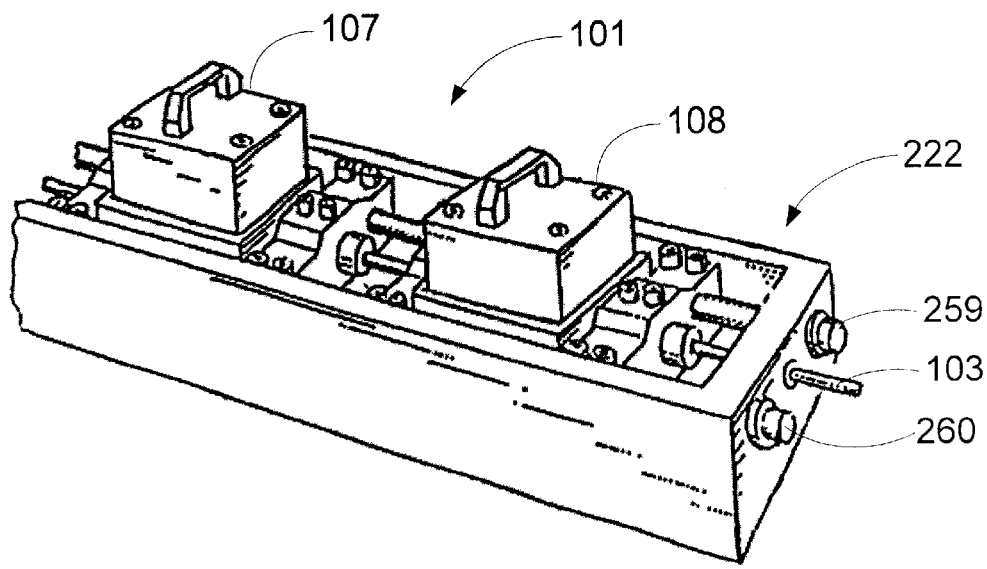
FIG. 13 is a fragmentary perspective view of the upper portion of the stock feeder assembly showing the first and the second movable grippers.
Figure 48:
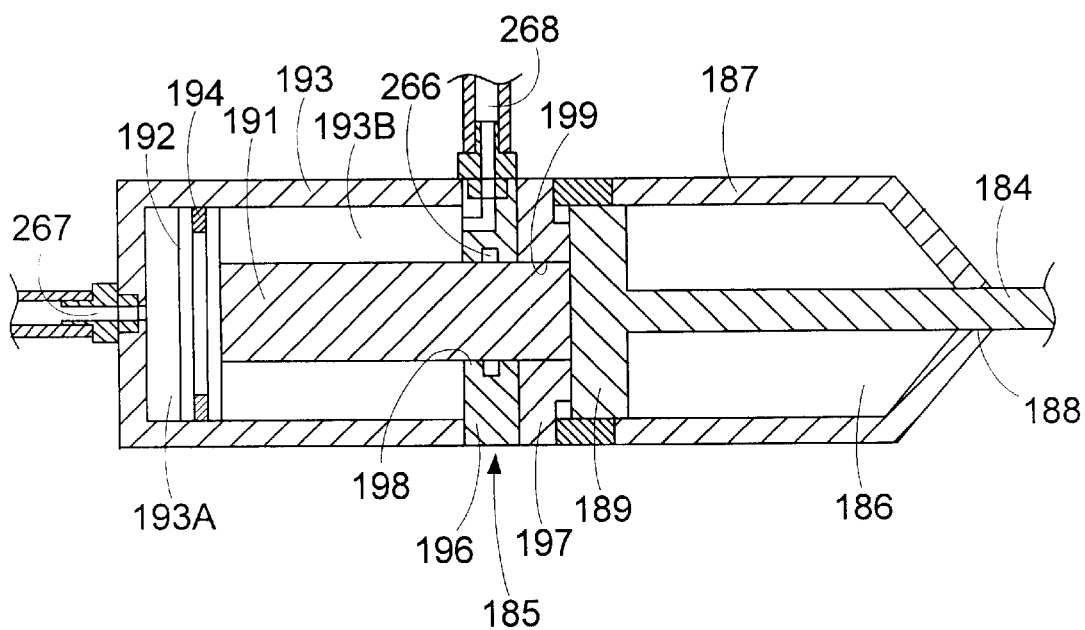
FIG. 48 is a longitudinal sectional view axially taken through the pneumatic air cylinder used to translate the ejector/anvil in the forming assembly.

In the stock feeder assembly 101, a change in feedstock gripping occurs just before ram 116 impact on hammer 114 occurs. The movable gripper 107 of the feeder assembly 101 releases the feedstock 103, and the feedstock 103 is gripped by the stationary gripper 106, there being a short dwell time interval during which the feedstock 103 is held by both such grippers 106 and 107 to avoid any shift in the position of feedstock 103. All clamping and releasing is performed during the dwell times of the movable grippers 107 and 108. After this change in feedstock 103 gripping has occurred, the grippers 106, 107, and 108 appear as shown in FIG. 7, and this configuration is maintained during blank 119 cut-off. The operating configuration shown in FIG. 7 corresponds to the configuration shown in FIG. 6. After blank 119 cut off, the stationary die block 109 and the movable die block 111 have their bores 112 and 113 realigned. In FIG. 7, the second movable gripper 108 has been moved and is located substantially at its rearward-most location along the path of feedstock 103 travel.

Immediately after the stationary gripper 106 clamps the feedstock 103, the ram 116 is fired (released). After the ram 116 impacts against the hammer 114, the impact is transferred to the movable die block 111. The result is that the movable die block 111 is translated and the feedstock 103 is severed along the parting plane 115 defined by the adjacent faces of the die blocks 109 and 111. The resulting cut-off forward end portion of the feedstock is a blank 119. During the severing, the feedstock 103 has room to move transversely in the channels of the spacer block 117 and the guide bushing 118.

In the impact press assembly 100, before the severing, the positive die return subassembly 121 is retracted by springs, as below described. The total time period transpiring between impact and blank 119 severing is less than about one millisecond. After the blank 119 severing from the feedstock 103, the positive die return subassembly 121 pushes the movable die block 111 back into bore alignment with the stationary die block 109, as illustrated in FIGS. 6 and 7. The ram 116 of the adiabatic cut-off assembly 100 is retracted by the ram operating mechanism 120, thereby effectively completing one full cycle of operation of the assembly 100.

In stock feeder assembly 101, after blank 119 cut-off, the stationary gripper 106 releases the feedstock 103, and the second movable gripper 108 clamps the feedstock 103, as shown in FIG. 8. The first movable gripper 107 translates backwards to its predetermined rearward-most position.

The second movable gripper 108, while clamping the feedstock 103, now advances the feedstock 103 forwards along the feedstock pathway to a predetermined extent that is sufficient to cause the forward end of the feedstock to push the blank 119 completely out of the stationary die block 109 and also completely into a predetermined transfer position that is located in a transfer capsule 146, as shown in the assembly 100/101 configuration illustratively shown in FIG. 9.

Thereafter, the second movable gripper 108 retracts the so-clamped feedstock 103 backwards along the feedstock pathway to a predetermined extent that is sufficient to place the forward end of the feedstock at the parting plane 155, as shown in FIG. 10. In this apparatus configuration, the second movable gripper 108 is either at or near its point of rearward-most travel, depending upon apparatus adjustments.

Next, the first movable gripper 107 clamps the feedstock 103 and the second movable gripper 108 releases the feedstock 103, as illustrated in FIG. 11. The first movable gripper 107 now advances the feedstock 103 to the extent necessary to place the feedstock 103, and the assembly 100 and assembly 101, in the respective operating positions shown in FIG. 3, thereby completing one cycle of operation by the stock feeder assembly 101.

Although in each of FIGS. 1 through 11, the components of the transferer assembly 148 identified as the transfer arm 147 and its associated transfer capsule 146 are shown in the same relative position adjacent the discharge end of apparatus 100, those skilled in the art will appreciate that the transfer arm 147 and transfer capsule 146 need only to be in this position at some time just before a blank 119 is translated out of the apparatus 100 and into the transfer capsule 116.

The die blocks 109 and 111, and the transfer capsule 146, are sized for use with a particular selected feedstock, as those skilled in the art will appreciate, so need to be changed when the diameter or cross sectional configuration of feedstock 103 is changed. Sometimes large size or configuration changes from one feedstock to another require a change in the jaws of the grippers 106, 107 and 108.

Figure 22:
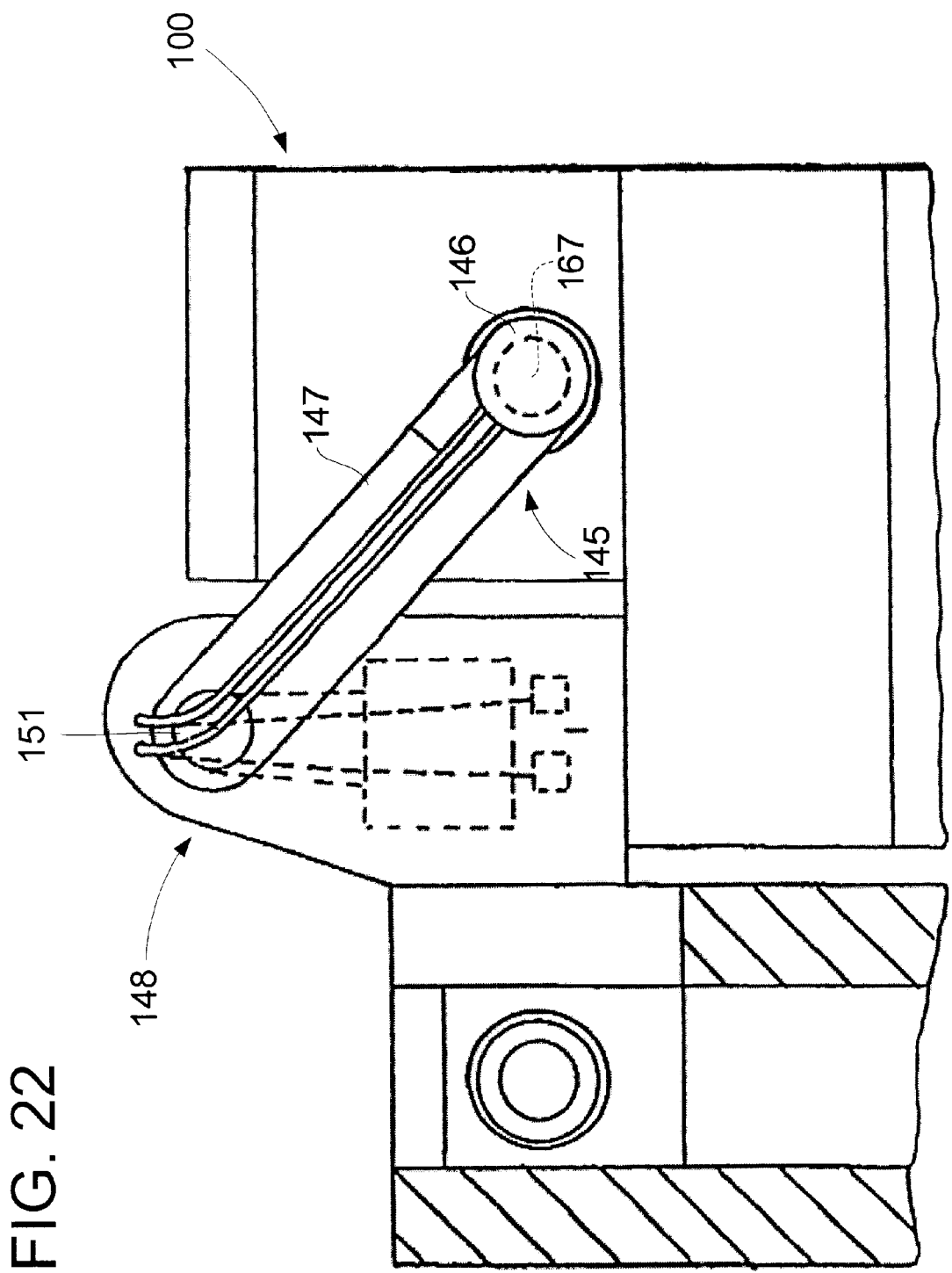
FIG. 22 is a partially diagrammatic end elevational view of the inter-station blank transferer assembly in combination with the adiabatic cut-off assembly and the adiabatic forming assembly, the system being that shown in FIG. 2A with some parts being shown in section and some parts being broken away, the transfer arm and the blank transfer capsule of the transferer assembly being in functional association with the adiabatic cut-off assembly, this view showing the blank transferer assembly at the moment after a blank that has been produced in the adiabatic cut-off assembly has been transferred into the blank transfer capsule as shown in FIG. 9.

In FIG. 22, the general configuration of the transferer assembly 148 is illustrated when the transfer arm 147 is located at a prechosen position 145 at the adiabatic cut-off apparatus 100 where and when the transfer capsule 146 is receiving a blank 119, as illustrated, for example, in FIGS. 9 and 10. The transferer assembly 148 is located between the adiabatic cut-off apparatus 100/101 and the adiabatic forming apparatus 150. The structure of the transferer assembly 148 is further described below.

Figure 23:
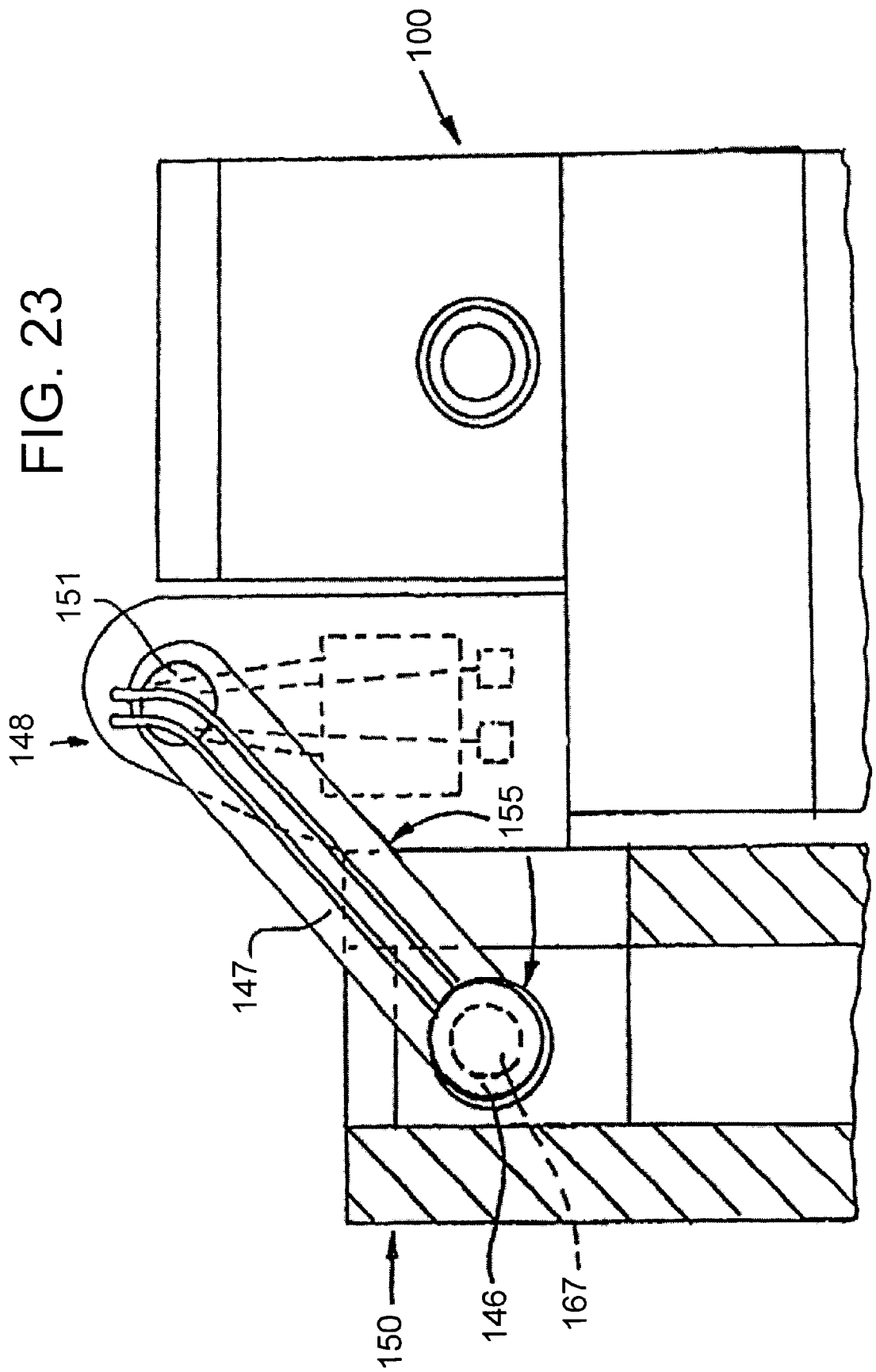
FIG. 23 is a view similar to FIG. 22, but illustrating the blank transferer assembly after its transfer arm has moved the associated blank transfer capsule from the adiabatic cut-off assembly to the adiabatic blank forming assembly.

When the transfer of a blank 119 into the transfer capsule 146 is completed, and the overadvanced feedstock 103 in the adiabatic cut-off apparatus 100/101 is being, or has been, separated from the transfer capsule 146 and relocated into a position, such as shown in FIG. 10, the transfer arm 147 pivots about the axis of shaft 151 of the transferer assembly 148 and moves the transfer capsule 146 from the position 145 to a prechosen position 155 at the adiabatic forming apparatus 150, as illustrated in FIG. 23.

When the transfer arm 147 is in the position 155, the transfer capsule 146 is located at the adiabatic forming apparatus 150 so that the blank 119 in the transfer capsule 146 is transferable from the transfer capsule 146 into the adiabatic forming apparatus 150. After the transfer arm 147 has moved to position 155, the configurational interrelationship between the transferer assembly 148, including the transfer arm 147 and the transfer capsule 146 with the blank 119, and the adiabatic forming apparatus 150, is as illustrated in FIG. 24.

Figure 24:
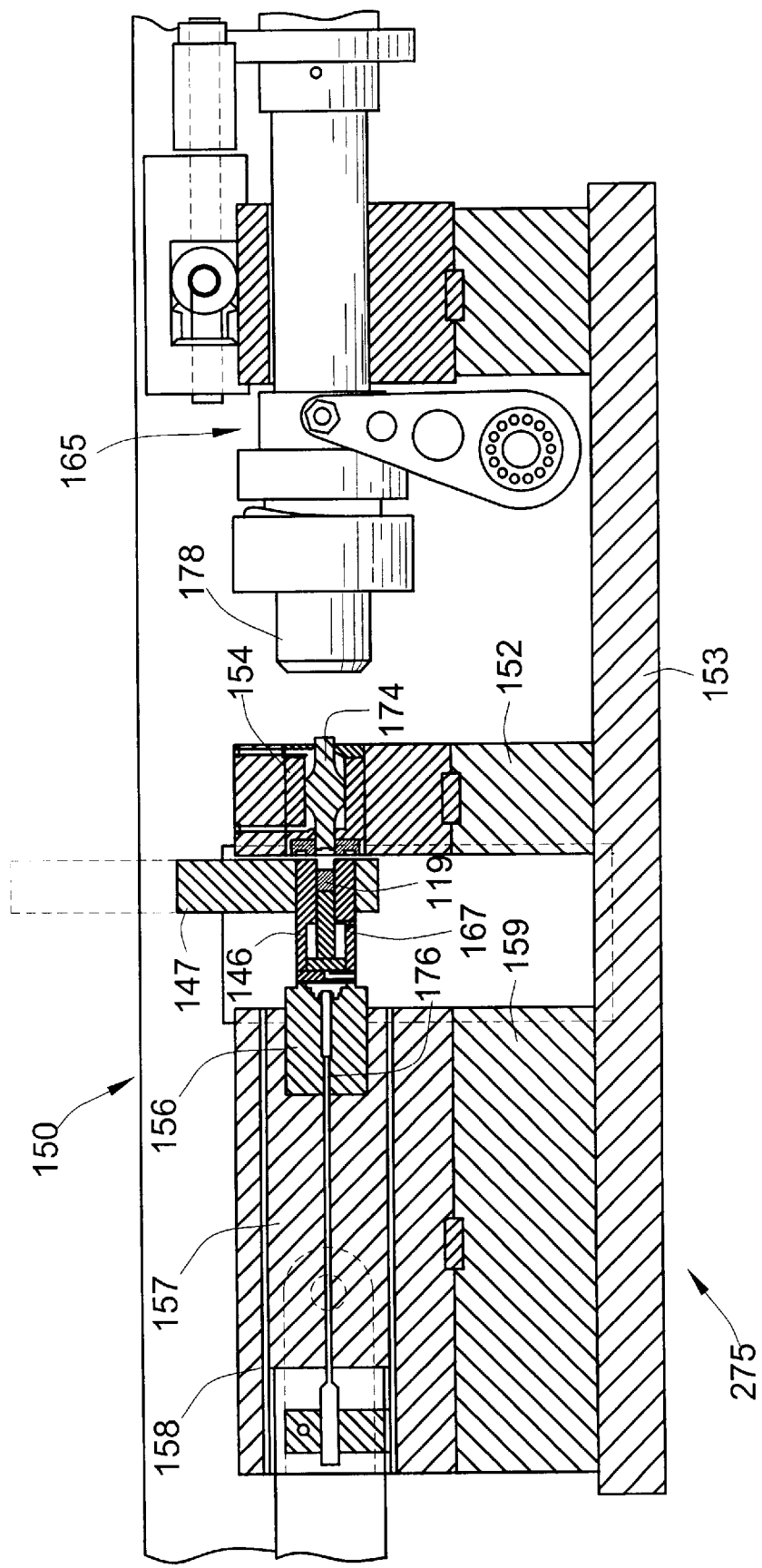
FIG. 24 is a fragmentary, longitudinal, vertical sectional view taken through and along the axial region of the adiabatic blank forming assembly showing the blank forming assembly in association with the blank transferer assembly, the combination being shown in the operative configuration where the transfer capsule of the blank transferer assembly is about to transfer a blank held by the transfer capsule into the blank forming assembly.

The configuration of the adiabatic forming apparatus 150, at this point in its cycle of operation, is illustrated also in FIG. 24. The structure of the adiabatic forming apparatus 150 is further described below.

Figure 25:
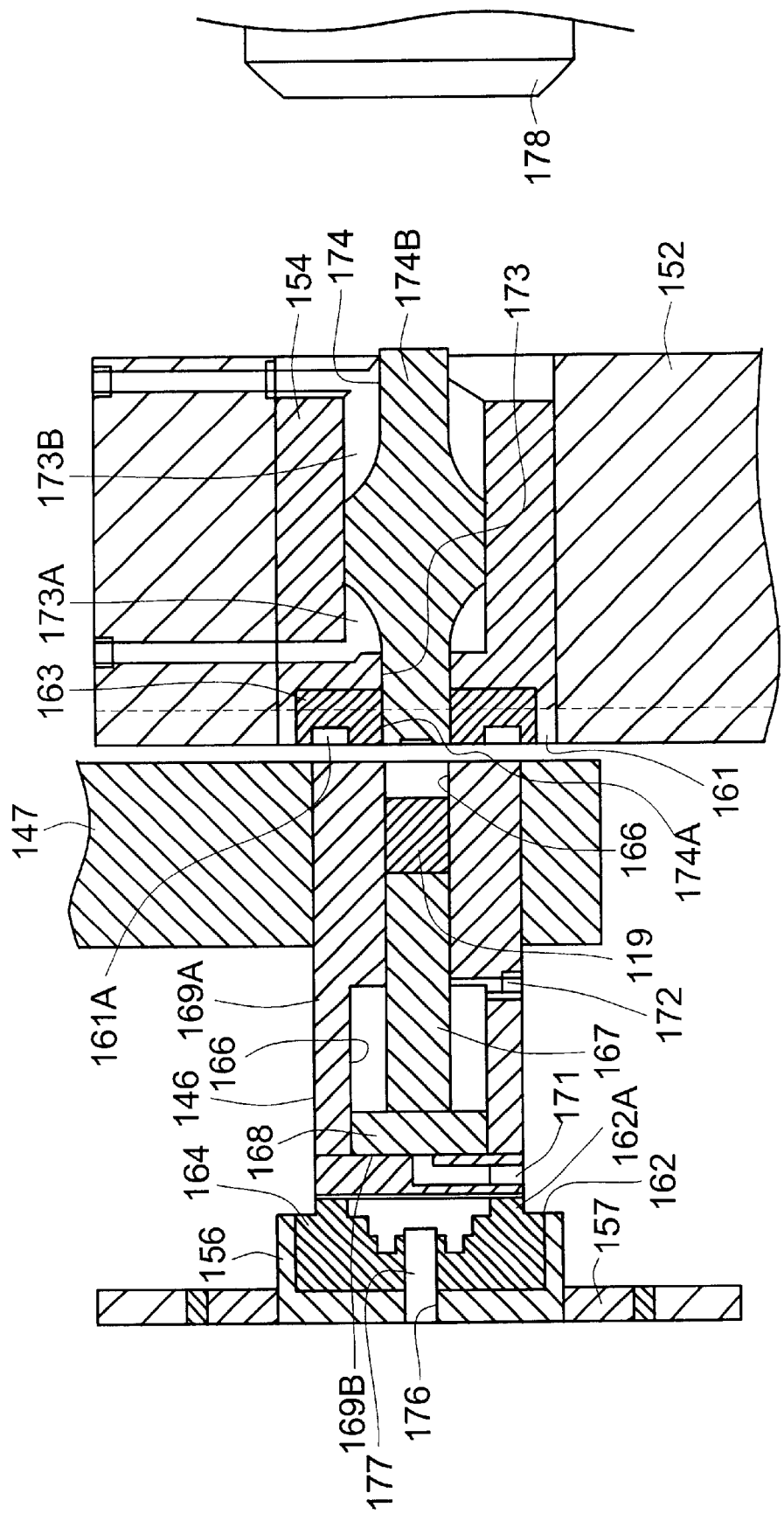
FIG. 25 is an enlarged, fragmentary detail view of the region in the blank forming assembly where the transfer capsule and the first and the second forming capsules of the blank forming assembly associate as shown in FIG. 24.

When the transfer arm 147 is in the position 155, the capsule 146 is in its desired position at the adiabatic forming apparatus 150, as shown, for example, in FIGS. 24 and 25. The transfer capsule 146 incorporates a pneumatic or hydraulic cylinder arrangement that includes a piston 168 which is reciprocatably movable in a cylinder chamber 169a and b that is a diametrically enlarged rear region defined in a longitudinally extending cavity 166 that extends axially through the transfer capsule 146. The piston 168 is axially connected to a shaft 167. Responsive to fluidic (preferably pneumatic, more preferably compressed air) input through channel 171 into chamber 169b and applied against the rearward face of the piston 168. As a consequence, the piston 168 and the shaft 167 are advanced in chamber 166 of capsule 146. The forward end of the shaft 167, which abuts against the blank 119, pushes against and causes the blank 119 to be moved forwardly and slidably completely out of the transfer capsule 146 and into the forward end portion of the adjacent axial channel 173 of a the stationary forming cartridge 154 of the forming assembly 150, as illustrated, for example, in FIGS. 26 and 27.

Figure 26:
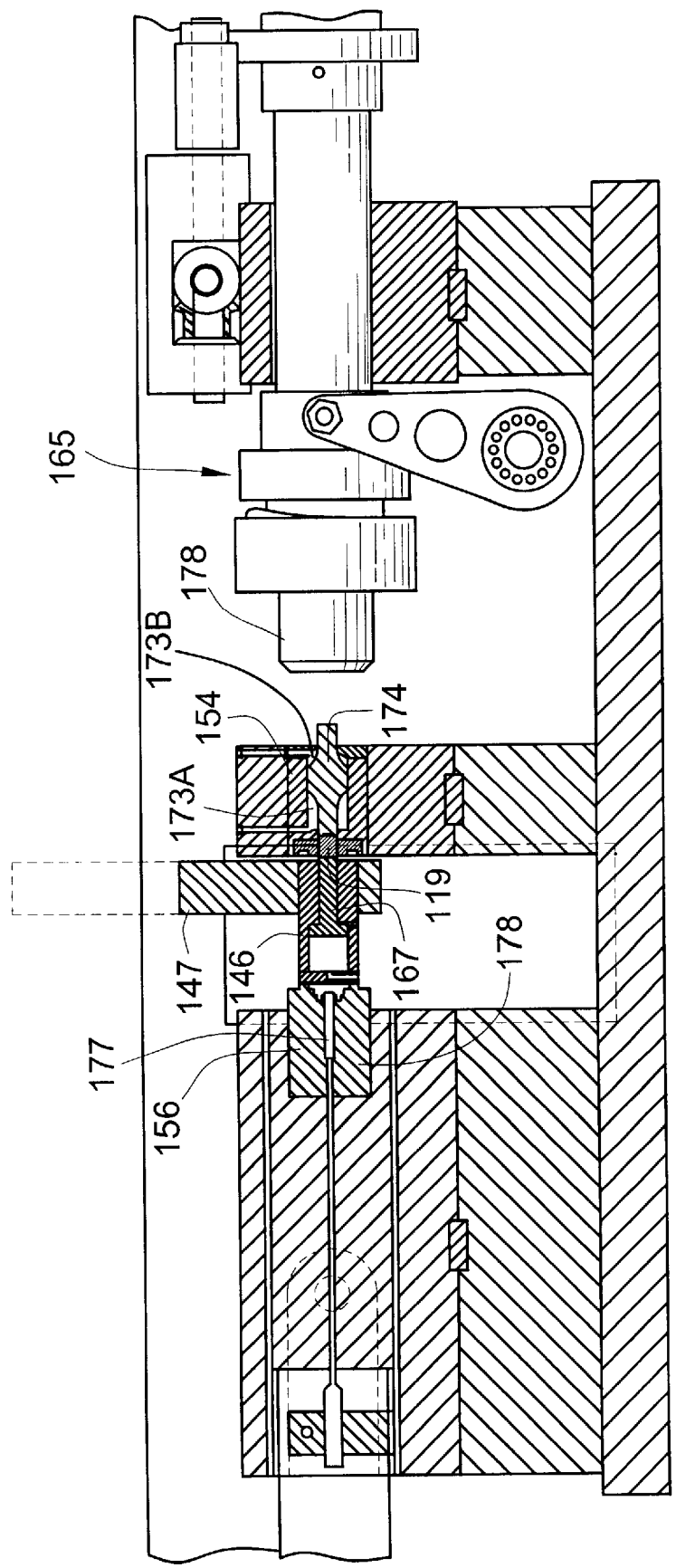
FIG. 26 is a view similar to FIG. 24, but showing the adiabatic blank forming assembly at the moment after the piston of the blank transfer capsule has advanced and moved the blank from the blank transfer capsule into the first forming cartridge of the blank forming assembly.
Figure 27:
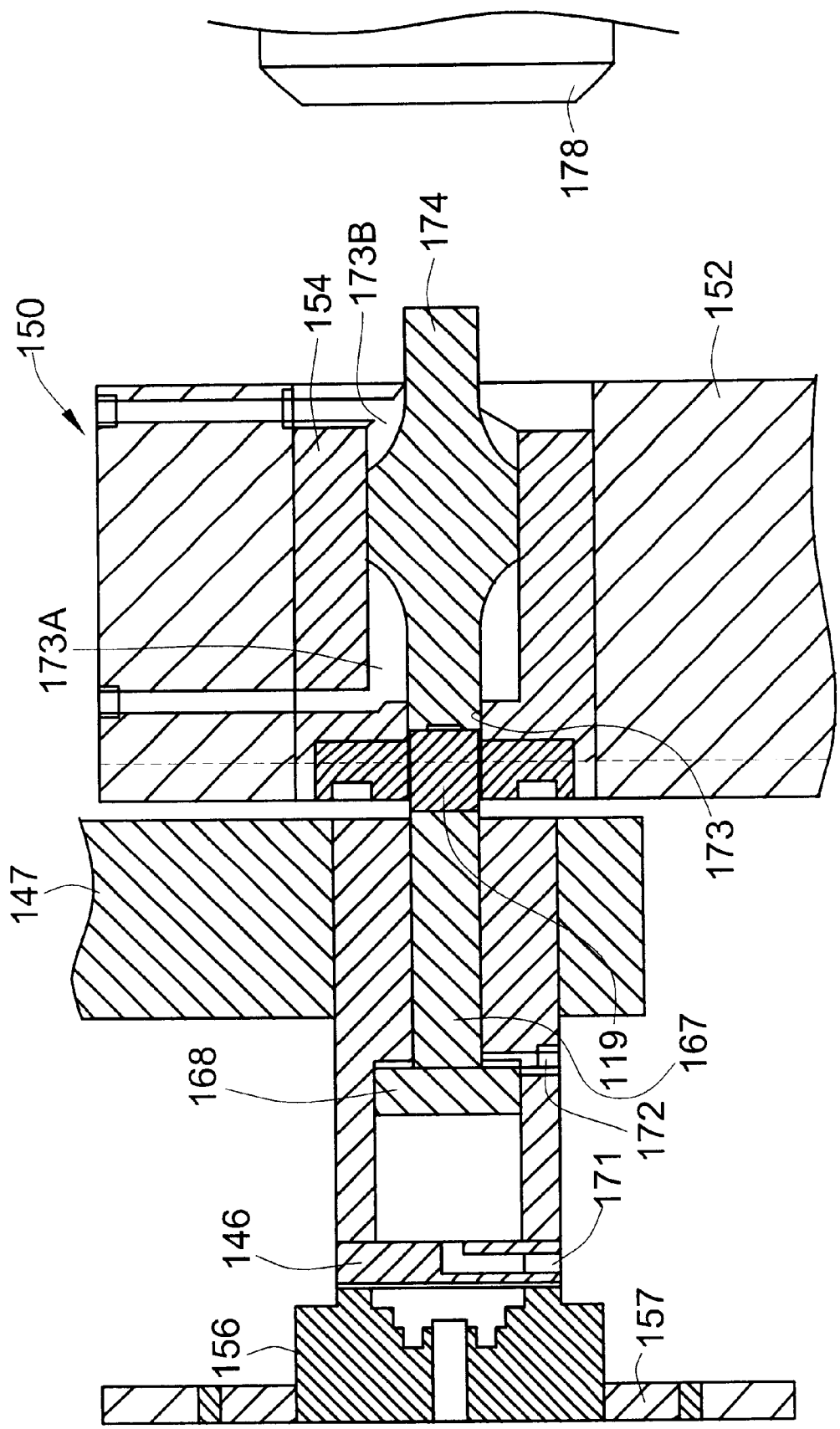
FIG. 27 is an enlarged view similar to FIG. 25, but showing details of the FIG. 26 configuration in the region of the forming cartridges and the associated blank transfer capsule.
Figure 28:
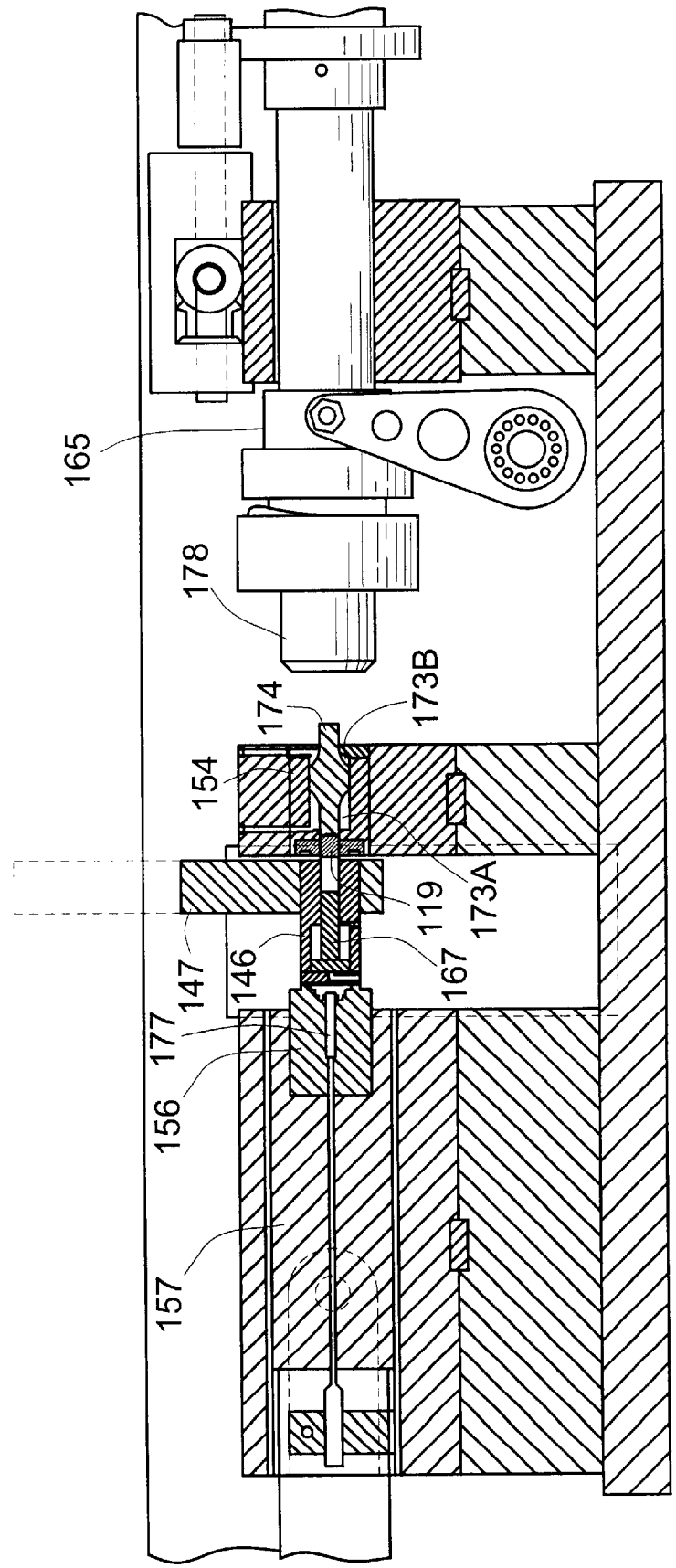
FIG. 28 is a view similar to FIG. 24, but showing the piston of the blank transfer capsule fully retracted back to its starting position after discharge of the blank from the capsule.
Figure 29:
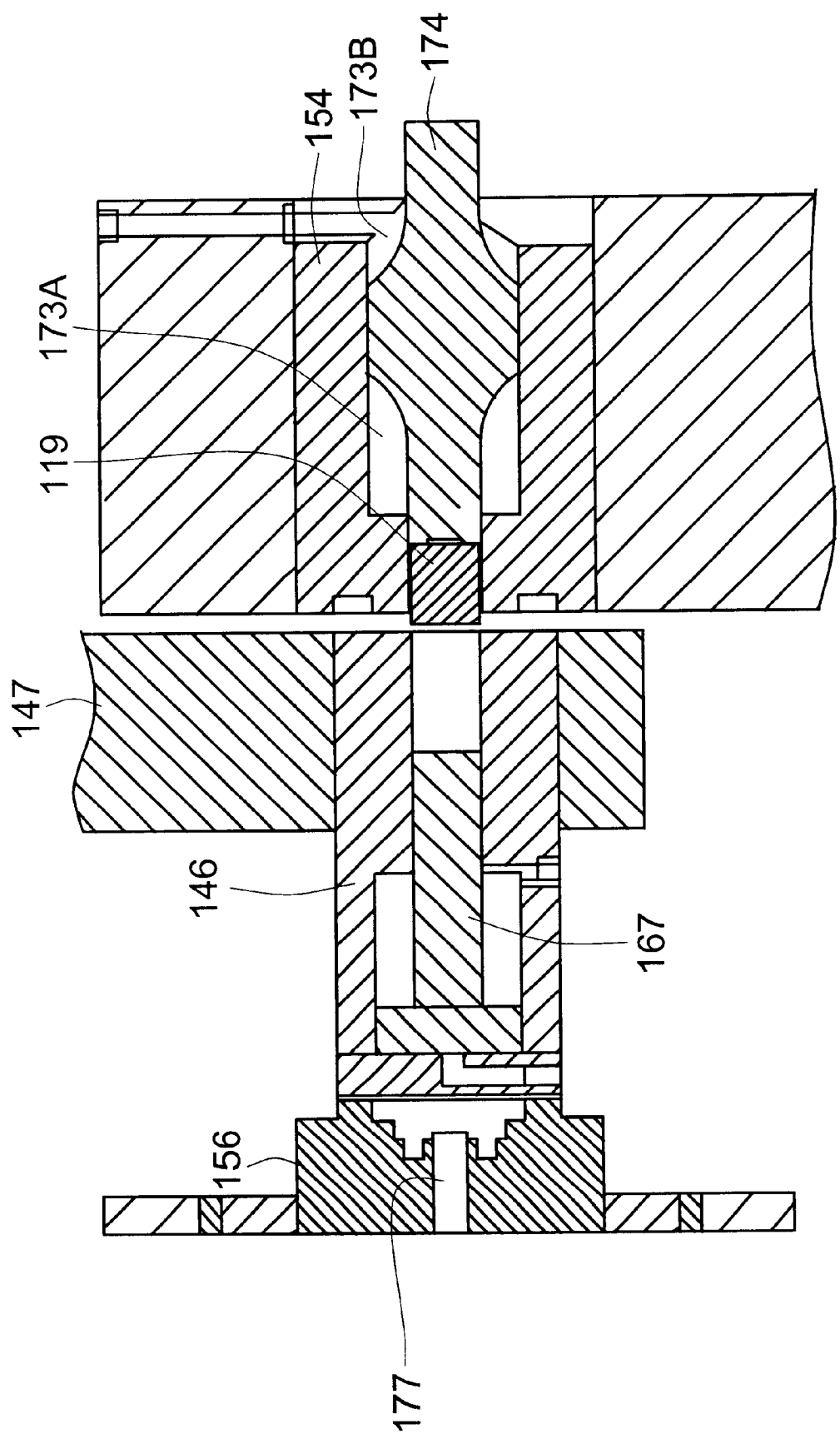
FIG. 29 is an enlarged view similar to FIG. 25, but showing details of the FIG. 28 configuration in the region of the forming cartridges and the associated blank receiving capsule.

Preferably an end portion of the blank 119 protrudes from the channel 173, as shown, for example, in FIGS. 26 and 27. After advancing the blank 119 into the channel 173 of the cartridge 173, the piston 167 and the shaft 167 are fully retracted in the transfer capsule 146, as illustrated, for example, in FIGS. 28 and 29, responsive to fluidic pressure input through channel 172 into chamber 169a and applied against the exposed forward face of the piston 168. Thereafter, the transfer arm 147 pivots at shaft 151 and returns with the now empty transfer capsule 146 from the position 155 back to the position 145 at the adiabatic cut-off apparatus 100/101, as shown, for example, in FIG. 22, thereby completing a cycle of operation of the transferer assembly 148.

Figure 30:
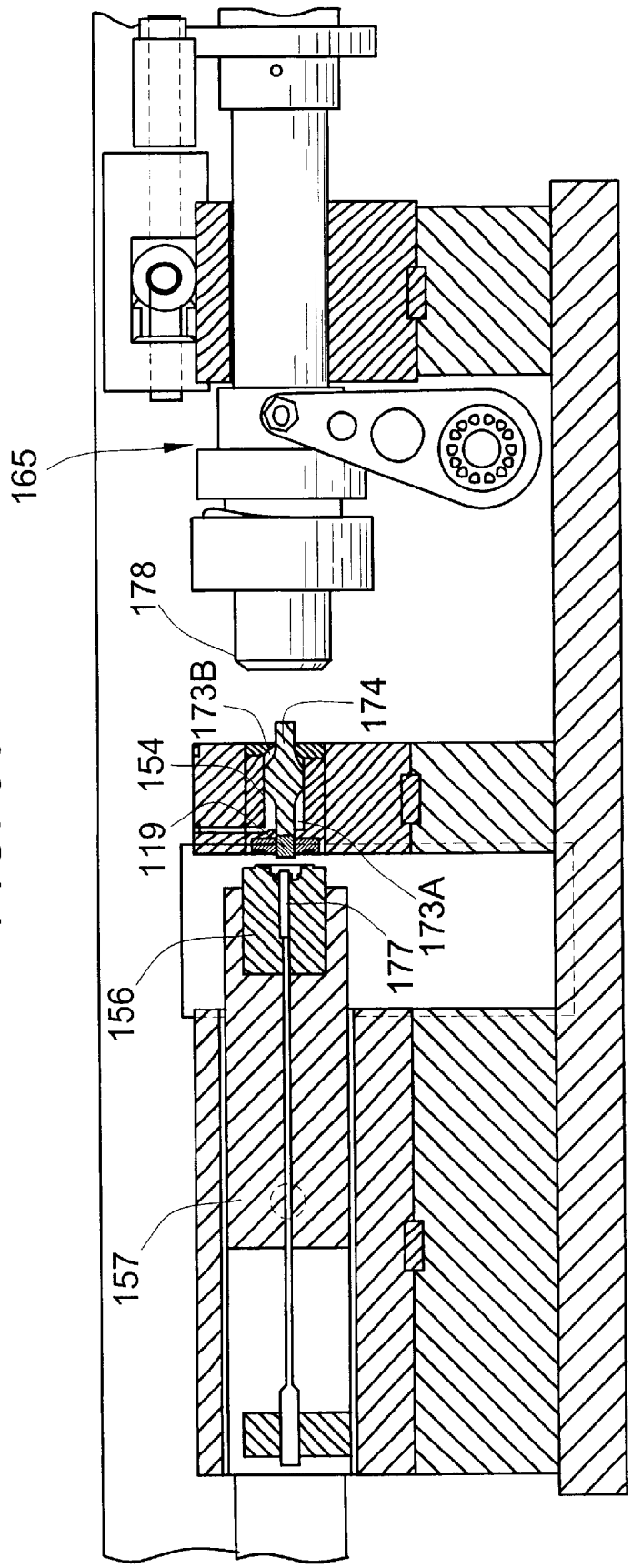
FIG. 30 is a view similar to FIG. 24, but showing the adiabatic blank forming assembly after the blank transferer assembly has been withdrawn therefrom and the second forming cartridge is advancing axially into abutting and mating engagement with the first forming cartridge.
Figure 31:
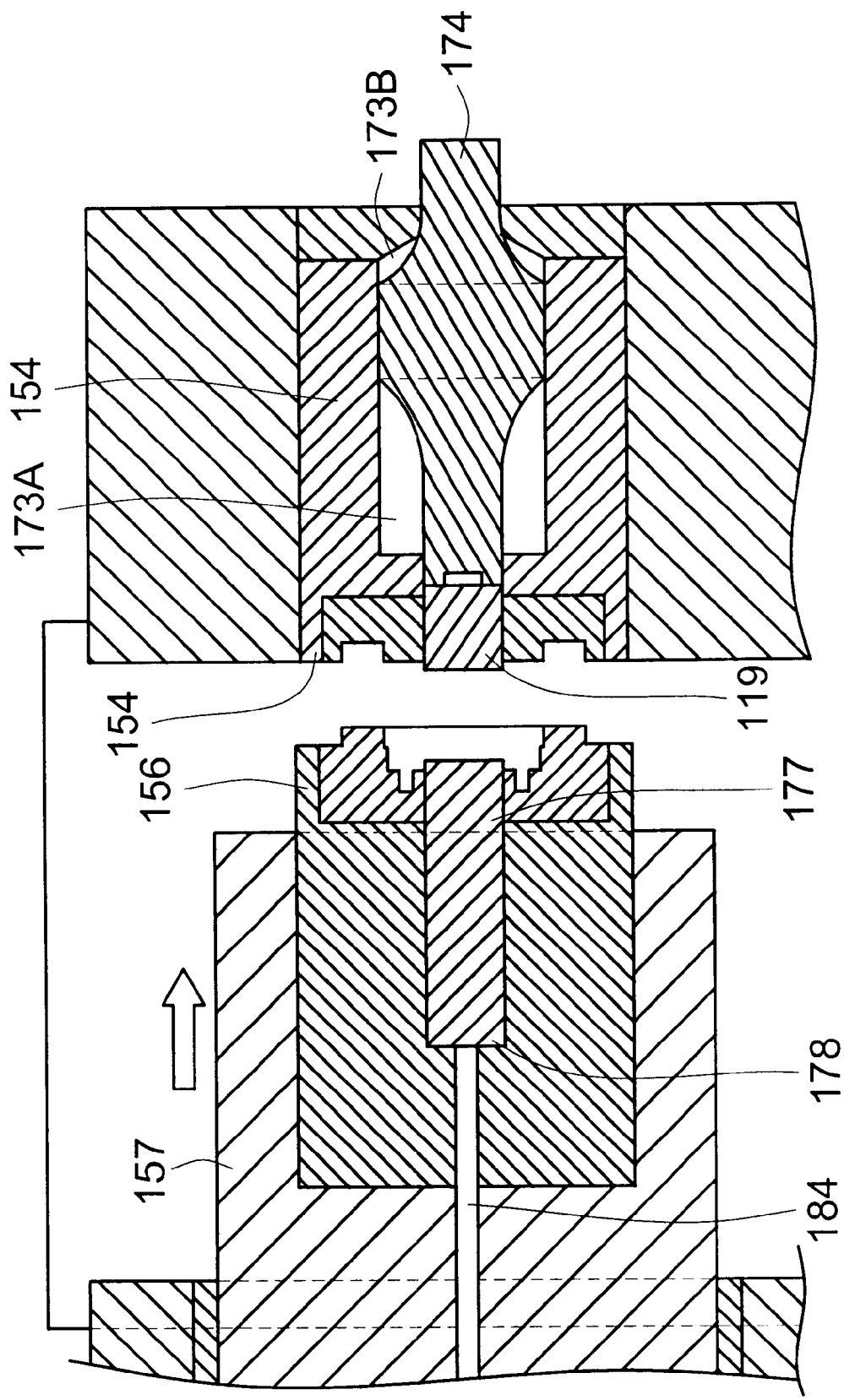
FIG. 31 is an enlarged view similar to FIG. 25, but showing the FIG. 30 configuration in the region of the first and second forming cartridges.
Figure 32:
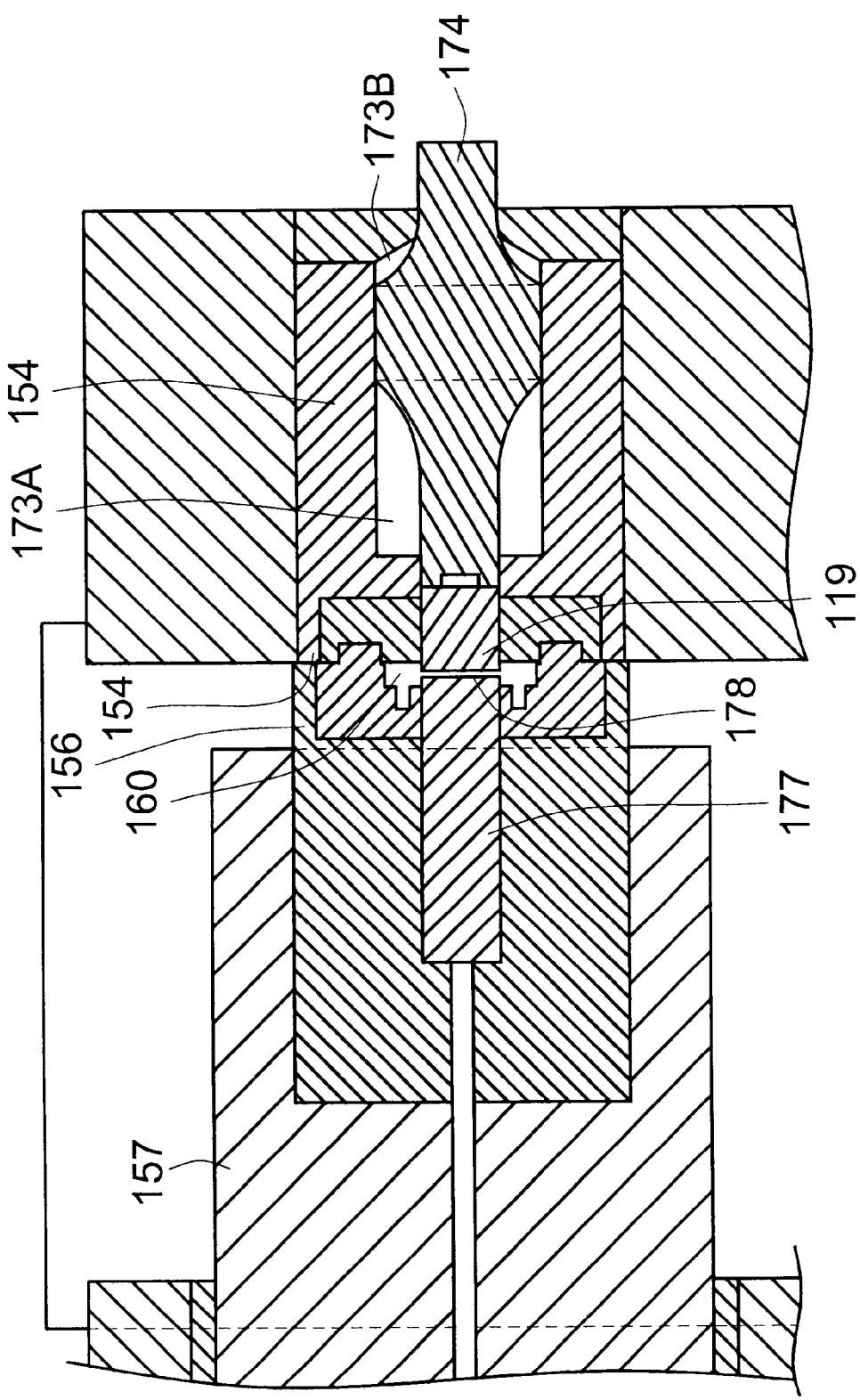
FIG. 32 is an enlarged view similar to FIG. 31, but showing the adiabatic forming assembly just after the second forming cartridge has come into full abutting and mating engagement with the first forming cartridge, and the first and second cartridges are effectively locked together, thereby defining, together with adjacent portions of the blank and adjacent portions of the ejector pin, an enclosed blank forming cavity whose configuration corresponds to the form of a part being formed from the blank.
Figure 33:
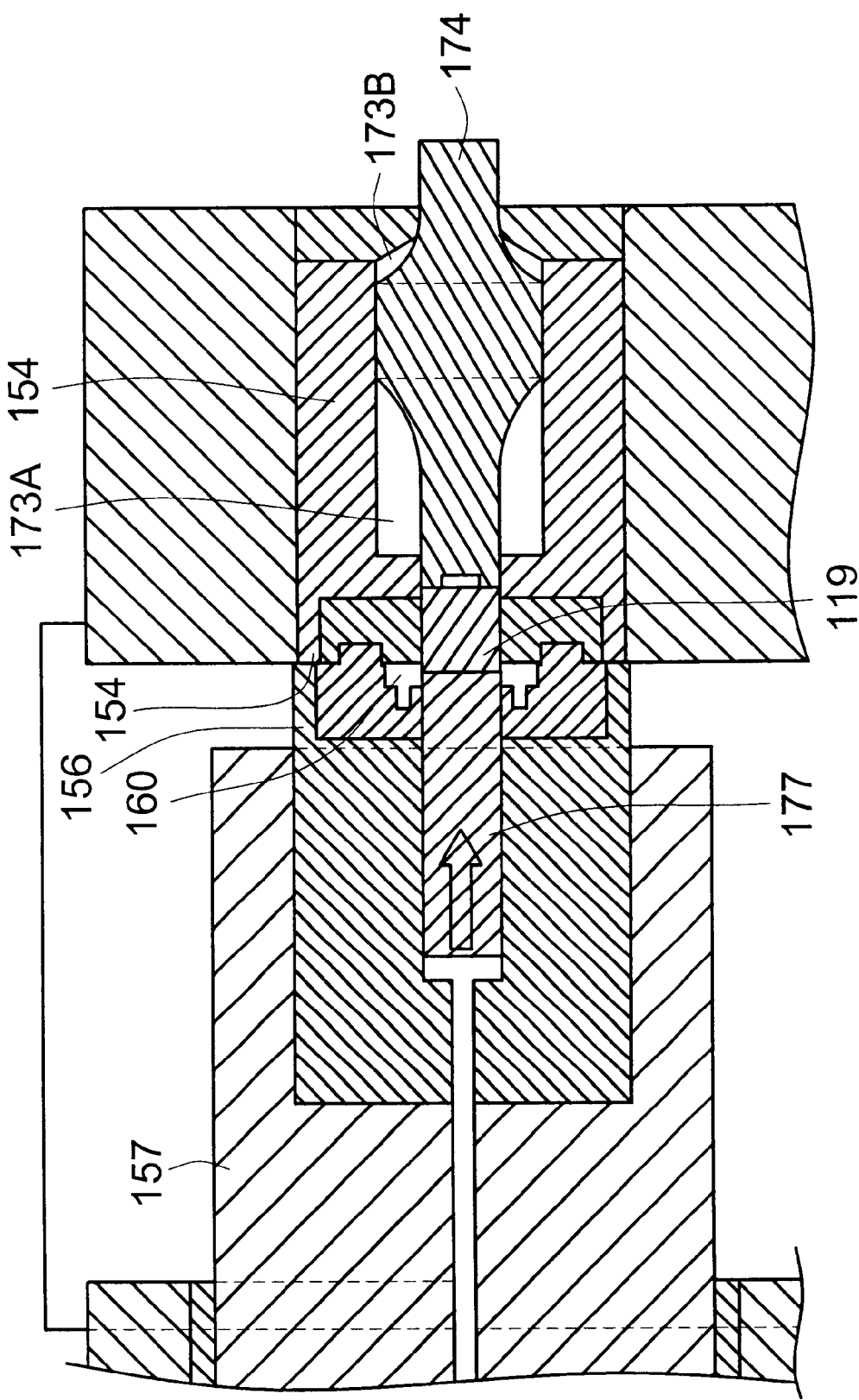
FIG. 33 is an enlarged view similar to FIG. 32, but showing the ejector pin just after it has been axially advanced and abuttingly engaged with adjacent side portions of the blank whereby, in turn, the blank is axially moved to an extent such that opposed side portions of the blank are abuttingly engaged with head end portions of the forming hammer of the adiabatic forming tool assembly.
Figure 34:
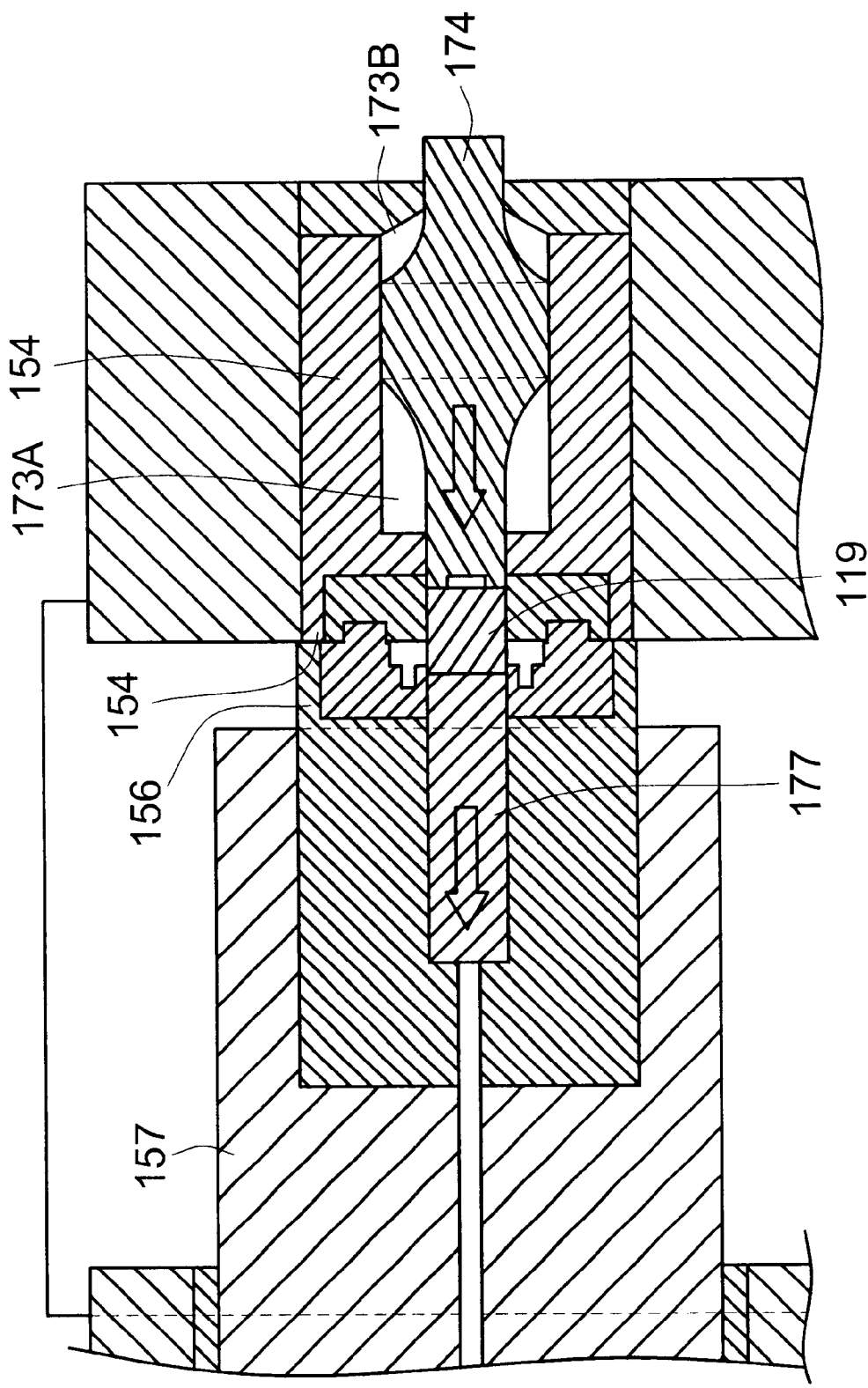
FIG. 34 is an enlarged view similar to FIG. 33, but showing the positions of the ejector pin, the hammer, and the blank just after the hammer has been axially advanced against the opposed resistive pressure being applied by the ejector pin against the blank to an extent sufficient to move the ejector pin back to its starting or stop position with the blank being advanced into the forming cavity.

After the transfer capsule 146 has left position 155 in the adiabatic forming apparatus 150, the movable second forming cartridge 156 of the forming assembly 150 is advanced axially towards the stationary first cartridge 154. The forming cartridge 156 is set axially into the head of an extensible and retractable piston 157. To achieve this advance of cartridge 156, the piston 157 is slidably translated forwardly, as illustrated in FIGS. 30 and 31, an arrow in FIG. 31 indicating the direction of movement of piston 157, until the forward end of the cartridge 156 is abuttingly engaged with the forward end of the cartridge 154, as illustrated in FIG. 32. After the cartridges 154 and 156 become engaged, they are effectively locked together. The moving mechanism employed is below described.

When the cartridges 154 and 156 are engaged, the walls of a forming cavity 160 are generally defined by the cartridges 154 and 156 except for the wall areas defined by the adjacent forward end portions of an ejection pin 177, and also by the adjacent portions of the blank 119, the latter being in opposed relationship to the former. The arrangement is such that initially a gap 178, preferably small, exists between the ejection pin 177 and the blank 119 in the cavity 160 after the cartridges 154 and 156 are engaged and locked.

After the cartridges 154 and 156 are brought into engagement and locked together, the ejection pin 177 is axially advanced into contacting engagement with the adjacent portions of the blank 119, and the blank 119 is thereby moved into contacting engagement with the adjacent forward end portions of an energy transferring hammer 174.

The forming tool hammer 174 is now advanced by applying differential fluidic (preferably pneumatic) pressure into the rearward portion 173B of the enlarged channel 173A/173B. Since the forward end of the hammer 174 has been placed in abutting engagement against the blank 119, and since the pressure exerted by the hammer 174 against the blank 119 is chosen to be greater than the pressure exerted by the ejector pin 177 against the opposite side of the blank 119, the blank 119 and the ejector pin 177 are both moved by the hammer 174 advance. The advance continues until the ejector pin 177 again reaches its initial abutting or seated engagement with the compartmental back wall portion provided in a rearward portion of the second cartridge 156, as illustrated, for example, in FIGS. 35 and 36. At this point in operation, the blank 119 is preferably tight against the first cartridge 154, the forward end of the hammer 174, and the forward end of the ejector pin 177. The ejector pin 177 during this phase of assembly 150 operation acts as an anvil.

Figure 35:
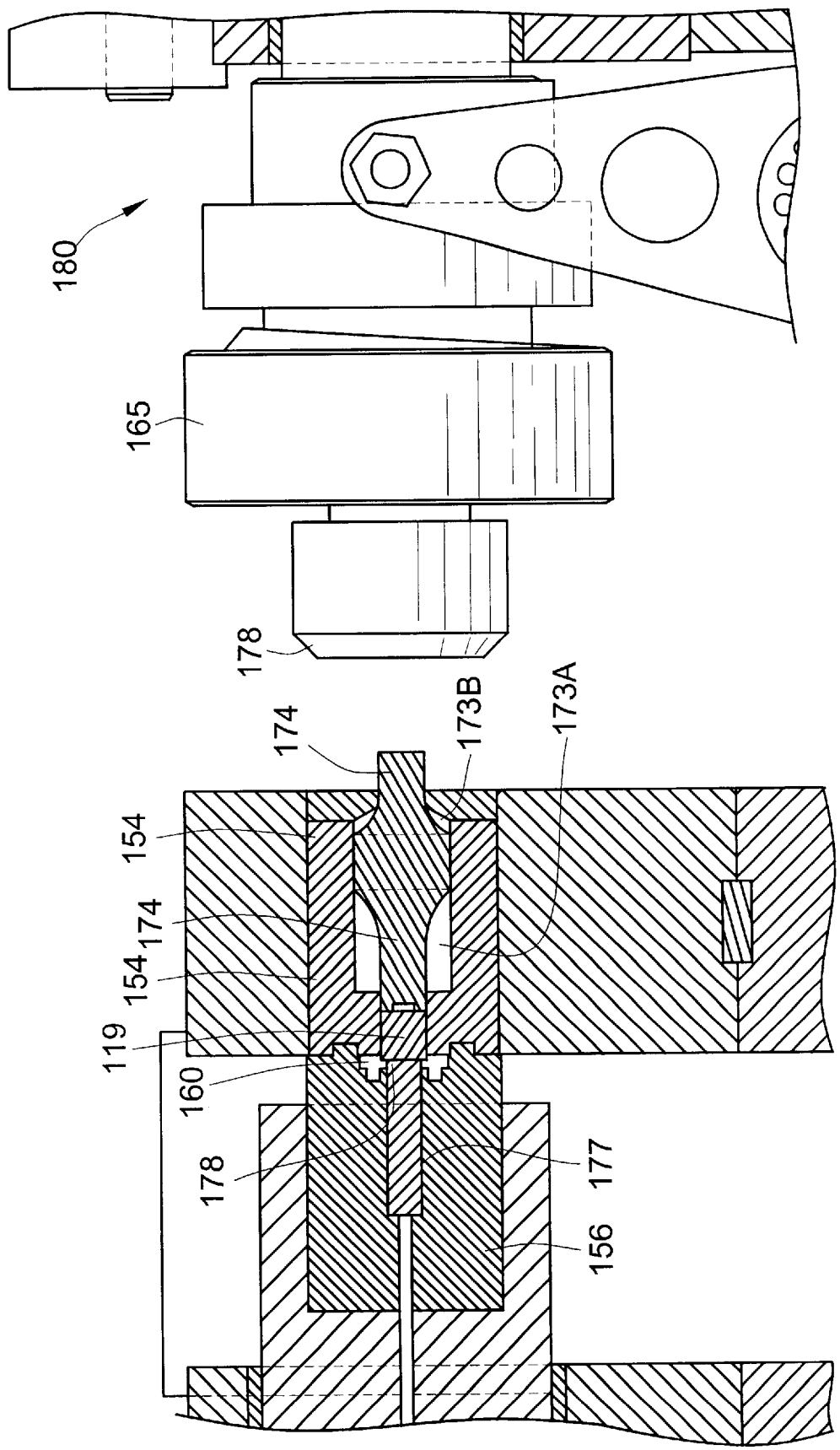
FIG. 35 is a view similar to FIG. 24, but with the adiabatic impact press of the blank forming assembly advanced axially to a position where the forward end of the ram thereof is advanced to a desired spacing distance from the rearwardly projecting striking end of the hammer, this view showing the configuration just before release (or firing) of the ram by the impact press assembly.
Figure 36:
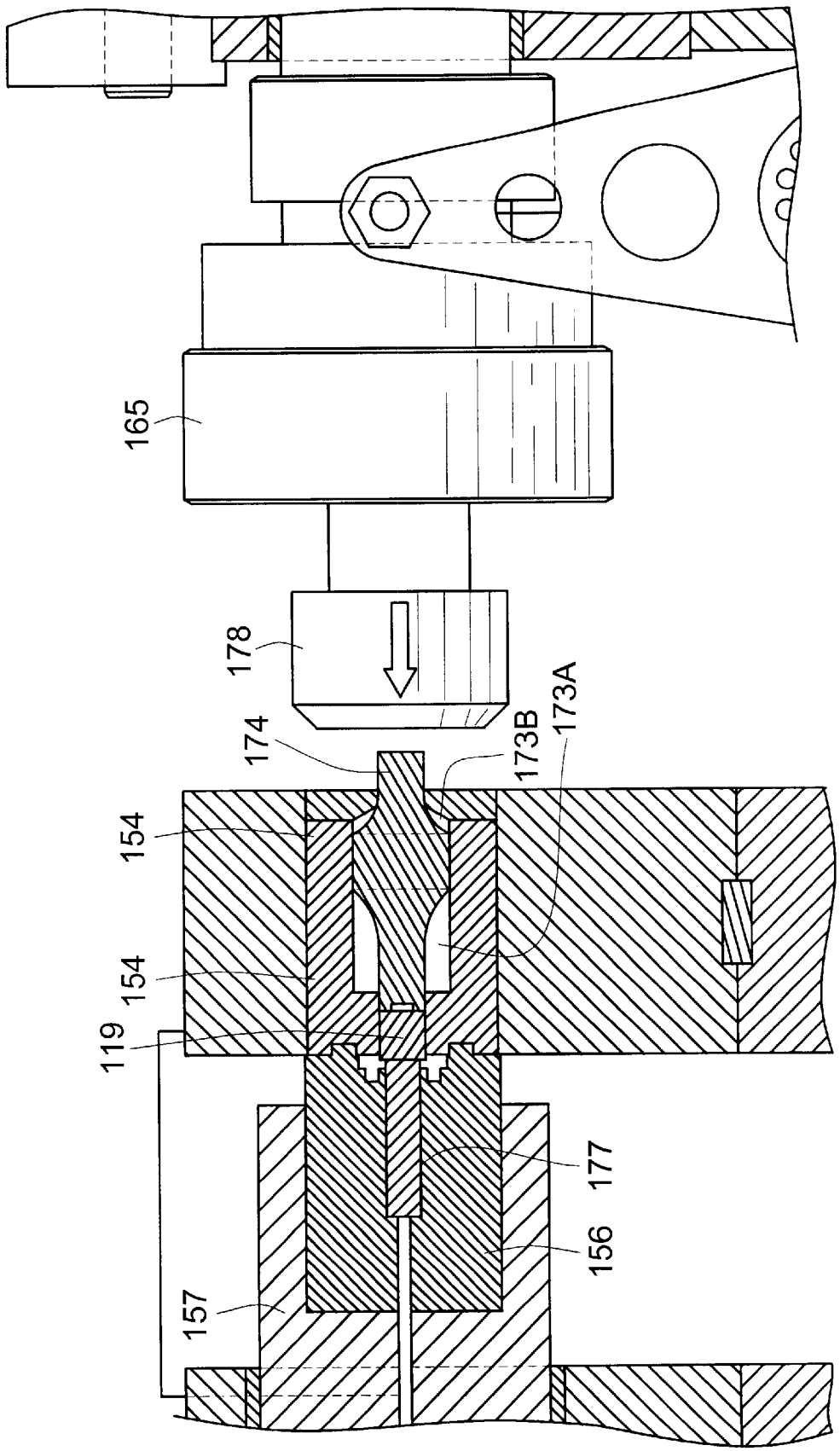
FIG. 36 is a view similar to FIG. 24, but showing the ram flying out at high speed to strike the hammer and impact against the blank.
Figure 37:
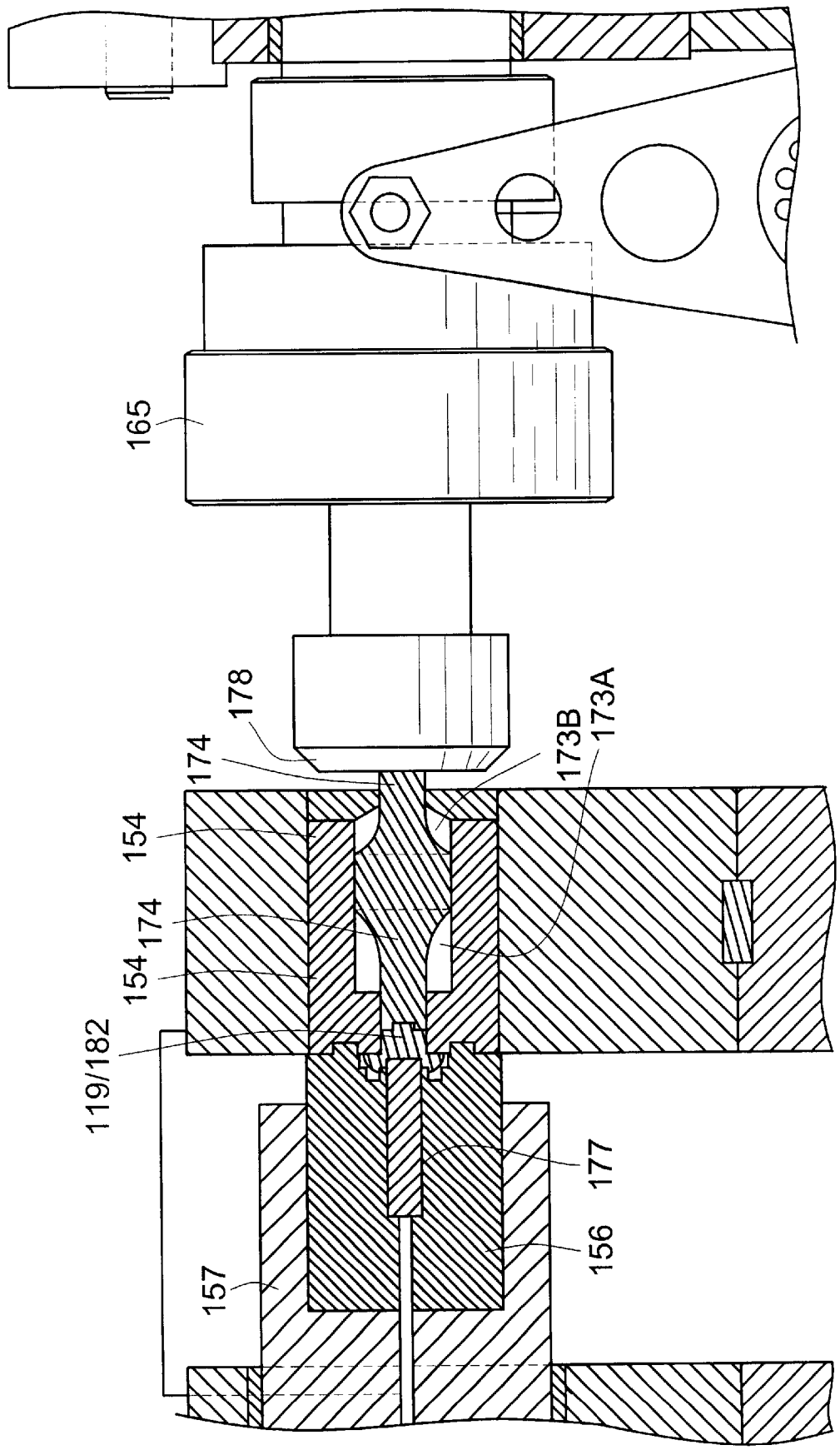
FIG. 37 is a view similar to FIG. 24, but showing the forming hammer after the ram has impacted thereagainst and the blank has been partially formed into a part in the forming cavity, this view showing the configuration just as the power stroke is starting to be applied against the ram.

With the adiabatic forming apparatus 150 in the configuration illustrated, for example, in FIGS. 35 and 36, the ram 178 is fired (released) by the ram operating mechanism 180, as illustrated in FIG. 36. The ram 178 impacts against the hammer 174, as illustrated, for example, in FIG. 37. At this point in operation, the blank 119 is partially formed in the cavity 160 into a part 182, the partially formed body being designated 119/182 in FIG. 37 in less than about one millisecond.

Figure 38:
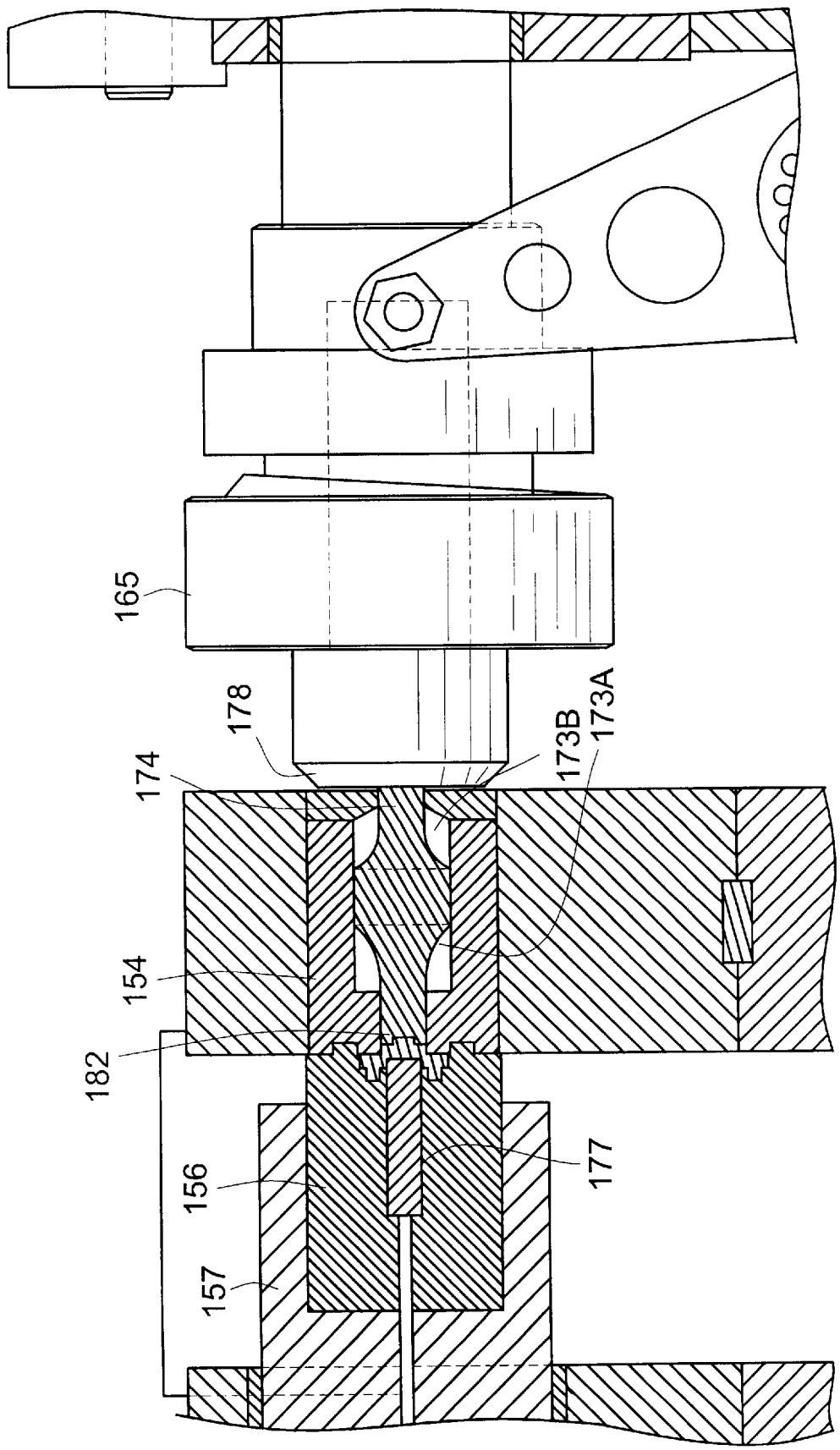
FIG. 38 is a view similar to FIG. 37, but showing the configuration just after the power stroke has been fully applied to the ram so that the ram has advanced and the blank is resultingly formed and filling the forming cavity, thereby achieving a completely formed part.
Figure 39:
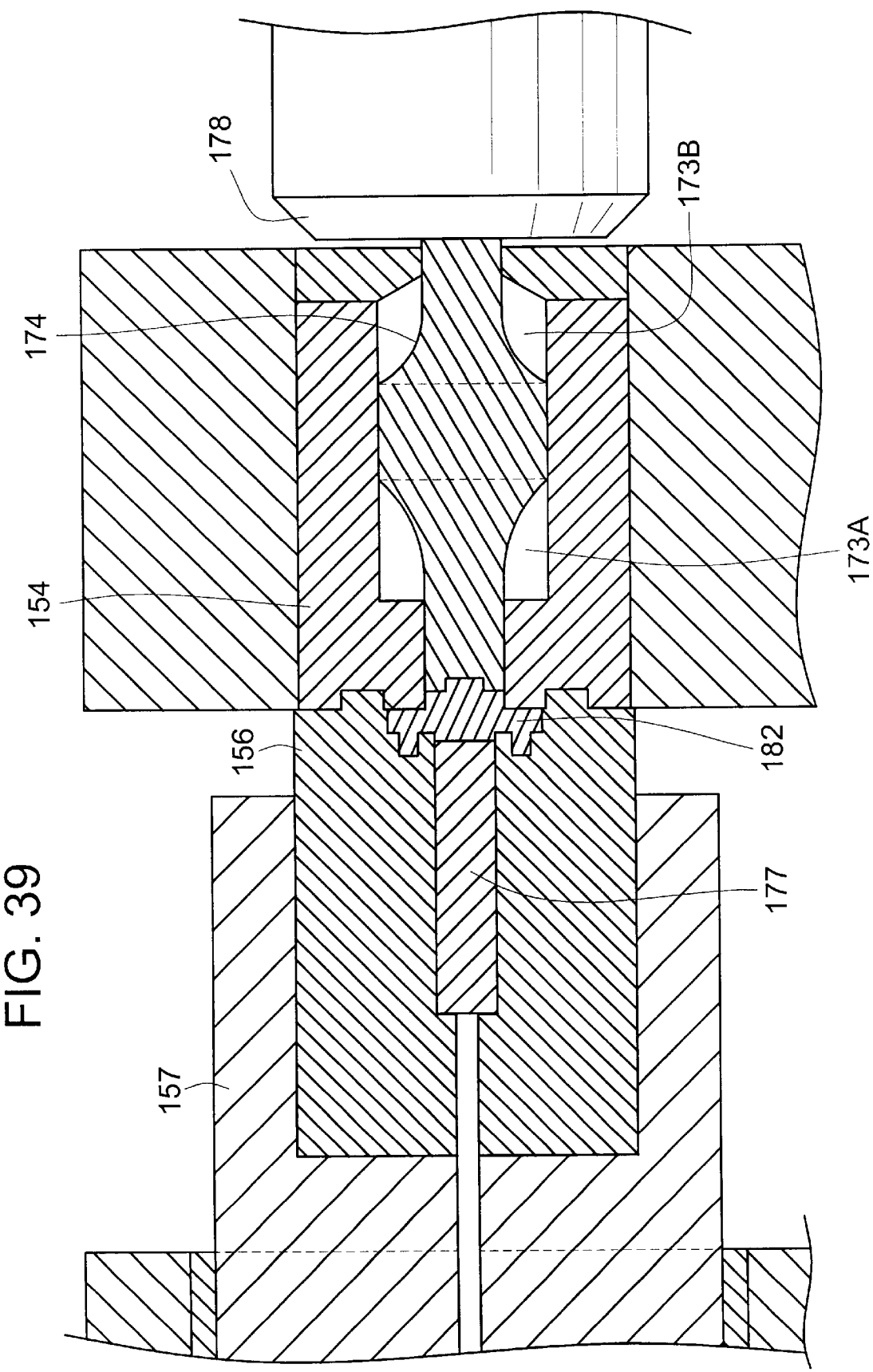
FIG. 39 is an enlarged, fragmentary, detail view similar to FIG. 34, but showing the formed part and contiguous components of the forming assembly as viewed in FIG. 38.

After ram 178 impact, force is applied through and by the ram 178 against the hammer 174 by a mechanism as below described. Within milliseconds after ram 178 impact, and force application, the blank 119 fully is reshaped into conformity with the shaping cavity 160 and thereby is formed into a part 182 that fills the shaping cavity 160 as illustrated in FIGS. 38 and 39. Brief as the forming time is, the blank 119 shaping is progressive into the formed part 182 and can be considered to occur in phases after ram 178 impact. These progressive adiabatic shaping phases are illustrated successively in the sectional views FIGS. 41A through 41E, and in FIGS. 42A through 42E. FIGS. 42A through 42E correspond to the respective FIGS. 41A through 41E.

It should be understood that the process of FIGS. 41B–41D takes less than about one millisecond and creates an instant heat build-up in the blank. On the other hand, the process of FIG. 41E takes a number of milliseconds depending on the RPM of the machine. The force application or power stroke forming to finalize the forming process is done when the metal is already warm or hot and is done very gently.

Figure 40:
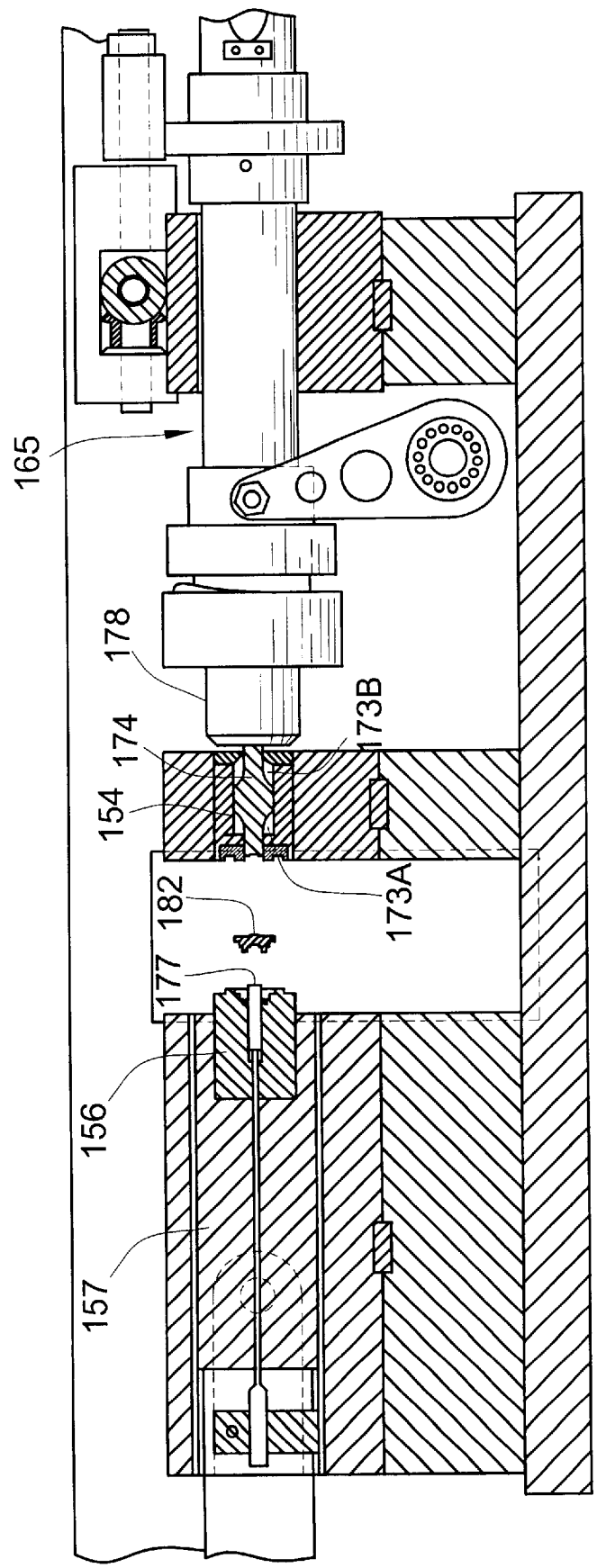
FIG. 40 is a view similar to FIG. 38, but showing the components after their ejection immediately following part formation with the second forming cartridge retracted and separated from the first forming cartridge, the ejection pin fully advanced relative to the second forming cartridge, and the ram fully advanced relative to the first forming cartridge, so that the formed part resulting from the blank is ejected from the first and the second forming cartridges and ejected from the adiabatic forming assembly.

Immediately after the part 182 is thus formed, the cartridges 154 and 156 are unlocked and the second cartridge 156 is separated (retracted) from the first cartridge 154 by retracting the piston 157, as illustrated in FIG. 40. As the cartridges 154 and 156 separate, the ram 178 remains applied to the hammer 174, thereby permitting the hammer 174 to act as an ejector for separating the part 182 from the cartridge 154. Also, concurrently, as the cartridges 154 and 156 separate, the ejection pin 177 is advanced in the cartridge 156 so that the head of the ejector pin 177 is applied against the formed part 182. Thereby, the ejector pin 177 acts as an ejector to separate the formed part 182 from the second cartridge 156. The part 182 is thus separated from the cartridges 154 and 156 and falls into a waiting collection bin (not detailed), or the like, as desired, thereby completing a complete cycle of operation of the adiabatic forming apparatus 150.

(b) Subassembly Structures (1) The Stock Feeder Assembly 101

While various means can be utilized to operated grippers in a stock feeder assembly, the grippers 106, 107, and 108 have jaws which are pneumatically operated responsive to electrical control signals. A similar jaw structure is preferably employed for each gripper.

The grippers 107 and 108 are slidably mounted for horizontal movements along and over respective longitudinally adjacent portions of a pair of lengthwise extending (relative to assembly 101), spaced, parallel rails 259 and 260 (see FIG. 13 or FIG. 14) that are associated with the top deck 222.

Figure 14:
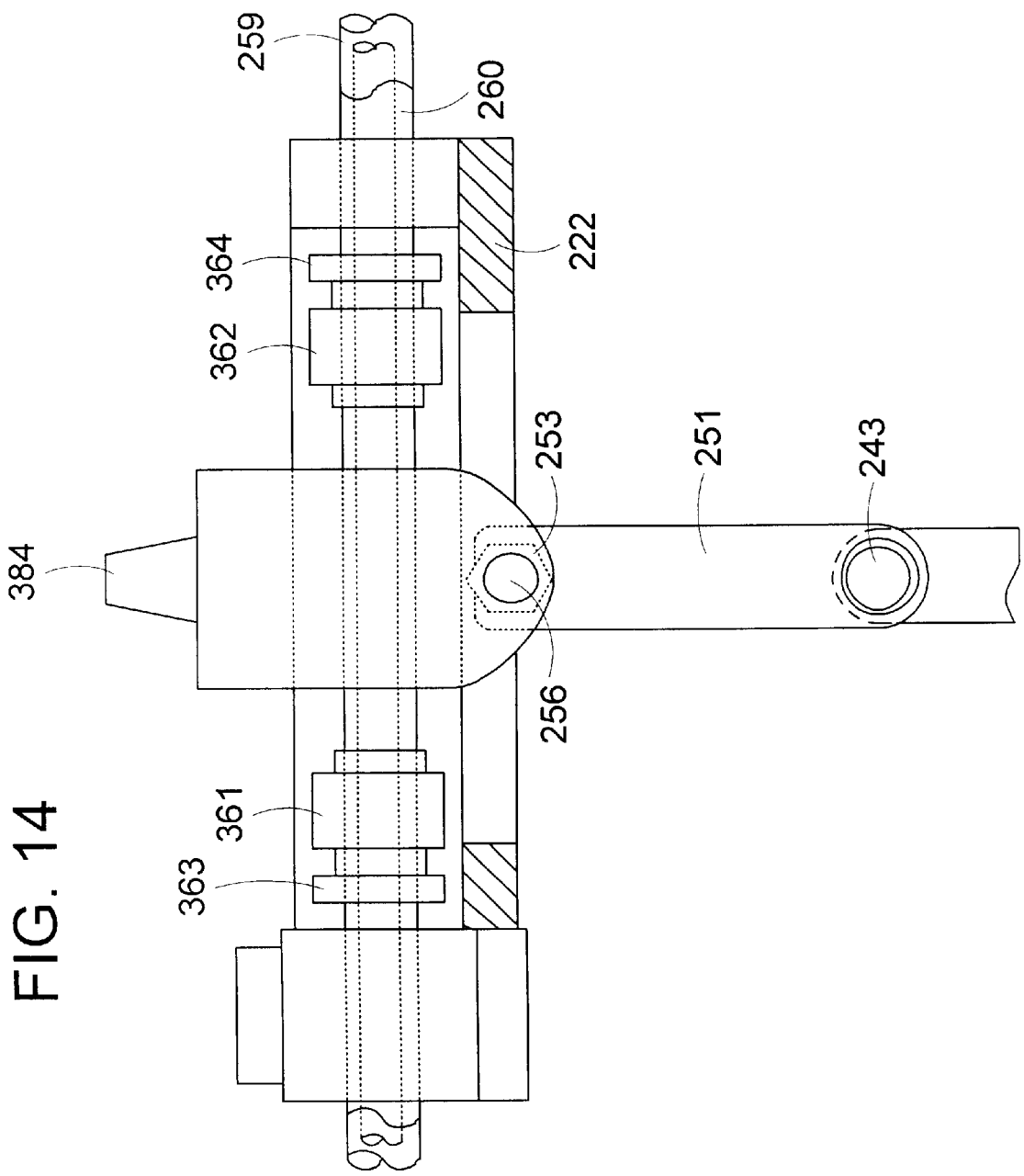
FIG. 14 is a fragmentary side elevational view of the second movable gripper, some parts being broken away and some parts being shown in section.
Figure 15:
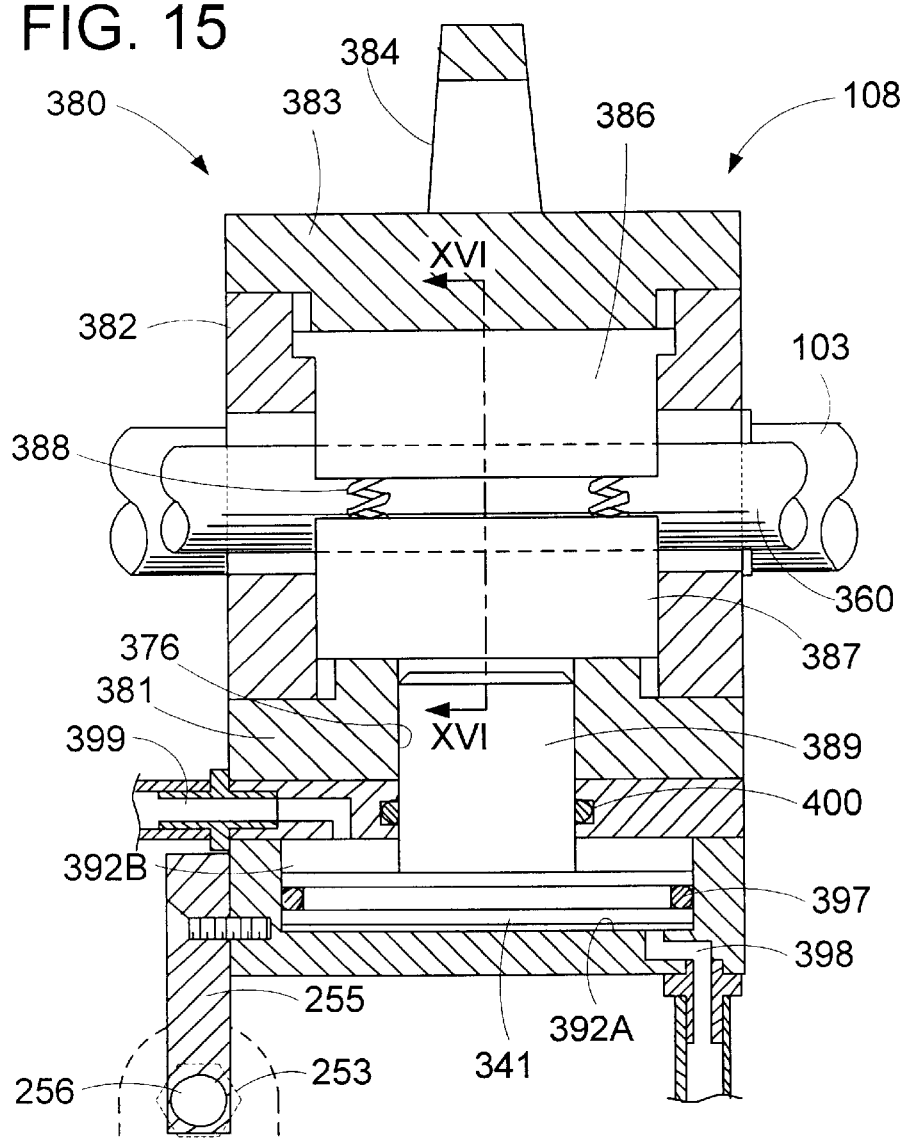
FIG. 15 is a fragmentary longitudinal vertical sectional view through the second movable gripper, some parts being broken away and some parts being shown in section.

The structure of the gripper 108 is illustrative and is seen in FIGS. 14 and 15. Gripper 108 incorporates a frame structure 380 which includes a base plate 381, a side and end wall combination 382, and a cap plate 383 that is equipped with a handle 384 for convenience in removal and reassembly when access to the interior of the side and end wall combination 382 is desired. The components of the frame structure are affixed together with machine screws (not shown) or the like.

Three pairs of aligned channels are defined in each of the opposed end walls of wall combination 382. Through an outside pair of channels, rail 259 slidably extends and rail 260 extends through the opposite outside pair of channels so that the gripper is slidably mounted on the rails 259 and 260. Through the medial pair of aligned channels is extended a feedstock 103.

Figure 16:
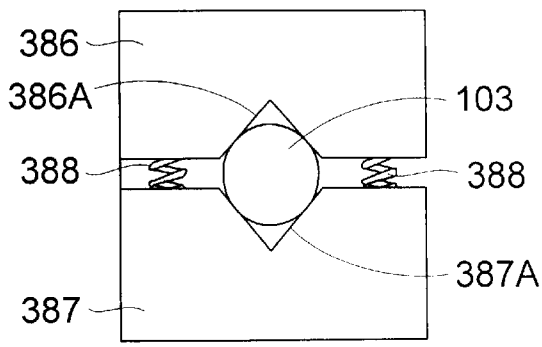
FIG. 16 is a fragmentary transverse vertical elevational view taken approximately along the line XVI—XVI of FIG. 15 showing the jaws of the second movable gripper.

The gripper 108 utilizes a pair of jaws comprising an upper stationary jaw 386 and a lower movable jaw 387 that is vertically reciprocatable within the frame structure 380. During the jaw 387 movements, edge wall portions thereof are guided by adjacent portions of the wall combination 382. The upper jaw 386 is supported in, nestably received in, and held by, the frame structure 380. The lower face of upper jaw 386 and the upper face of the lower jaw 387 are each generally flattened and normally these faces are in opposed, spaced, parallel relationship relative to each other. However, a matching groove 386A and 387A is defined in each of the upper and lower faces, respectively, and the grooves 386A and 387A are adapted to accommodate side surface portions of feedstock 103 when the feedstock 103 is extended therethrough. A plurality of coiled springs 388 extend generally vertically between the jaws 386 and 387 in opposed facial pockets (not shown). The springs 388 bias the lower and upper faces of the jaws 386 and 387 into a normally spaced relationship and the springs 388 aid in maintaining a uniform spacing between these upper and lower faces. When the jaws 386, 387 are in an open configuration, such as shown in FIG. 16, the jaws 386 and 387 are slidably movable relative to the feedstock 103, or vice versa. When the jaws 386, 387 are placed in a closed configuration, achieved by upward movement of the lower jaw 387, the feedstock is grasped or clamped between the jaws 386, 387.

To achieve controllable movement of the lower jaw 387, the central region of the lower face of the lower jaw 387 is associated with the upwardly projecting, outer end portion of a shaft 389. The lower end portion of the shaft 389 is associated with a piston 391. The piston 391 is reciprocatorily generally vertically movable (as shown in FIG. 15) in the longitudinally shallow chamber 392A/392B of a cylinder 393. The upper end of the cylinder 393 is provided by a top plate 395 having a central aperture 396 through which the shaft 389 slidably extends. The lower end and side walls of the cylinder 393 are provided by a mug-like structure 394. Sealing means, such as an o-ring 397 extending circumferentially around a groove in the piston 391, and an o-ring 400 extending circumferentially around a groove in the aperture 396, is provided. Access to the lower chamber portion 392A is provided by channel 398 and access to the upper chamber portion 392B is provided by a channel 399. When chamber 392A is pressurized with a compressed fluid, such as air or the like, the piston 391 and shaft 389 are elevated, raising the lower jaw 387 and achieving closure of the jaws 386, 387. When chamber 392B is similarly pressurized, the piston 391 and shaft 387 are lowered, lowering the lower jaw 387 and achieving opening of the jaws 386, 387.

As discussed below in reference to the control system and FIG. 47, the combination of cylinder 393, piston 391 shaft 389 and channels 398 and 399 can be regarded as a pneumatic cylinder 307. Similarly, each of grippers 106 and 107 can be regarded as incorporating pneumatic cylinders 301 and 302.

To limit movement of the gripper 108 along the rails 259 and 260, stop blocks 361 and 362 are provided, each one being slidably movable on the rails 259 and 260, and each one being on a different side of the gripper 108. Each block 361 and 362 is provided with an adjustable collar 363 and 364 that is threadably engaged with its associated block and that is adapted to clamp adjustably circumferentially adjacent portions of the rails 259 and 260.

The movable gripper 107 is similarly provided with stop blocks. The stationary gripper 106 has a structure like that of the movable gripper 108 except that the stationary gripper 106 is mounted in an inverted orientation and is fixed to the frame 104.

Figure 17:
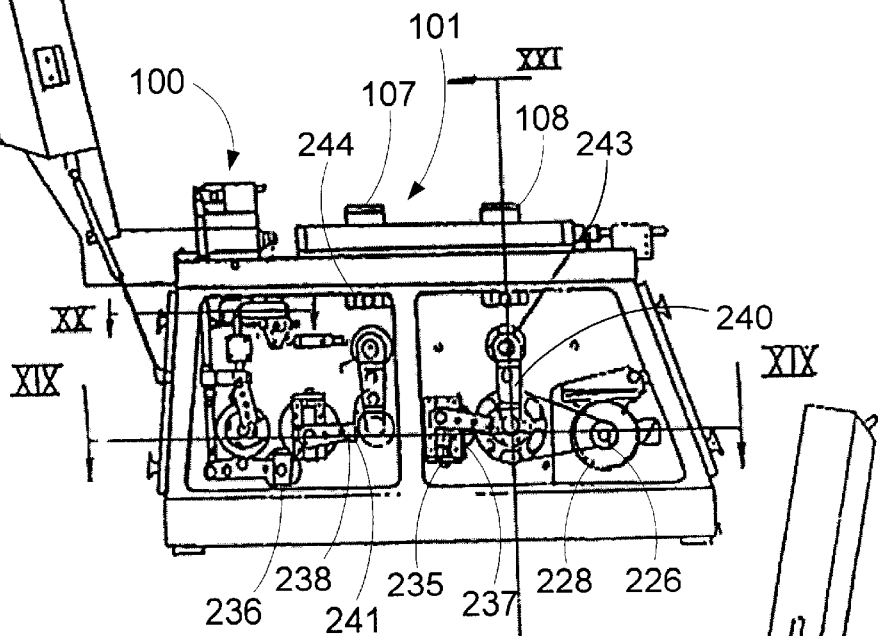
FIG. 17 is a side elevational view of the cut-off assembly including the adiabatic impact press assembly and stock feeder assembly in a common housing and interconnected together by their common drive mechanism, the common housing top cover being in its fully open position and the two side covers being removed.
Figure 18:
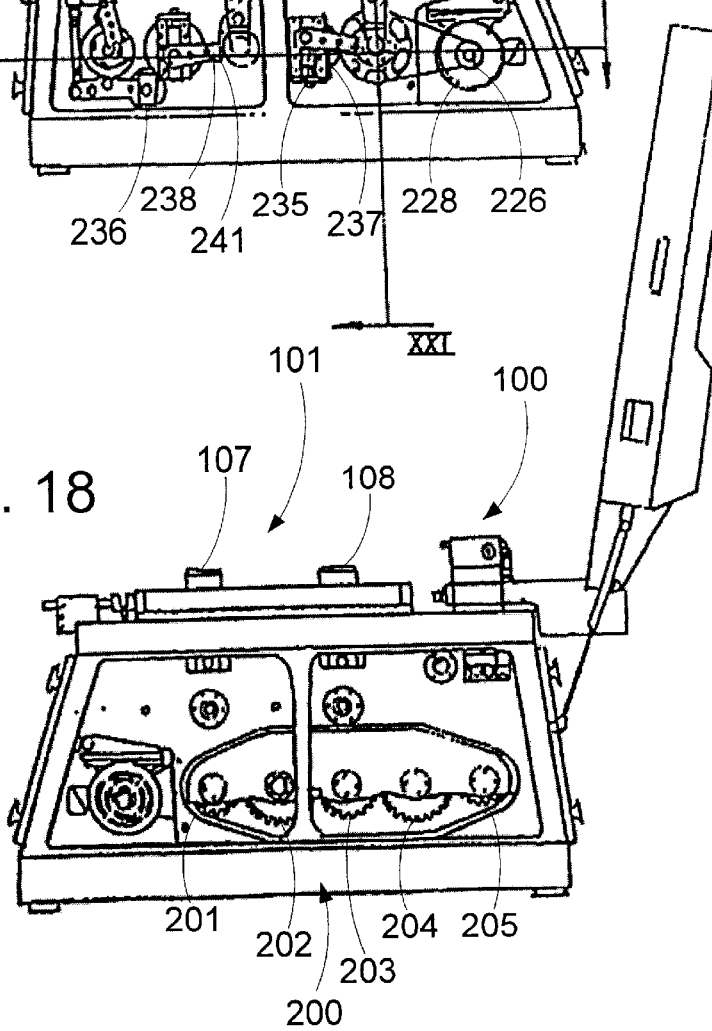
FIG. 18 is a side elevational view of the opposite side of the combined impact press assembly and stock feeder assembly (relative to FIG. 17), the common housing top cover being in its fully open position and two side covers being removed.
Figure 19:
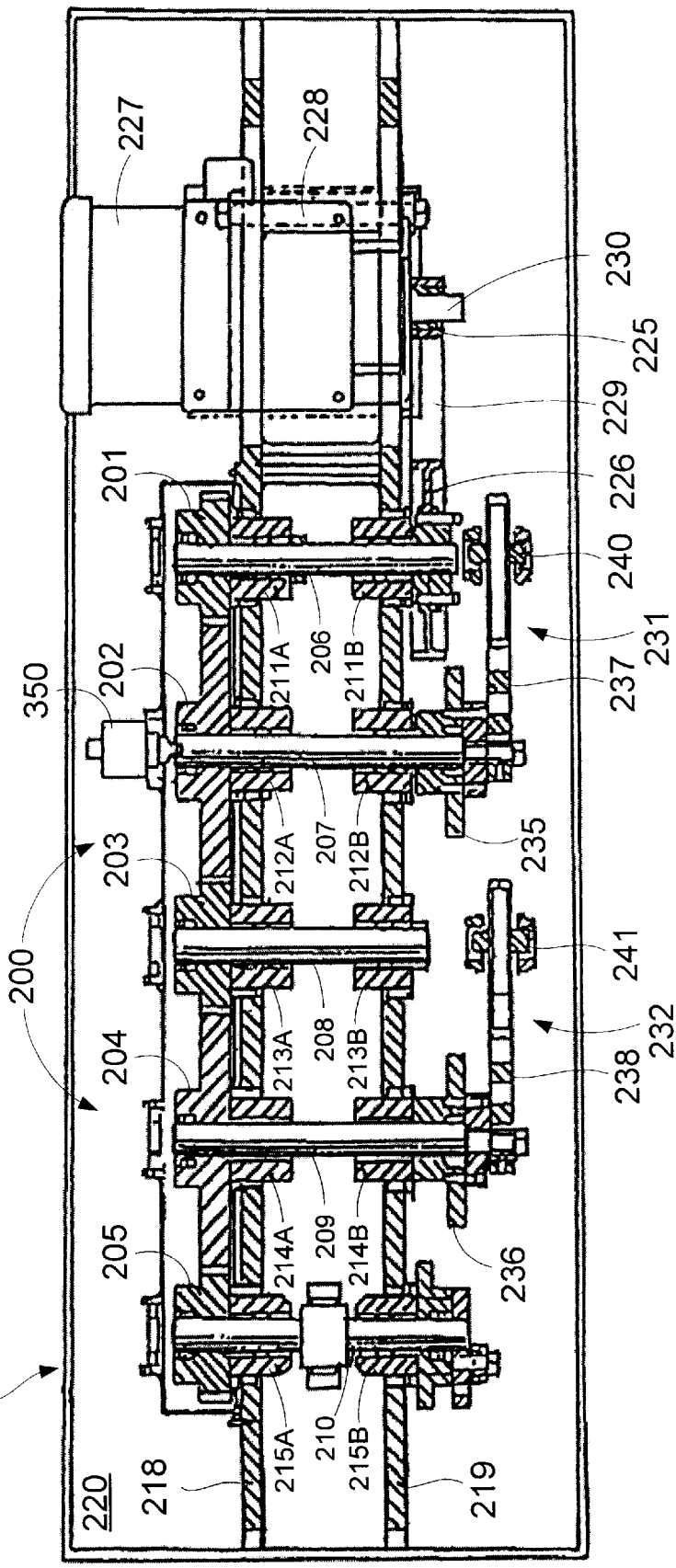
FIG. 19 is a horizontal sectional view through the common drive mechanism of the adiabatic cut-off assembly taken approximately along the line XIX—XIX of FIG. 17.
Figure 20:
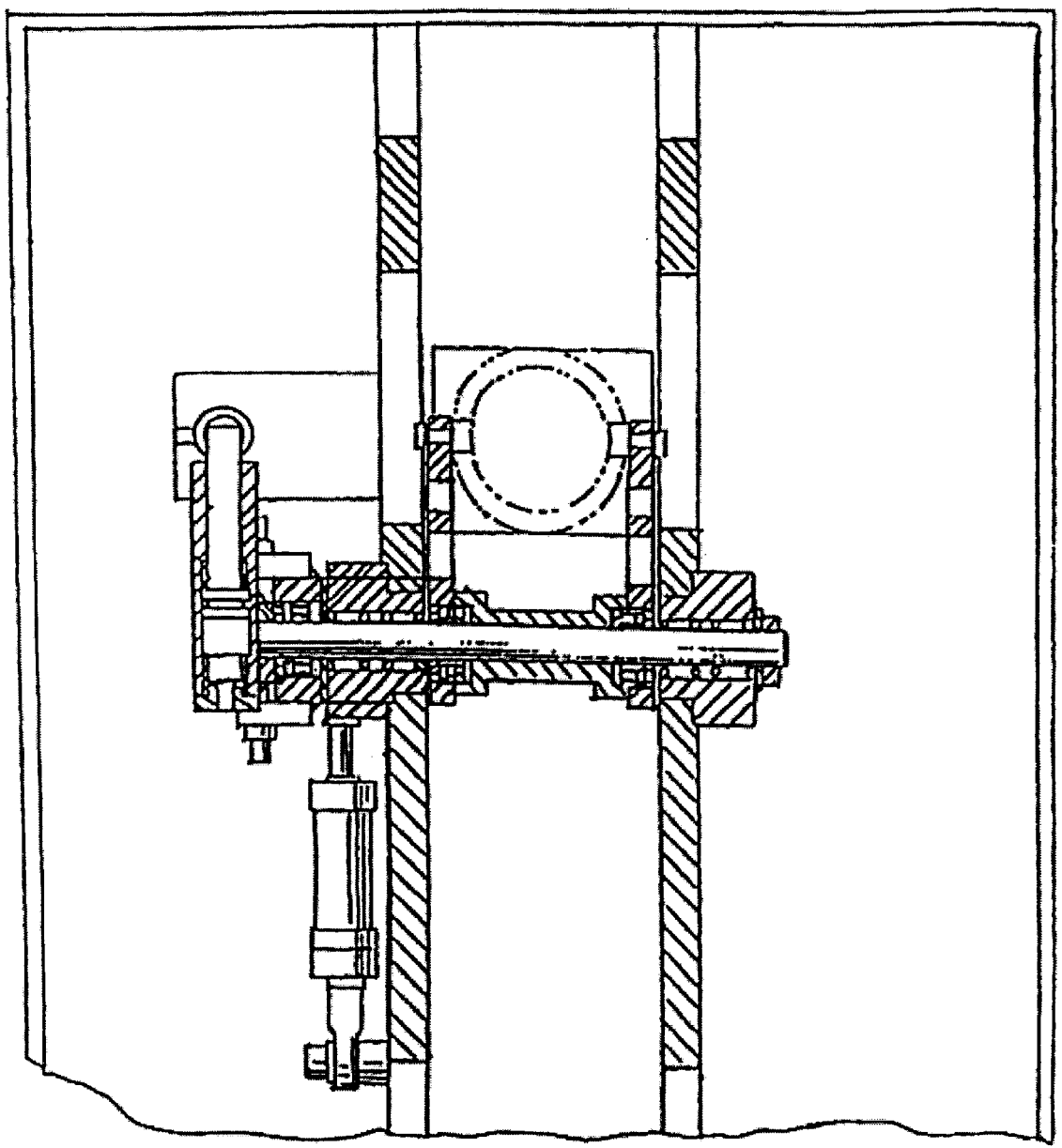
FIG. 20 is a fragmentary horizontal sectional view through the trigger assembly taken approximately along the line XX—XX of FIG. 17.
Figure 21:
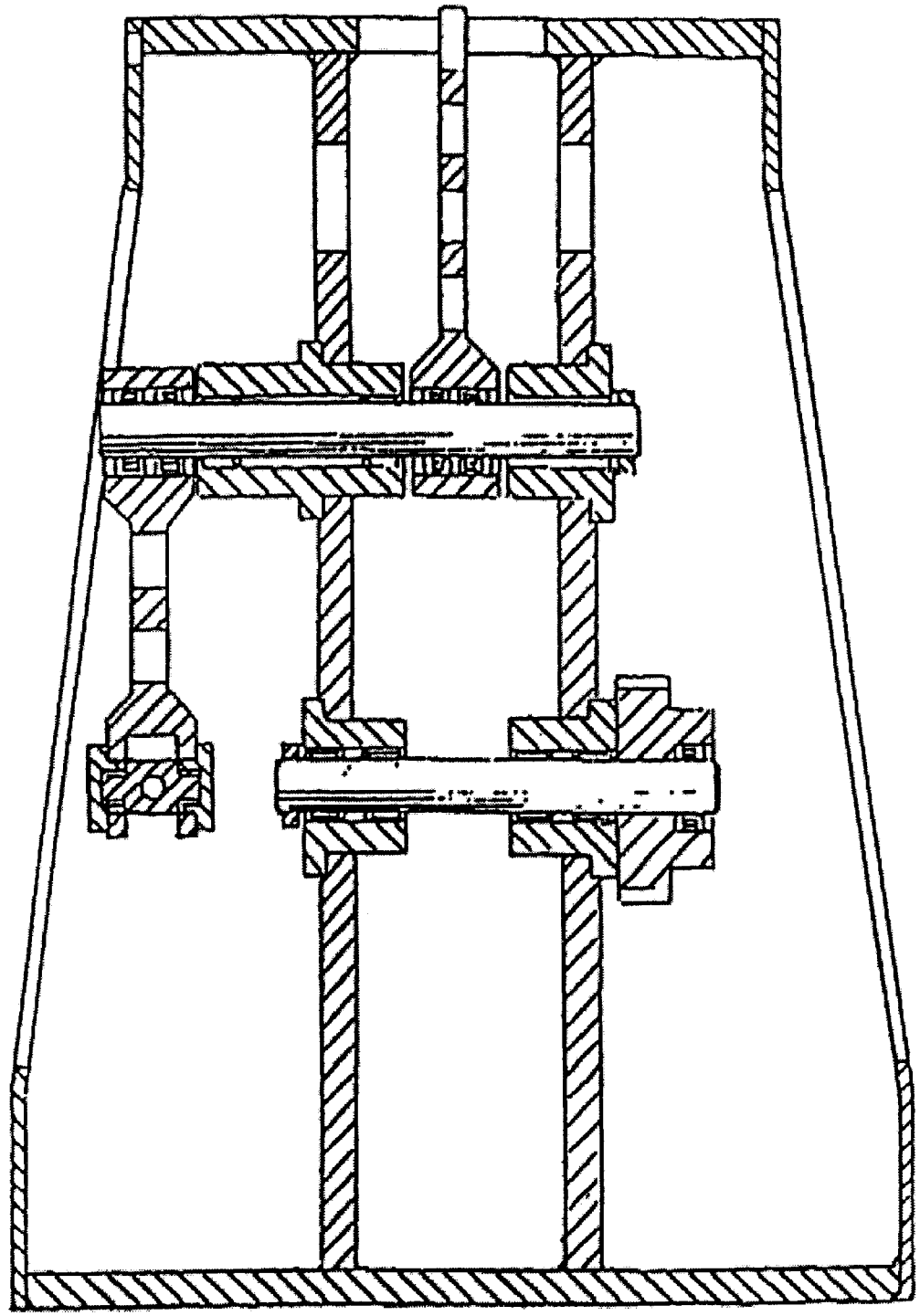
FIG. 21 is a fragmentary horizontal sectional view through the feed arm assembly taken approximately along the line XXI—XXI of FIG. 17.

As shown, for example, in FIGS. 14 and 15, to automatically operate and control the reciprocal movements of the grippers 107 and 108, and to coordinate movements associated with the actuations of the impact press apparatus 100 and the desired progressive locations of feedstock 103 as feedstock 103 is moved in a stop and go fashion by the stock feeder assembly 101 during operation of assembly 101 and apparatus 100, various means can be employed. Here, it is presently preferred to employ a gear train 200 that is here, as shown in FIGS. 17, 18 and 19, illustratively but preferably comprised of five peripherally and successively interengaged gears 201, 202, 203, 204, and 205 having horizontally spaced, parallel respective axes of rotation. Each such gear is keyed to a proximal end portion of a similar shaft 206, 207, 208, 209, and 210, respectively. Each such shaft is journaled for rotational movements along and adjacent its respective opposite end portions by a pair of bearings 211A and 211B, 212A and 121B, 213A and 213B, 214A and 214B, and 215A and 215B, respectively.

The frame 104 is provided with a pair of spaced, parallel support plates 218 and 219 that upstand from a generally horizontally oriented base plate 220 and that extend lengthwise under the top deck 222 (see, for example, FIG. 3) of the frame 104. The plates 218 and 219 are each provided with five apertures 223 that are transversely aligned with one another in paired fashion whereby each member of the bearing pairs 211A and 211B, 212A and 212B, 213A and 213B, 214A and 214B, and 215A and 215B is mounted in axially aligned relationship with the other. Thus, the shafts 206, 207, 208, 209, and 210 extend between the plates 218 and 219 in spaced, parallel relationship to one another and each such shaft is supported by both plates 218 and 219. The gears 201, 202. 203, 204, and 205 are conveniently covered by a protective housing 224 that is conventionally mounted to plate 218 by machine screws or the like, not detailed.

A crank shaft assembly 226 is keyed to the distal end of shaft 206. An electric motor 227 and associated transmission 228 (conventional assembly) is supported through the plates 218 and 219 in spaced adjacent parallel relationship to shaft 206, and a drive crank shaft 225 on the power output shaft of the transmission 228 is connected by a drive belt 229 to the crank shaft 226 whereby the motor 227 when operating can rotatably drive the shaft 206 and thereby revolve each of the gears 201 through 205 and their associated shafts 206 through 210. The gear 201 is identical to the gear 203 and the gear 205, while the gears 202 and 204 are identical to each other. The rotational speed of the individual shafts 206 through 210 is thus precisely controlled by the motor 227 and the transmission 228. Gear 203 serves as an idler gear, gears 202 and 204 each drive a crank assembly 231 and 232, as hereinbelow described, and gear 205 drives the impact press apparatus 100.

To the distal end of each of the shafts 207 and 209 is connected an adjustable crank shaft 235 and 236, respectively. Each crank shaft 235 and 236 is eccentrically rotatably connected to a first crank arm 237 and 238, respectively. Each terminal end of each crank arm 237 and 238 is rotabably connected to a terminal yoke of a second crank arm 240 and 241, respectively. The initial end of each second crank arm 240 and 241 is rotatably connected to a pivot shaft 243 and 244, respectively, that is journaled by aligned bearing pairs (not detailed) each one mounted in a different aligned aperture one in each of the plates 218 and 219. Hence, rotation of the crank shafts 235 and 236 is translated into an oscillatory, or pivotal movement by each of the pivot shafts 243 and 244. Each of the pivot shafts 243 and 244 is keyed to the lower end of an oscillator arm 251 and 252, respectively, as shown in FIG. 3, for example. The upper end of each oscillator arm 251 and 252 is provided with a shallow channel 253 and 254, respectively, that extends inwards and lengthwise into the associated oscillator arm 251 and 251. A stub shaft 256 projecting outwardly from a downturned leg 255 of gripper 108 slidably connects with the channel 254, and a stub shaft 257, similar to gripper 108, of gripper 107 slidably connects with the channel 253.

Hence, as the pivot shafts 243 and 244 oscillate, the oscillator arms 253 and 254 are caused to move pivotably relative to their shafts 243 and 244, and this pivot action moves the grippers 107 and 108 back and forth along respective portions of the rails 259 and 260.

Those skilled in the art will readily appreciate that different ranges of movement and position for each movable gripper 107 and 108 are achieved by adjustments and settings of, respectively, the crank assembly 231, comprised of crank shaft 235, crank arm 237, crank arm 240, pivot shaft 243 and oscillator arm 251, and the crank assembly 232, comprised of crank shaft 236, crank arm 238, crank arm 241, pivot shaft 244, and oscillator arm 252.

The stock feeder assembly 101 can, if desired, be operated without usage of the stationary gripper 106 as when, for example, the feedstock 103 can be advanced or retracted without slippage by using only the first movable gripper 107 and the second movable gripper 108. In such an operating mode, the stationary gripper 106 can either be left in an open and non-gripping configuration or in an inoperative configuration during apparatus 100/101 operation using only the movable grippers 107 and 108 for feedstock feeding. Alternatively, the stationary gripper 106 can be separated from, or absent from, the stock feeder assembly 101, if desired. The operating sequence in assembly 101 using just the movable grippers 107 and 108 is illustrated in FIGS. 12A, 12B, and 12C. These FIGS. show progressive positions of the movable grippers 107 and 108 being used without a stationary gripper 106. Their respective gripping functions corresponds to that above described when using the stationary gripper 106. Thus, the stock feeder can be operated with either two movable grippers or one stationary gripper and two movable grippers.

When using two movable grippers, with the stationary gripper 106 inactivated or absent, operation of stock feeder apparatus 100 is as follows: First movable gripper 107 clamps the feedstock 103. Gripper 107 has been advanced to a full forward position. The gripper 107 has already advanced the feedstock 103 to a predetermined position desired for cut-off by impact press apparatus 100.

After the ram 116 is fired, and the blank 119 is cut off, the first movable gripper 107 releases the feedstock 103 and the second movable gripper 108 grasps the feedstock 103, as shown in FIG. 8. The first movable gripper 107, after release of the feedstock 103, translates backwards to a predetermined rearward-most location along the pathway of feedstock 103 travel.

The second movable gripper 108, while clamping the feedstock 103, advances the feedstock 103 to a predetermined extent that is sufficient to push and move the blank 119 forwardly completely out of the stationary die block 109 and into a predetermined position which, in the system 99, is a position in the transfer capsule 146.

Thereafter, the second movable gripper 108, while still gripping the feedstock 103, retracts the so clamped feedstock 103, and moves it backwards along the feedstock travel pathway to an extent sufficient to place the feedstock 103 forward end about at the parting plane 155, as shown in FIG. 10. At this configuration, the second movable gripper 108 is either at or near its point of rearward-most travel, depending upon apparatus adjustments.

The first movable gripper 107 now clamps the feedstock 103 and the second movable gripper 108 releases the feedstock 103. The first movable gripper 107 now advances the feedstock 103 to place the forward end region of the feedstock 103 in the desired position for blank 119 cut off by impact press apparatus 100, thus completing one cycle of operation of the grippers 107 and 108 in assembly 101.

As shown by the arrows indicating directions of movable gripper 107 and 108 translation in FIGS. 12A, 12B, and 12C, during operation of the assembly 101, during the sequence of stock feeder assembly 101 operation, these grippers 107 and 108 exert their respective feedstock 103 gripping functions as they move reciprocatorily along the feedstock 103 travel pathway in seemingly opposite directions relative to one another.

(2) The Adiabatic Impact Press Assembly 100

The impact press apparatus 100 is comparable to the assembly shown in Lindell U.S. Pat. No. 4,470,330 and U.S. Pat. No. 4,245,493, the teachings of which are incorporated here by reference. However, particularly because of distinctions and improvements provided in the apparatus 100, compared to the '330 patent teachings, an abbreviated description of the structure and operation of apparatus 100 is here provided.

Referring to FIG. 4, the apparatus 100 is seen to incorporate a pair of die blocks 109 and 111 which have adjacent flat faces that are in planar but translatable engagement each relative to the other. Each has a bore 112 and 113, respectively, therethrough, and these bores 112 and 113 are normally in coaxial alignment. The die blocks 109, 111 define along and across their adjacent faces a parting plane 115. In operation, as above indicated, the feedstock 103 is advanced through the bores 112 and 113. Die block 109 is stationary while die block 111 is adapted for limited movement in a direction transverse to its bore 113 and to feedstock 103. A lower side portion of the die block 111 is associated with a head end of an energy-transferring forming hammer 114. The hammer 114 projects outwardly and downwardly from die block 111 and the outer exposed end of the hammer 114 is adapted to be impacted by a ram 116.

The apparatus 100 incorporates a ram 116 and an associated ram operating mechanism 120. The ram 116 is vertically reciprocal and is driven by mechanical means (not shown) of the ram operating mechanism 120 as described in Lindell U.S. Pat. No. 4,470,330.

The apparatus 100 includes an housing 122 in which the die blocks 109 and 111 are associated and which guides and limits the movements of the die block 111. The housing 122 herein collectively refers to components which cooperate and which are held together by screws or the like, not shown. The housing 122 includes a base plate 123 that is mounted to the frame 104. Base plate 123 conveniently is associated with a pair of clamping blocks (not shown) that hold a stationary spacer block 117 which retains and guides the die blocks 109 and 111 in housing 122. The housing 122 also includes a lower and an upper cap block 126, 127, respectively, and an internally threaded sleeve member 129. A cylindrical, externally threaded adjustment screw 128 threadably engages the sleeve member 129. Screw 128 is located upstream (relative to the path of travel of feedstock 103) of the die blocks 109 and 111 and the spacer block 117, and screw 128 acts to hold the blocks 109, 111, and 117 in association with each other. An internally threaded split ring clamp 124 is secured against the outer end of the sleeve member 129. Tightening of screw means (not shown) relative to clamp 124 enables the exact position of screw 128 to be maintained. A guide bushing 118 is associated with the central longitudinal region of screw 128. The bushing 118 and the spacer block 117 are each provided with an axial channel whose diameter is larger than the diameters of the bores 112 and 113.

The housing 122 is associated with a positive die return subassembly 121 that includes the upper cap block 127. A cam guide block 133 seats against layer 132 and block 133 has a downwardly facing inclined cam surface 134. The subassembly 121 also includes the lower cap block 126 which holds a transfer block 136 that is slidably guided therein for transverse movements relative to the bores 112 and 113. A cam 137 is slidably guided in the housing 122 over transfer block 136 for lateral movements between a first position which is adjustable, as shown in FIG. 4, and a second position as shown in FIG. 5. The transfer block 136 is biased by a set of springs 138 which yieldingly urge the transfer block 136 against the bottom of cam 137 and hold the cam 137 against the cam surface 134. A small space 139 is retained between the movable die block 111 and the transfer block 136.

The size of this space 139 is regulated by the extent that the cam 137 is laterally retractable from its normal rest position shown in FIG. 4 to a position such as illustrated in FIG. 5. To enable the cam 137 to be reciprocated during operation of the apparatus 100 between a first position, as shown in FIG. 4, that permits limited movement of the die block 111, and a second fixed position shown in FIG. 5, where the space 139 is consumed, the positive die return subassembly 121 is provided. The position of the cam 137 causes die block 111 movement to terminate and any excess energy is absorbed by the housing 122 in the region of the cam surface 134. A shaft 141 provided which is rockable relative to the housing 122. A crank arm (not shown) is adjustably secured to the shaft 141. An adjustable stop (not shown) limits travel of shaft 141 in a clockwise direction, thereby limiting the amount of retraction in cam 137.

The reciprocably driven ram 116 also drives a transversely extending rod (not shown) in a suitably synchronized manner. The crank arm is secured to the rod and is rocked thereby. Shaft 141 is keyed to one end of a link 142 that is hinged at its opposed end to one end of a second link 143. The opposite end of link 143 is pivotally connected to the cam 137. This arrangement regulates the extent of the limited movement that the die block 111 can have. The rod as driven places the cam 137 is a selected or retracted first position (see FIG. 4) and creates the space 139. When the ram 116 is then released, the die block 111 is caused to move at high velocity relative to die block 109. The ram 116 is conveniently retracted as soon as the die block 112 has stopped its movement. The rod is then pulled positively downwardly causing the shaft 141 to rock in a counterclockwise direction. Thus, through the links 142, 143, the cam 137 is moved to the right, as illustrated in FIGS. 4 and 5, causing the transfer block 136 to move against the bias of the springs 138 and thereby restore the die block 111 to its position where bore 113 is aligned with bore 112. Normally, the ram 16 is retracted and cocked, as suggested, for example, in FIG. 3.

(3) The Transferer Assembly 148

The shaft 151 is here driven by a servo motor 271. The piston 168 in transfer capsule 146 is operated by using two electromagnetic pneumatic valves 327 and 328. The control of piston 168 and of valves 327 and 328 is described below.

As indicated above, operation of the transferer assembly proceeds in a discontinuous or stop-and-go manner. The transfer arm 147 swings between position 145 and position 155, and in each position the arm 147 is stationary until operations involving the transfer capsule 146 at the outer end of the arm 147 are carried out at each of the cut-off apparatus 100/101 and the forming apparatus 150.

The transfer arm can be variously actuated. In place of the servo motor 271 (presently preferred), a cam and linkage, or a pneumatic double acting cylinder can be used, for example.

The drive shaft (not shown) of the servo motor 271 and the driven shaft 151 of the arm 147 are each conveniently associated with a crank shaft (not shown), and these crank shafts are in aligned relationship with one another. Conveniently, the crank shaft on the shaft 151 has a smaller diameter than the crank shaft on the servo motor 271 drive shaft.

(4) The Adiabatic Forming Apparatus 150

The adiabatic forming apparatus 150, as shown in FIGS. 24–46, and as above indicated, incorporates two shaping cartridges, or forming tools, identified for convenience as first cartridge 154 and second cartridge 156. The first cartridge 154 is stationary and is mounted in an upper portion of a stationary first support leg 152 that upstands from fixed association with a base platform 153 which is part of a frame 275 (not detailed). The second cartridge 156 is translatably mounted so as to be generally coaxial with the first cartridge 154. The second cartridge 156 is fixedly mounted in the forward head of a piston 157 which is axially reciprocatable in a horizontally oriented cylinder 158 that is defined in a stationary second support leg 159. Leg 159 is located in laterally spaced relationship to leg 152, and leg 159 also upstands from fixed association with the base platform 153. Thus, the forward ends 161, 162, respectively, of each of the cartridges 154 and 156 are in coaxially aligned relationship. Those skilled in the art will appreciate that the first and second cartridges 154 and 156 are selected for use with a particular blank and for forming a particular part.

When the piston 157 is axially advanced with the second cartridge 156, the forward ends 161,162 are brought into abutting and engaged relationship with one another and define therebetween in combination with adjacent portions of a blank 119 and an ejection pin 177 a forming cavity 160 (see FIG. 22) of predetermined internal configuration. Preferably, as shown illustratively in FIG. 15, each of the forward ends 161 and 162 is provided with carbide type inserts 163, 164, respectively, which, when the first and second cartridges 154 and 156 are so engaged, define enclosing wall portions of the cavity 160.

The second cartridge 156 has an axially extending bore 176 therethrough and also through the carbide insert 164. The ejection pin 177 is slidably positioned in a diametrically somewhat enlarged forward region of the bore 176. The pin 177 is normally retracted in bore 176, and, preferably, as shown in FIG. 31, for example, the rear end of the retracted pin in bore 176 is normally seated against a shoulder 178 provided in the bore 176, thereby to limit rearward travel of the pin 177. Preferably, and as shown, the edge portions of the bore 176 may protrude slightly into and form a small part of the wall surface defining the cavity 160, and the head end of the pin 177 comprises a wall portion of the cavity 160.

To achieve axial reciprocal movements of the ejection pin 177 relative to the piston 157 in the cartridge 156, the rear face of the pin 177 is threadably associated, or the like, with the forward end of an elongated rod 184. The rearward end of the rod 184 is associated with a fluidic (preferably pneumatic, more preferably compressed air) cylinder assembly 185 whose structure may be as detailed in FIG. 48. Thus, referring to FIG. 48, the rearward end portion of the rod 184 extends slidably through an end opening 188 into a guidance chamber 186 defined in a cylinder 187 provided at the head end of cylinder assembly 185. The rearward end of the rod 184 is threadably associated, or the like, with the center of the forward face of a guidance piston 189 that is adapted to slidably and axially move reciprocatingly in chamber 186. The rearward face of the guidance piston 189 is engaged axially with the forward end portion of a shaft 191 that extends through aligned apertures 198 and 199, respectively, defined in each of the forward end plate 196 of a cylinder 193 employed the cylinder assembly 185 and also the base plate 197 of the cylinder 187. The rear end of the shaft 191 is engaged axially with a piston 192 that is adapted to move slidably and axially move reciprocatingly in the forward chamber 193B of the cylinder 193 of the cylinder assembly 185. For purposes of providing a seal between adjacent components, the piston 192 is provided with a circumferentially extending seal 194, and the aperture in the end plate 196 of the cylinder 193 is provided with a circumferentially extending seal 266. Pressurized fluid input through channel 267 into rearward chamber 193A of the cylinder 193 causes the piston 192 to advance together with the shaft 191, and pressurized fluid input through channel 268 into forward chamber 193B causes the piston 192 to retract with the shaft 191. Since shaft 191 is connected to rod 184, rod 184 moves with shaft 191, and hence the ejection pin 177 is reciprocated.

The first cartridge 154 has an axially extending channel 173 extending therethrough. The forward end portion of the channel 173 is preferably configured to receive slidably therein the blank 119. The channel 173 also extends through the carbide insert 164. A mid portion and a rearward portion of the channel 173 are enlarged diametrically. An energy-transferring elongated hammer 174 extends through the channel 173. The hammer 174 is diametrically thickened in its mid region and there provided with outside walls that are configured to slidably engage the enlarged portions of the channel 173. The hammer 174 is also adapted to reciprocably move in channel 173 responsive to differentially applied fluidic pressure (preferably pneumatic), as those skilled in the art will appreciate. Channel 172, at each end of its enlarged mid-region, is provided with fluid input ports (not shown but described below). Various arrangements are possible for the hammer 174 and the channel 173. Preferably, and as shown, the rearward end of the hammer 174 protrudes out from the rear face of the cartridge 154.

The adiabatic shaping apparatus 150 is provided with a ram 178 and a functionally associated ram operating mechanism 180. The ram 178 is axially positioned relative to the hammer 174 so as to strike the adjacent end of the hammer 174 perpendicularly when the ram 178 is released (fired) by the ram operating mechanism 180. Structural details of the ram operating mechanism 180, which includes a ram firing mechanism, a ram force applying mechanism, and a ram retracting mechanism, are described below.

To operate the adiabatic shaping apparatus 150, a gear train 280, as shown in FIGS. 43–46, of seven peripherally inter-engaged gears 281, 282, 283, 284, 285, 286, and 287 with horizontally spaced, parallel respective axes of rotation is employed. Each of the gears 282, 283, 284, 285, 286, and 287 is identical to the others and is keyed to one end of a shaft 292, 293, 294, 295, 296, and 297, respectively. Gear 181 is keyed to the output shaft 291 of a transmission 289 that is energized by an associated electric motor 290. The rotational speed of the individual shafts 292 through 297 is thus precisely controlled by the motor 290 and the transmission 228. The motor 290 continuously operates during the operational sequence of forming apparatus 150.

Gears 283, 284, 285, and 286 are idler gears. Gear 282 and gear 287 are each eccentrically and rotatably associated with a driven end of an eccentric crank arm 299 and 300, respectively. The opposite driving end of each crank arm 299 and 300 is rotatably connected to a connecting pin shaft 301 and 302, respectively. Shaft 301 joins the respective proximal ends of each of a pair of toggle links 401, 402 with the driving end of arm 299. Shaft 302 joins the respective proximal ends of each of a pair of toggle links 403, 404 with the driving end of arm 300. The distal end of the link 401 is pivotably associated with a spatially stationary pin shaft 406, and the distal end of the link 404 is pivotably associated with a spatially stationary shaft 407. The pin shafts 406 and 407 are each held by the frame 275, and these shafts are generally aligned with the working axis of the cartridges 154 and 156, but each shaft is outwardly spaced from the adjacent cartridge.

The distal end of the link 402 is pivotably joined to the outer end of a secondary link 408 by a pivot pin 409, and the inner end of the secondary link 408 is pivotably joined to the center of the outside end of the piston 157. The secondary link 408 is employed to compensate for the maximum kink angle of links 401 and 402, thereby to avoid interference of links with the cylinder 158. The distal end of the link 403 is pivotably joined to the center of the outside end of the adiabatic press assembly 165.

Figure 43:
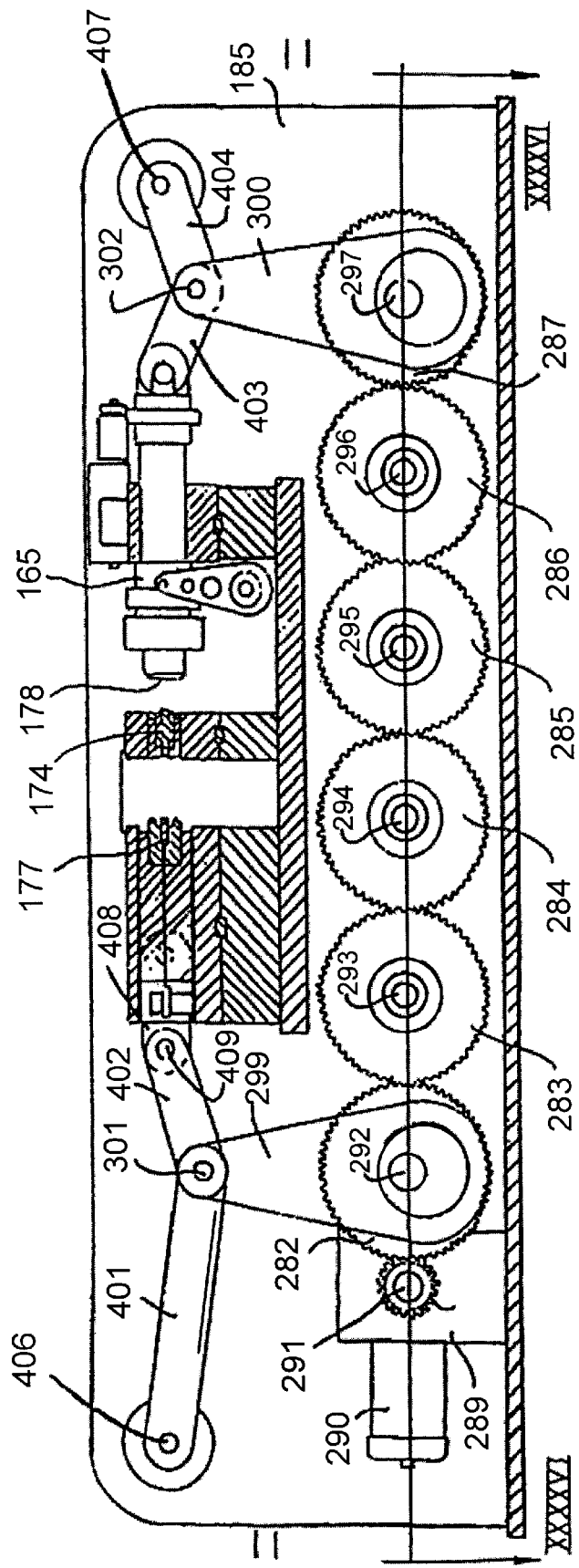
FIG. 43 is a diagrammatic side elevational view of the adiabatic blank forming assembly including the movable second forming cartridge, the stationary first forming cartridge, the movable impact press assembly, the drive mechanism, and the supporting frame and housing structure, the movable second forming cartridge and the movable impact press assembly being in their respective maximum open or axially spaced positions relative to the first forming cartridge, the drive mechanism including a gear train and toggle links for achieving sequencing and synchronization of adiabatic forming assembly components and operation.
Figure 44:
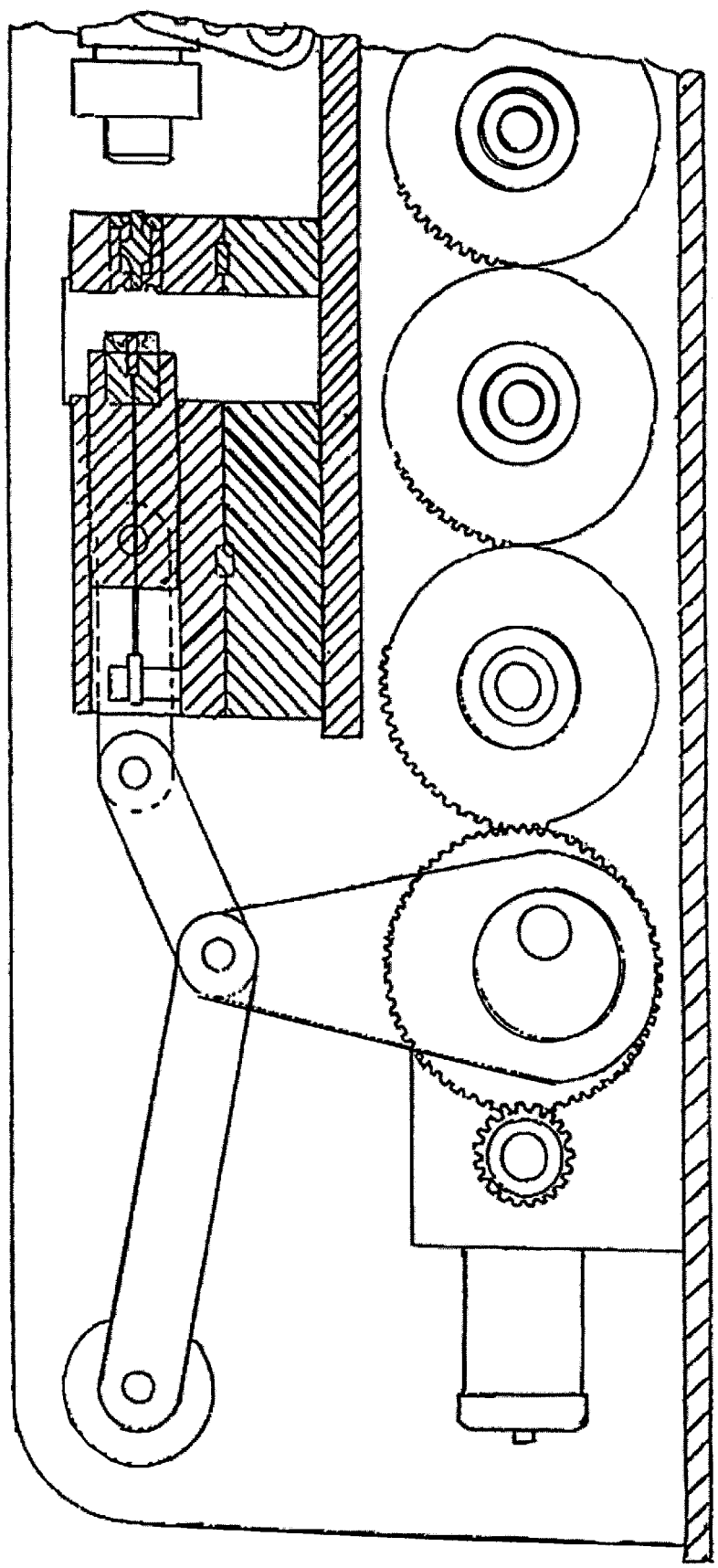
FIG. 44 is an enlarged view showing details of the toggle link arrangement employed for reciprocating the movable second forming cartridge.
Figure 45:
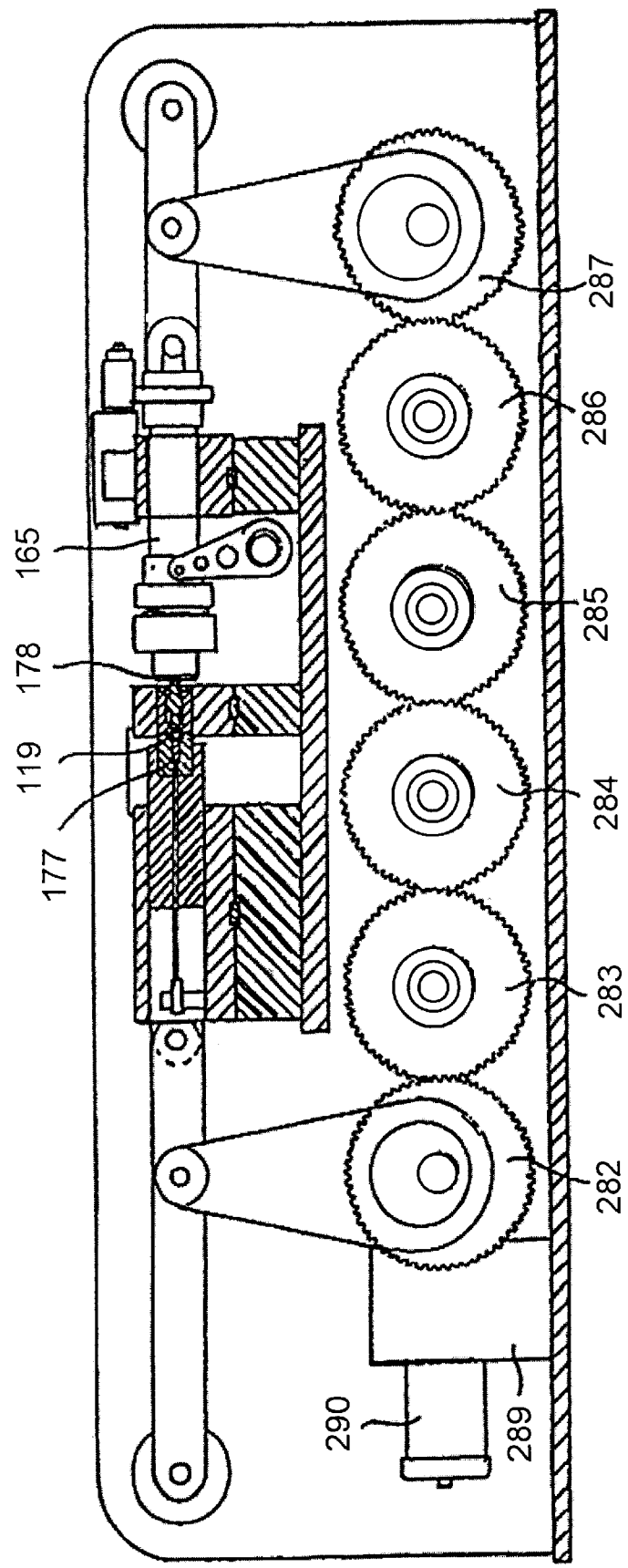
FIG. 45 is a view similar to FIG. 43 but showing the movable second forming cartridge and the movable impact press assembly after their respective toggle links have been advanced to a straightened configuration, thereby to place such cartridge and such impact press assembly in their respective positions of closest approach to one another and of contacting relationship with portions of the first forming cartridge.
Figure 46:
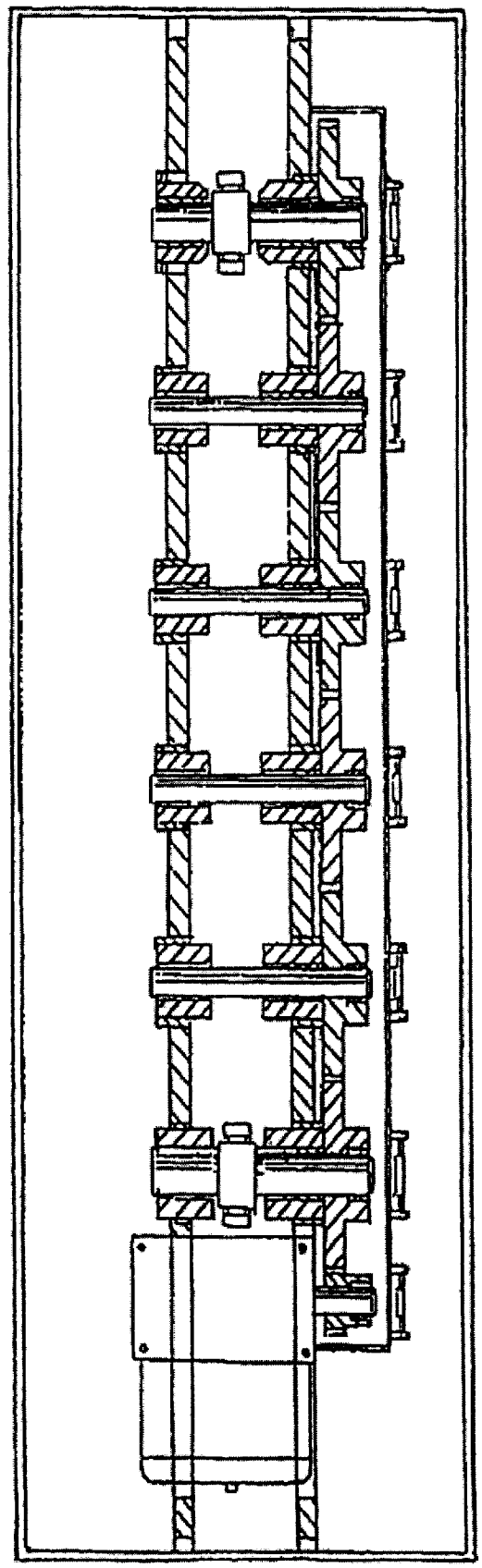
FIG. 46 is a horizontal sectional view through the common drive mechanism of the adiabatic blank forming assembly taken approximately along the line XXXXVI—XXXXVI of FIG. 43.

As the gears 182 and 187 rotate, the arms 299 and 300 cause each of the respective link pairs 401, 402 and 403, 404 to move from a configuration of maximum flexure or kink, relative to their respective associated shafts 406 and 407, such as shown in FIG. 43, to a straight configuration, such as shown in FIG. 45. When links 401, 402 are in their straight configuration, the cartridges 154 and 156 are engaged and effectively locked together. When the links 403 and 404 are in their straight configuration, the ram 178 is contacting the hammer 174, and the hammer 174 has been advanced to its location of maximum forward advance; this configuration occurs after the impact of ram 178 and power stroke against the hammer 174 have taken place and a formed part is being ejected from the first cartridge 154. When the link pairs 401, 402 and 403, 404 are in their respective positions of maximum kink, the movable second cartridge 156 is translated to its maximum axial spacing from the stationary first cartridge 154, while the adiabatic press assembly 165 is translated to its maximum axial spacing from protruding end of the hammer 174. However, and as those skilled in the art will readily appreciate from the present disclosure, in operation, the apparatus 150 is preferably adjusted so that the toggle links 401, 402 move from a maximum kink angle to a straight configuration slightly ahead of the corresponding movements of toggle links 403, 404 in the cycles of assembly 150 operation.

During the time interval that the second cartridge 156 is axially sufficiently spaced from the stationary first cartridge 154 for the spacing between the first cartridge 154 and the second cartridge 156 to be occupied by the transfer capsule 146, the transfer arm 147 swings the transfer capsule 146 into the position shown, for example, in FIG. 24. The blank 119 is transferred from the transfer capsule 146 into the first cartridge 154 through actuation of the piston 167 of the transfer capsule 146, as explained. The piston 167 is then retracted, and the transfer arm 147 moves the empty transfer capsule 146 away. Then, thereafter, as the toggle link pair 401, 402 moves to its straight configuration as shown in FIG. 45, for example, the second cartridge 156 is advanced into engagement with the first cartridge 154.

During the time interval that the adiabatic press assembly 165 is axially sufficiently spaced from the stationary first cartridge 154, the blank 119 is transferred into the first cartridge, the head of the hammer 174 is placed in abutting engagement with the adjacent side of the blank 119, and the movable second cartridge 156 is brought into engagement with the first cartridge 154. In addition, the ram 178 and the ram operating mechanism 180 are advanced with the advancing adiabatic press assembly 165 to the position of the predetermined desired striking distance between the ram 178 and the rear, protruding end of the hammer 174.

Then, as the toggle link pairs 403, 404 continue to move to their straight configuration, the ram 178 is fired by the ram operating mechanism 180 and the ram 178 impacts against the hammer 174. Immediately after ram 178 impact, force is applied against the ram 178 by the advancing toggle links 403, 404 and the advancing adiabatic press assembly 165, and part 182 formation is completed.

For reasons of maintaining a short time cycle of operation, as desired, the cycle of flexure and elongation for the toggle link pairs 401, 402 is preferably advanced slightly over that for the toggle link pairs 403, 404, as indicated above, so that when part 182 formation is complete, the toggle link pair 401, 402 immediately begins to kink or flex, thereby causing the second cartridge 156 to separate from the first cartridge 154 slightly before the toggle link pair 403, 404 has reached its straight configuration. Thus, as the toggle link pair 403, 404 completes its final straightening, the final straightening causes the advance of the adiabatic press assembly 165, with the ram 178 and the ram operating mechanism 180, to proceed, thereby permitting the ram 178 to continue advancing the hammer 174 against the part 182 and causing the hammer 174 to eject the part 182 from the first cartridge 156, as desired.

The adiabatic press assembly 165 of the forming assembly 150 is provided with a cylindrical barrel 410 that is slidably mounted in a cylinder 412 defined in a stationary third support leg 411. Leg 411 is, like leg 159, laterally spaced from leg 152. The axis of the press assembly is generally coaxial with that of the stationary first cartridge 154 and the second cartridge 156 so that the ram 178 of the assembly 165 is aligned with the hammer 174 and is movable towards and away therefrom linearly.

The structure of the adiabatic press assembly 165 is similar to that of the structure of the adiabatic press assembly 100 and the impact press of Lindell U.S. Pat. No. 4,245,493 except that, in assembly 165, the releasing means for applying a releasing force to the locking ring 62 for triggering ram 178 release is replaced by a trigger assembly 415. The trigger assembly 415 utilizes a spring-biased arm 416 whose driven end is keyed to a ratcheted shaft 417 and whose driven end rests against the release ring 62. The arrangement permits the arm 416 to have its driven end rest against the release ring 62 through substantial arc, such as can occur in normal operation of the forming assembly 150 as the impact assembly is reciprocated through its distance of travel relative to the third support leg 411. When a servo motor (not shown, but conventional and commercially available) that is associated with the ratcheted shaft 417 and that is adapted to apply a high torque force upon activation is activated, the shaft 417 is pivoted through a controlled angle. This pivot movement swings the arm 416 and causes the driven end of arm 416 to apply sufficient force to the locking ring 62 to slide this ring forward and release the ram 178. The electrical energy for activation of this servo motor is controlled to occur when the spacing between the protruding end of the hammer 174 and the ram 178 position has reached a predetermined distance. The amount of impact force to be delivered by the ram 178 when released at the predetermined distance is preliminarily selected and set as a preliminary adjustment of the impact press assembly 165 operation.

Figure 49:
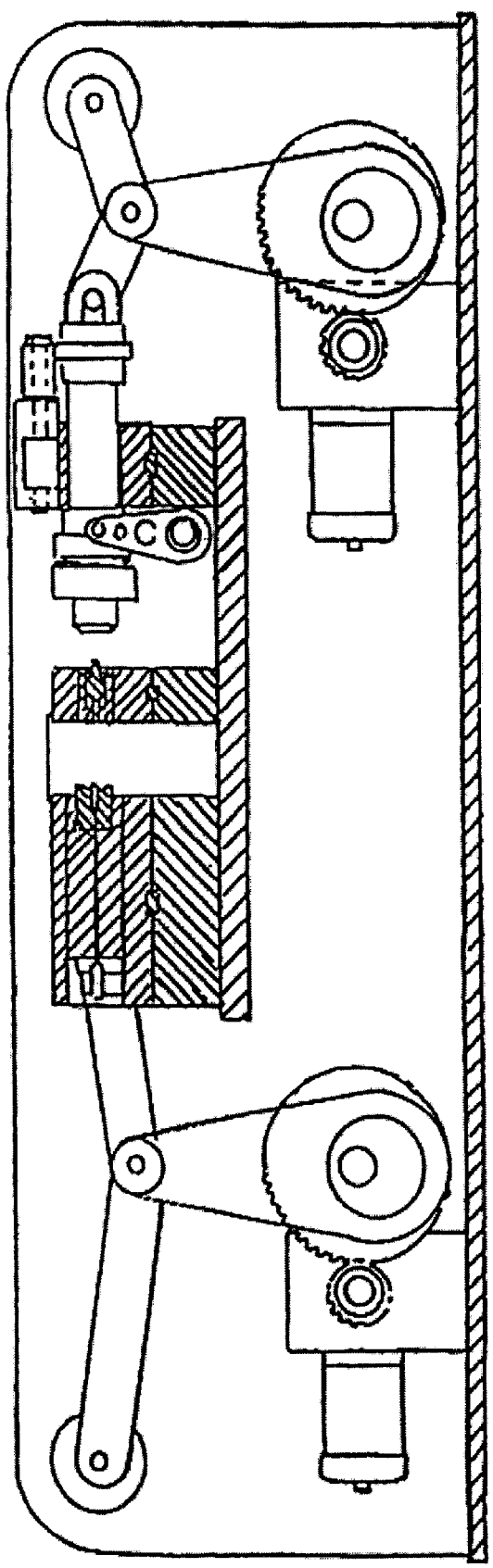
FIG. 49 is view similar to FIG. 43, but showing an alternative embodiment of a drive mechanism for the forming assembly, this alternative mechanism utilizing two cooperating servo motors.
Figure 50:
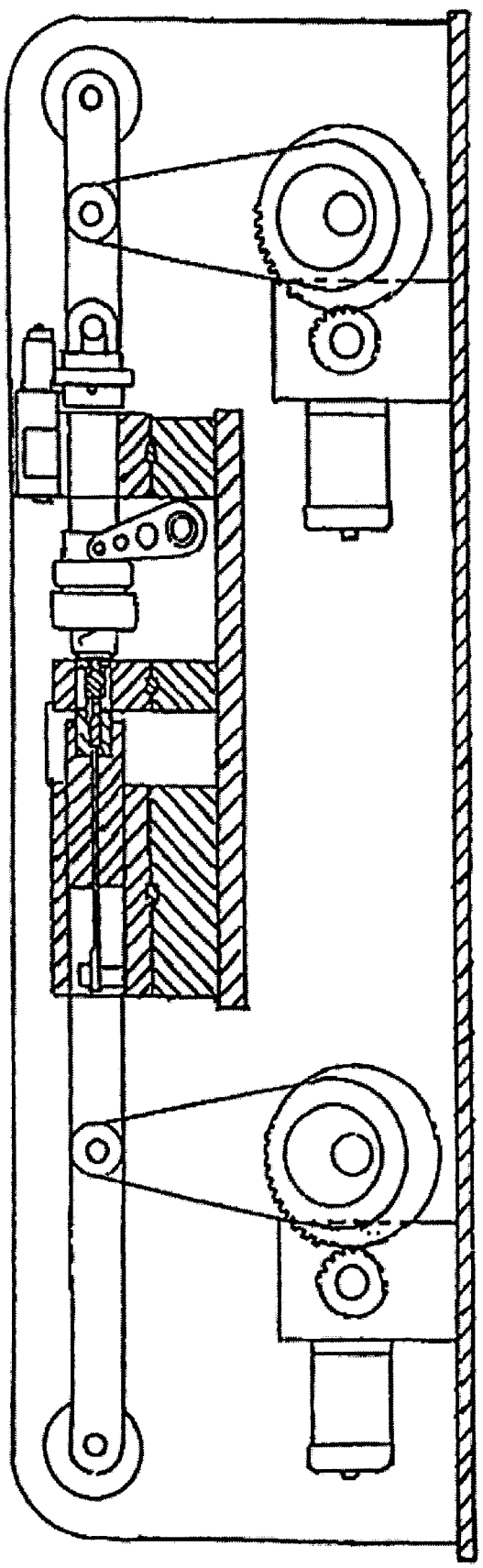
FIG. 50 is a view similar to FIG. 45, but showing the drive mechanism of FIG. 49 with the toggle links moved to their straightened configuration.

In place of a gear driving arrangement as above described, various alternative arrangements can be used. One alternative arrangement is illustrated in FIGS. 49 and 50 where a pair servo motors is employed for operating a similar gear for flexing each of the toggle link pairs.

Figure 51:
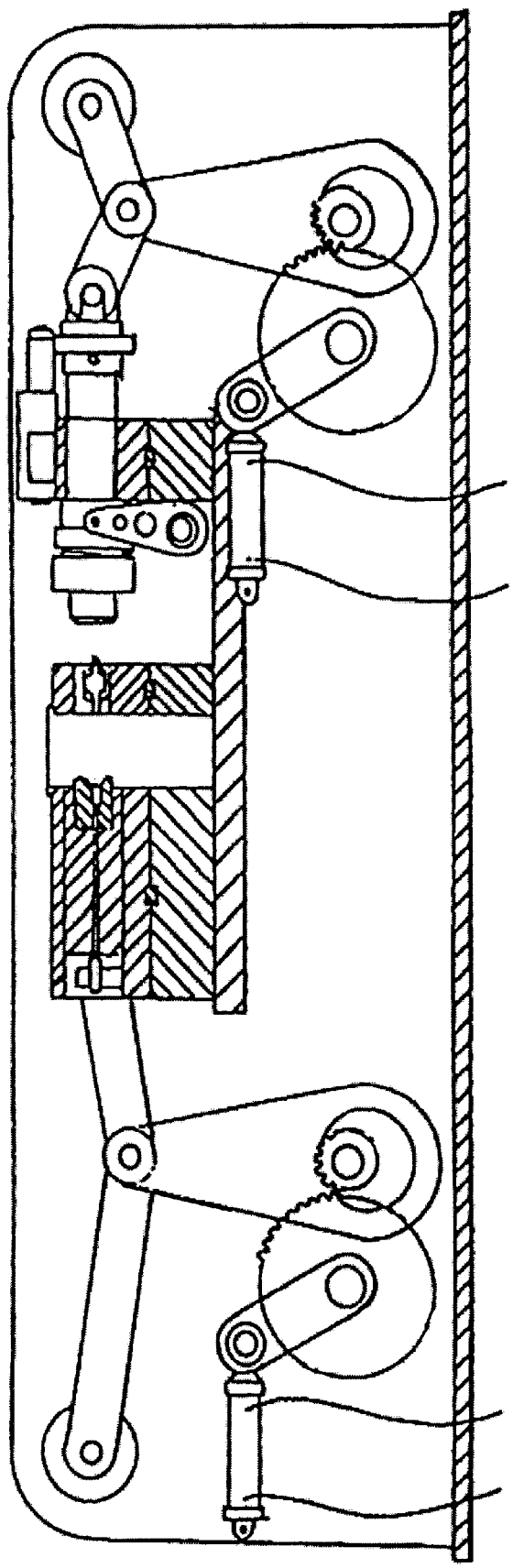
FIG. 51 is a view similar to FIG. 43, but showing another alternative embodiment of a drive mechanism for the forming assembly, this alternative mechanism utilizing two pneumatic air or hydraulic cylinders.
Figure 52:
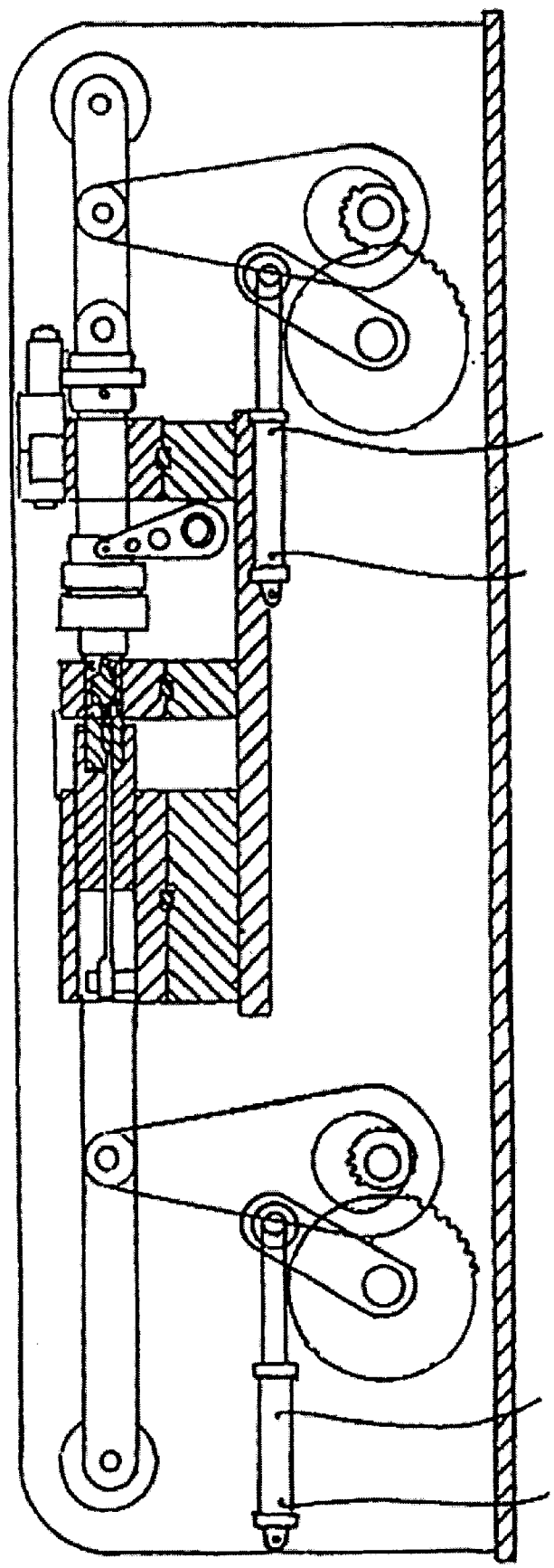
FIG. 52 is a is a view similar to FIG. 45, but showing the drive mechanism of FIG. 51 with the toggle links moved to their straightened configuration.

Another alternative arrangement is illustrated in FIGS. 51 and 52 where a pair of concurrently operating pneumatic or hydraulic cylinders are employed, one for flexing each of the toggle link pairs. Here, each cylinders push rod is utilized to pivot a lever arm, and a gear on the axis of each lever arm is utilized to turn a connected drive gear. Each drive gear is eccentrically connected to a lever arm crank that kinks and unkinks the toggle link pairs.

(5) The Control and Synchronizing Assembly

As indicated above, translation of the elongated feedstock 103 in apparatus 100/101 proceeds in a stop-and-go or discontinuous manner. The feedstock 103 momentarily stops translating in a single cycle of apparatus operation at each of the following times:

(a) Forward translation of feedstock 103 is stopped when blank 119 is being cut-off at the feedstock 103 forward end by the impact press 100;
(b) Forward translation of feedstock 103 is stopped after the cut-off blank 119 has been pushed forwards by the feedstock 103 forward end into the transfer capsule 146 and before reverse or rearwards translation of the feedstock 103 starts, and
(c) Rearward translation of feedstock 103 is stopped before forward translation of the feedstock 103 commences for the purpose of permitting the feedstock 103 forward end to be advanced (translated) and positioned at the impact press 100 (for a repeat of stop (a)).

Since the operations of adiabatic impact press assembly 100 and the stock feeder assembly 101 are driven and controlled by the common gear train 200, the operational movements of the impact press 100, and of the grippers 106 (if used), 107, and 108, are precisely synchronized so that the above indicated desired discontinuous cyclical operation is achieved. However, as those skilled in the art will readily appreciate, various apparatus parameters can be adjusted to accomplish desired changes. For example, adjustments can be made in impact press 100 operating characteristics, such as impact force, or in stock feed 101 operating characteristics, such traverse travel distance of each of the first and second movable grippers 107 and 108 in reciprocation, or the like. Such adjustments may be desirable when a feedstock or a blank to be produced is being changed.

Figure 47:
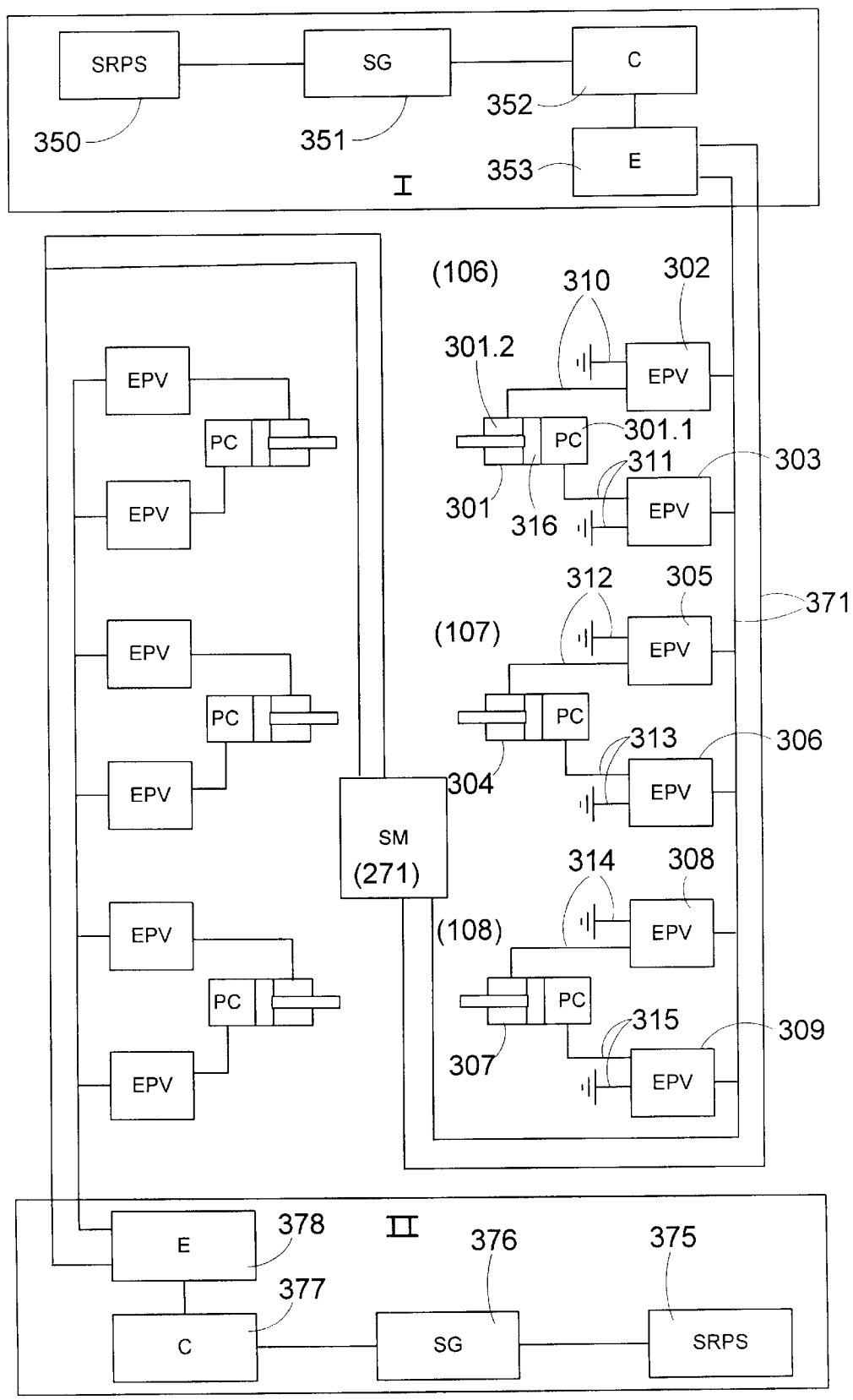
FIG. 47 is a simplified diagrammatic view of a control mechanism for actuating and deactuating electromagnetically controlled pneumatic or hydraulic valves employed for operating double acting air or hydraulic cylinders utilized in apparatus of the invention.

As above explained, and as indicated in FIG. 47, for example, the on/off operations of the jaws of the respective grippers 106 (if used), 107 and 108 are each determined by operation of a functionally associated, conventional-type, commercially available, double-acting, pneumatic cylinder (PC). Each such PC cylinder here employed has two longitudinally adjacent chambers, and a single reciprocatable piston means located in the cylinder between the chambers. A rod or body means associated with the piston means extends generally axially in, and projects beyond one end of, the associated cylinder. Sealing means of course is included. Each chamber of each cylinder is conveniently connected with a separate conduit means for providing that chamber with a pressurized fluid (preferably compressed air).

Various operational control arrangements can be used. For example, each conduit means that is so associated with a different one of a cylinder's two chambers is conveniently functionally associated with a conventional, commercially available, electromagnetically actuated, double acting, pneumatic valve assembly (EPV). Two EPV valve assemblies per PC pneumatic cylinder are utilized. Each EPV valve assembly incorporates a first and a second electromagnetically actuatable valve (not detailed), and each valve is independently actuatable and controllable by an appropriate input electric signal. Both valves of each EPV valve assembly are normally (when not actuated) in a closed configuration. As indicated in FIG. 47, the movable jaw of each gripper assembly 106, 107, and 108 is actuated by a different functionally associated PC cylinder assembly 301, 304, and 307, respectively. Each of the two chambers of each PC cylinder assembly 301, 304, and 307 is connected via a conduit to a different EPV valve assembly, identified as EPV valves 302 and 303 for PC cylinder assembly 301, EPV valves 305 and 306 for PC cylinder assembly 304, and EPV valves 308 and 309 for PC cylinder assembly 307.

When, for example, a first EPV valve assembly 302 is connected across a first conduit 310, and the first conduit 310 is associated with the first chamber 301.1 of the cylinder of a PC pneumatic cylinder assembly 301, and the first valve of the first EPV valve assembly 302 is electrically actuated and opened from its normally closed configuration (while the second valve of the first EPV valve assembly 302 is maintained in a closed configuration), compressed gas is delivered through the first conduit 310 and the first valve of EPV valve assembly 302 into the connected first chamber 301.1. The resulting pressure in the first chamber 301.1 causes cylinder's piston 316 to move responsively and longitudinally in the cylinder of cylinder assembly 301, thereby producing a first chamber 301.1 elongated configuration (not shown) relative to that first chamber's initial configuration.

Concurrently, in the second chamber 301.2 of the cylinder of the PC pneumatic cylinder assembly 301, a contracted volumetric configuration (not shown) relative to that second chamber's initial configuration results because the initial pressure in the second chamber of the cylinder is concurrently reduced, thereby to permit the desired piston 316 movement, and, concurrently, to reduce the internal volume of the second chamber 301.2. Such a pressure/volume reduction in the second chamber 301.2 is achieved by opening the second valve of the second electromagnetically actuated EPV valve assembly 303 (while maintaining the first valve of the second EPV valve assembly 303 in a closed configuration). EPV valve assembly 303 is functionally associated with the second conduit 311 that is connected to the second chamber 301.2 of the same cylinder of the PC cylinder assembly 301. This second valve of EPV valve assembly 303 is associated with a vent (not shown) to the atmosphere. Opening this second valve permits gas (air) that may be under pressure in the second chamber 301.2 to pass out via the second conduit 311 through the open second valve and vent to the atmosphere. Preferably, the second valve of the second EPC valve assembly 303 is opened concurrently with the opening of the first valve of the first EPC valve assembly 302 so that gas (air) pressure which may exist in the second chamber 301.2 of the cylinder of the PC cylinder assembly 301 is released as pressure in the first conduit 310 and connected first chamber 301.1 increases.

Similarly, EPV valve assemblies 305 and 306 each connect with respective conduits 312 and 313 that in turn each connect with a different chamber 304.1 and 304.2 of the pneumatic cylinder (PC) 304; and EPV valve assemblies 308 and 309 each connect with respective conduits 314 and 315 that in turn each connect with a different chamber 307.1 and 307.2 of the pneumatic cylinder (PC) 307.

Pneumatic cylinder 301 operates (closes or opens) the lower jaw of fixed gripper 106, pneumatic cylinder 304 operates (closes or opens) the lower jaw of movable gripper 107, and pneumatic cylinder 307 operates (closes or opens) the lower jaw of the movable gripper 108.

In order to control and synchronize opening and closing operations of the individual electromagnetic valve assemblies 302, 303, 305, 306, 308, and 309, and hence operations of their associated PC cylinder assemblies 301, 304, and 307, and the opening and closing operations of the grippers 106 (if used), 107 and 108, various arrangements can be used. A present preference is to associate the shaft of a gear, such as the shaft 207 of the gear 202 (see FIG. 19), with a conventional, commercially available, electromagnetic shaft rotation position sensor (SRPS) 350 which is able to (a) selectively identify, relative to a starting location for shaft 207 rotation, successive and progressive shaft 207 positions existing during every 360 degrees of shaft 207 rotation, and (b) generate electric signal outputs that are representative of shaft 207 angular positions and rotation. Since the respective electric signals produced by the shaft rotation position sensor 350 correspond to shaft 207 positions of rotation, and represent time intervals, the signals are suitable for use, during the course of a stock feeder 101 cycle of operation, in regulating the operation of the jaws of each of the grippers 106 (if used), 107 and 108.

A system for achieving such control of gripper jaw activation is illustrated in the simplified schematic diagram of FIG. 47. The output from the shaft rotation position sensor (SRPS) 350 is fed to a signal generator (SG) 351. For example, an analog signal from sensor 350 can be converted to a digital signal, and the output signal of signal generator (SG) 351, which is representative of the currently existing shaft 207 operative configuration, is adapted to be charged to a computer controller (C) 352 which has been programmed with shaft 207 positions that correspond to particular times and locations where activations and deactivations of the respective jaws of the grippers 106, 107 and 108 are desired. The controller 352 compares these programmed positions to the signals being received from the shaft rotation position sensor 350 via the signal generator 351. When a signal from shaft rotation position sensor 350 is found by the controller 352 to correspond to a programmed position for a gripper jaw activation, then the controller 352 generates an output signal which is received by an encoder (E) 353. A control line 371 interconnects the encoder (E) 353 with each of these six EPV valves and the servo motor 271.

The encoder 253 is programmed with the unique location identification code or address for each one of the six electromagnetically actuated pneumatic valve assemblies (EPVs) 302, 303, 305, 306, 308, and 309 and also for the servo motor (SM) 271. When, for example, the controller 352 identifies a shaft 207 position where a particular gripper jaw is to be activated, the controller 352 sends an information signal to the encoder 353 which accepts that signal and (a) labels it with the unique location identification codes for each of the two involved electromagnetic valves to be activated is located along the control line 271, and (b) converts it into an activation signal for use by each one of the two involved electromagnetic valves to be activated for operating the associated cylinder assembly and the jaw of the desired gripper. Thus, in the illustration, from the input signal received from the controller 352, the encoder 353 provides signal means that is adapted to activate the first valve of the first EPV valve assembly 302, and signal means that is adapted to activate the second valve of the second EPV valve assembly 303. When the first valve of the first EPV valve assembly 302 is actuated, compressed air is admitted to the first chamber 301.1 of the PC cylinder assembly 301, and when the second valve of the second EPV valve assembly 303 is actuated, pressurized gas (air) is released from second chamber 301.2 of the PC cylinder assembly 301. Preferably such first and second valves are concurrently actuated.

After a given gripper jaw has been activated (closed) for the desired time interval, the termination of that time interval is identified and detected by signals received by the controller 352 from the shaft rotation position sensor 350 via the signal generator 351, and a signal is sent by the controller 352 to the encoder 353. After processing, that signal is effectively forwarded to the two involved EPV valve assemblies, and, upon receipt, the respective operations of these EPV valves are reversed relative to the valve actions that occurred upon initial PC cylinder assembly activation;

that is, the second valve of the first electromagnetic valve assembly is energized, while the first valve of the second electromagnetic valve assembly is energized, thereby resulting in operating the lower jaw and opening the jaws of the involved gripper. The involved gripper's jaw then remains in an open configuration until a subsequent signal is received by the controller 352 from the shaft rotation position sensor 350. That subsequent signal marks the time when that gripper's jaws are again closed, and the process operation is repeated. Thus, the operation of the jaws of the grippers 106, 107 and 108 is controlled.

After a blank 119 is cut off from the feedstock 103, and is advanced into the transfer capsule 146, then the transfer capsule 146 and the transfer arm 147 are ready to be moved from the position 145 at cut-off assembly 100/101 to the position 155 at the forming assembly 150. To accomplish this movement, the servo motor 271 of the transferer assembly 148 is energized for the time interval needed to accomplish such arm 147 movement. This time interval is preferably predetermined or preset, but, alternatively, a microswitch (not shown) can be located at each of the positions 145 and 155 and used to de-energize the servo motor 271 upon arrival of the arm 147 at a position 155 or 145, as those skilled in the art will readily appreciate.

To control the time point where activation of the servo motor 271 is to occur, which is usually the time when the blank 119 fully charged into transfer capsule 146 and the arm 147 is able to swing without interference from the feedstock 103, various control means can be employed. One convenient and now preferred control means is to utilize the shaft position rotation position sensor SRPS 350. When the controller C 352 receives a control signal from the shaft rotation position sensor SRPS 350 via the signal generator SG 351, and the controller C 352 outputs a resulting signal to the encoder E 353, an activation signal is provided for the servo-motor 271 and the arm 147 is swung as desired.

In FIG. 47, the subassembly comprising the shaft rotation position sensor SRPS 350, the signal generator SG 351, the controller C 352, and the encoder E 253 is collectively identified for convenience in FIG. 47 as control I which is functionally associated with the cut-off assembly 100/101. A corresponding subassembly comprising a shaft rotation position sensor 375, a signal generator SG 376, a controller C 377, and an encoder E 378 is functionally associated with the forming assembly 150 and is collectively identified for convenience as control II in FIG. 47.

In the forming assembly 150, as indicated in FIG. 47, the pneumatic cylinder 185 has its chambers 193A and 193B pressurized/depressurized by two EPV valves 330 and 331, respectively, while the chambers 173A and 173B used for moving the hammer 174 in the first chamber 154 assembly are pressurized/depressurized by two EPV valves 333 and 334, respectively. The two EPV valves 327 and 328 of the transfer capsule 146 that are used for extending and retracting the shaft 167 and for supplying compressed gas or the like through channels 171 and 172, respectively, are conveniently controlled as a part of the operations of the forming assembly 150.

The SRPS sensor 375 is conveniently associated with the shaft 292 of gear 282. After the arm 147 is in position 155 and the servo motor 271 is deenergized, the shaft rotation position sensor SRPS 375, signals, through the signal generator 376, the controller 377 that the transfer capsule 146 is ready to be actuated pneumatically and the controller 377 sends a signal to the encoder 378. The encoder 378 issues addressed signals to the first valve of the EPV valve assembly 327 and to the second valve of the EPV valve assembly 328 that are associated with the transfer capsule 146, thereby causing the shaft 167 to move the blank 119 from the transfer capsule into the first cartridge 154. Thereafter, the sequence is reversed upon receipt and processing of another signal produced using the assembly II, and the shaft 167 is retracted into the transfer capsule 146.

Next, another signal produced using the assembly II is used to actuate the servo motor 271. Signals received from the shaft position rotation sensor 375 and processed through the signal generator 376, the controller 377 and the encoder 378, result, after servo motor actuation, in movement of the arm 147 from position 155 back to position 145.

Thereafter, the operation of the EPV valves 330, 331, and the EPV valves 333, 334 proceeds using signals generated by the SRPS sensor 375 as assembly 150 operation proceeds, in the same manner as above described for EPV valves 327, 328. Thus, operations of the transfer capsule 146, cylinder assembly 185, and hammer 174 are controlled and synchronized in the forming assembly 150.

A separate signal generated by the SRPS sensor 375 is initially set for actuating at the predetermined desired time the trigger assembly 415 of the press assembly 165 for release of the ram 178.

Various adjustments are made to change or alter other adjustable operating variables of the assembly 150, as those skilled in the art will appreciate.

In order to control and maintain a desired operating speed for the motor 290 in the cut-off assembly 100/101, a conventional control loop may be employed which incorporates the motor 227, the shaft rotation sensor 350 and a controllable rheostat (not detailed, but conventional and commercially available) that is set to feed electric line power to motor 227 at a rate controlled to maintain a nearly constant desired motor operating speed. Deviations from the desired speed produce changes in shaft 207 rotation speed that are sensed by sensor 350. A drop in shaft 207 rotation speed below that desired causes an incremental change in the rheostat setting so that more power is fed to motor 227 causing the motor speed and the shaft rotation speed to increase up to the desired speed. A rise in shaft 207 rotation speed above that desired causes an incremental change in the rheostat setting so that less power is fed to motor 227 causing the motor speed and the shaft rotation speed to decrease down to the desired speed.

Similarly, a desired motor operating speed is maintained for motor 290 in the forming assembly 150 using the sensor 375, and a controllable rheostat (not shown) in a control loop.

If desired a control loop to maintain the cut-off assembly 100/101 operating at a speed that matches the operating speed of the forming machine 150 can be employed if desired. However, by manually regulating the motor speeds of the cut off assembly 100/101 and the forming machine 150, such a control loop can be avoided owing to the ability of the motor speed control loops above described to maintain accurately machine operating speed.

Thus, the operation, control and synchronization of the system 99 is achieved while independently maintaining the respective operations of the cut off assembly and the forming assembly.

It is a feature of the system 99 that the cut-off assembly 100/101 and the forming assembly can be used as independent and separate systems. The transferer assembly 148 and the control systems employed make such usage possible.

It is another feature of the system 99 that the cut-off assembly 100/101 can be used in various combinations with the forming assembly 150 using the transferor assembly beyond that above described and illustrated. One such combination is shown in FIG. 53 where, using two transferor assemblies, one cut-off assembly feeds blanks to a forming assembly for partial forming and then the partially formed products are fed to a second forming assembly to make parts.

Figure 53:
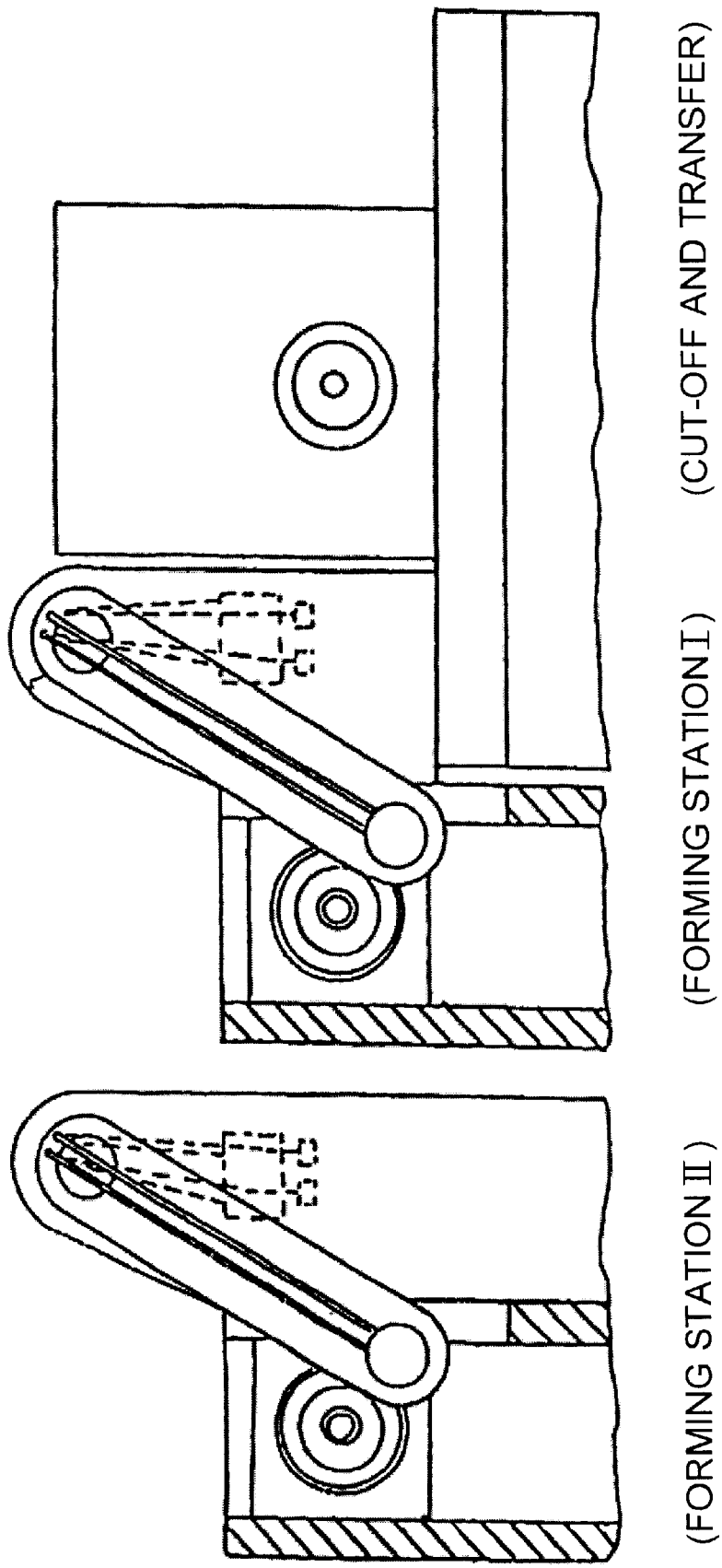
FIG. 53 is an elevational view similar to FIG. 22, but illustrating an embodiment of the inventive apparatus where one cut-off assembly is utilized in progressive and successive combination with two forming assemblies and with two transferor assemblies, one transferor assembly being used to transfer blanks from the cut-off assembly to a first forming machine, and the second transferor assembly being used to transfer partially formed blanks from the first forming machine to a second forming machine.

With regard to FIG. 53, two transferor assemblies and forming stations are provided to divide the amount of forming work in half and to prepare the blank in forming station I to make it easier in forming station II to finalize the part. This may be necessary for the forming of complicated configurations or difficult materials.

Figure 54:
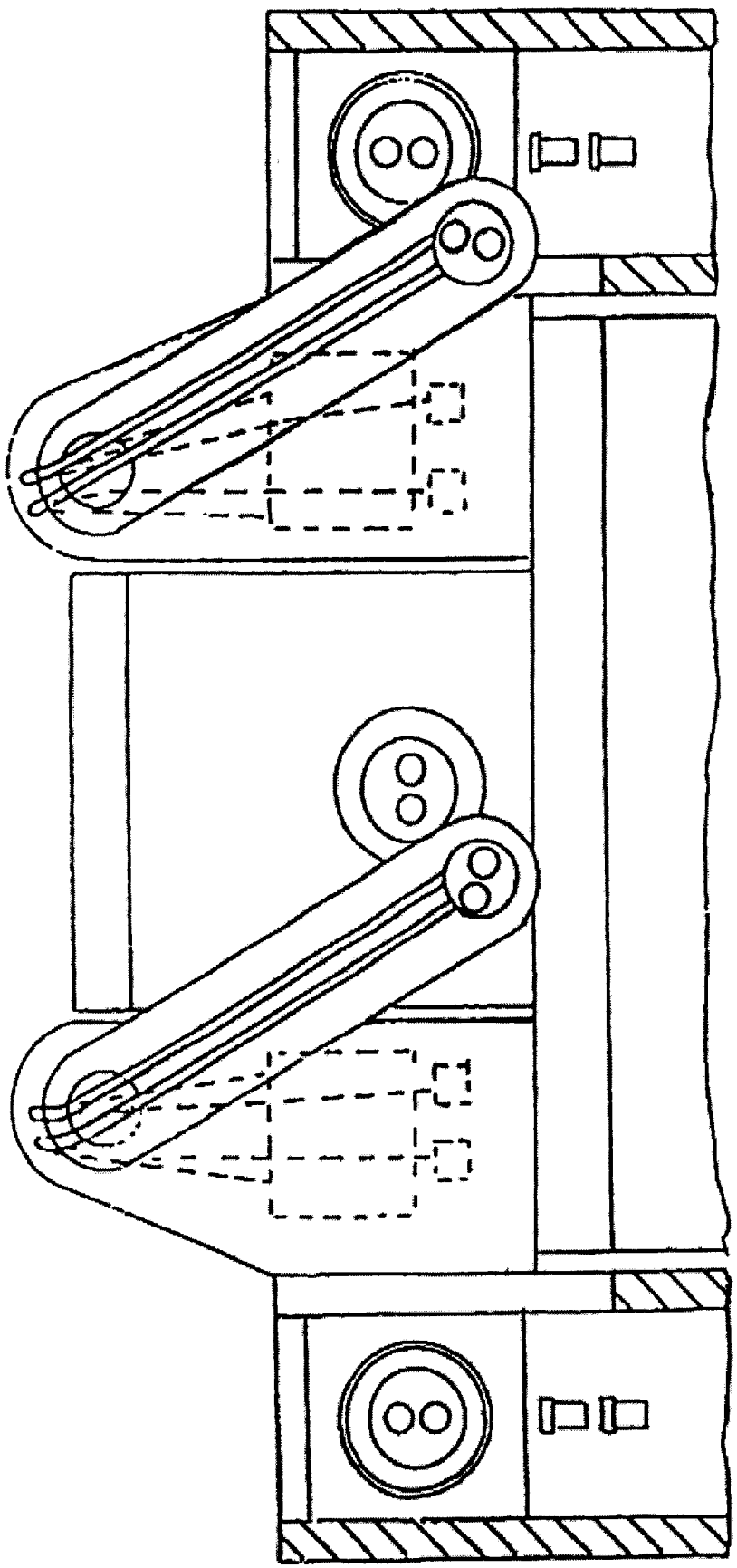
FIG. 54 is an elevational view similar to FIG. 22, but illustrating an embodiment of the inventive apparatus where one cut-off assembly is utilized in combination with two forming assemblies and with two transferor assemblies, the transferor assemblies here being used to transfer at least one blank from the cut-off assembly to each of the two forming assemblies in an alternative manner.

Another such combination is shown in FIG. 54 where, using one cut-off assembly and two transferor assemblies, blanks are alternatively fed to each of two forming machines to make parts concurrently.

From the foregoing disclosures taken with the accompanying drawings, various modifications, embodiments, and the like will be apparent to those skilled in the art, and such are within the spirit and scope of this invention.

What is claimed is:

1. A process for adiabatically forming a part from elongated feedstock in two successive adiabatic processing zones, said process comprising the steps of sequentially and automatically:
    (a) feeding an elongated feedstock stepwise into an adiabatic cut-off zone so that in said adiabatic cut-off zone a predetermined forward end portion of said feedstock extends past a shear plane that transversely extends across said feedstock;
    (b) adiabatically cutting-off said predetermined forward end portion of said feedstock along said shear plane in a time of less than about one millisecond, thereby converting said predetermined forward end portion into a blank;
    (c) advancing said blank into a receiving capsule;
    (d) transferring said receiving capsule with said blank into an adiabatic forming zone and locating said blank along one side of a forming zone cavity defined in said adiabatic forming zone;
    (e) adiabatically forming said blank to conform to said forming cavity in a time of milliseconds, thereby forming said blank into said part; and
    (f) ejecting said part from said forming cavity.

2. The process of claim 1 wherein said steps (a) through (f) are repeated repetitively, thereby creating a plurality of said parts.

3. The process of claim 1 wherein, in said step (b), a movable die is impacted against said feedstock along said shear plane thereby shearing said feedstock along said shear plane.

4. The process of claim 1 wherein, in said step (e), a ram is impacted against a forming tool defining said forming zone cavity and then a power stroke is applied to said ram, thereby conforming said blank to said forming zone cavity.

5. A process for automatically forming parts from elongated feedstock in two successive processing zones, said process comprising the successive steps of:
    (a) feeding longitudinally an elongated feedstock into a first predetermined location in an adiabatic cut-off zone so that at said location a predetermined forward end portion of said feedstock extends through and beyond a shear plane that extends transversely relative to said feedstock, one side of said shear plane being defined by a planar face of a spatially fixed cutting die and the opposing side of said shear plane being defined by an adjacent planar face of a spatially transversely movable cutting die, each of said dies having a longitudinally extending aperture defined therethrough through which said feedstock extends at said location, said apertures being longitudinally aligned with each other when said feedstock is so fed therethrough;
    (b) adiabatically cutting-off said forward end portion along said shear plane in a time of less than about one millisecond, thereby converting said forward end portion into a blank, said adiabatically cutting-off being carried out by transversely impacting said movable die with a force sufficient to shear said feedstock along said shear plane whereby said forward end portion is severed and thereby becomes said blank;
    (c) realigning said apertures into said longitudinal alignment with one another and advancing said feedstock through said aligned apertures against said blank, thereby to move said blank forwardly beyond said adiabatic cut-off zone to a blank loading zone where said blank is received into a transferable receiving chamber, and thereafter retracting said feedstock and repeating said steps (a) through (c) sequentially;
    (d) transferring said receiving chamber with said blank therein from said blank loading zone to a predetermined location in an adiabatic forming zone, said blank defining at said predetermined location a side wall portion of a forming cavity that is, except for said side wall portion, defined by matingly engaged but disengagable first and second forming cartridges;
    (e) adiabatically forming said blank into an exterior configuration that corresponds to the interior configuration of said forming cavity in a time of less than about one millisecond, thereby forming said blank into said part, said adiabatically forming being carried out by first impacting said blank with a first force sufficient to form a partially formed blank and then immediately thereafter applying against said so impacted partially formed blank a second force sufficient to so form said blank into a finished part;
    (f) disengaging said first and second forming cartridges and ejecting said part therefrom; and
    (g) reengaging said first and second forming cartridges and thereafter repeating said steps (a) through (g) sequentially;
    whereby a plurality of said parts are formed from said feedstock.

6. The process of claim 5 wherein, during said step (b), said feedstock is held in a fixed position.

7. The process of claim 5 wherein, during said step (d), said blank is removed from said receiving capsule and transferred into said predetermined location, and first and second forming cartridges are so matingly engaged to define said forming cavity.

8. The process of claim 7 wherein said receiving capsule is provided with a fluidically actuated piston member which, when actuated, pushes said blank from said receiving capsule to said predetermined location, and which, when deactuated, retracts into said receiving capsule, and wherein, after said blank is separated from said receiving chamber, said receiving chamber is removed from said adiabatic forming zone.

9. The process of claim 8 wherein, after said receiving chamber is so removed from said adiabatic forming zone, said first and second forming cartridges are so matingly engaged with one another.

10. The process of claim 5 where, during said step (e), and prior to said impacting, positioning of said blank is achieved by a fluidically actuated hammer member, and where, after said first and second forming cartridges are so matingly engaged with one another, said fluidic actuation means is activated to bring said hammer member into said abutting engagement with said exposed side of said blank.

11. The process of claim 5 wherein, during said step (f), an ejection pin advances through at least one of said forming cartridges into engagement with said part as said first and second forming cartridges disengage.

12. An apparatus for adiabatic processing of an elongated feedstock into parts, said apparatus comprising in combination:
   an adiabatic cut-off means for cut-off of blanks from elongated feedstock;
   a feedstock advancing and positioning means for charging, positioning and holding said feedstock during said cut-off of blanks by said adiabatic cut-off means, and for moving blanks from said adiabatic cut-off means to a first predetermined location;
   an adiabatic forming means for forming said parts from said blanks and for ejecting said parts;
   transfer means for receiving blanks from said predetermined location and for moving said blanks to a second predetermined location in said adiabatic forming for utilization by said adiabatic forming means; and
   control means for sequencing operations of said adiabatic cut-off means, said feedstock advancing and positioning means, said adiabatic forming means, and said transfer means.

13. The apparatus of claim 12 wherein each of said adiabatic cut-off means and said adiabatic forming means includes means for impacting and for applying force whereby the operation of each individual blank cut-off and each individual part forming is accomplished in less than about one millisecond.

14. The apparatus of claim 12 wherein said adiabatic cut-off means is adapted for sequential predetermined incremental cut-off of said elongated feedstock into said blanks, and said adiabatic cut-off means includes:
   (a) a spatially fixed die block and an adjacent slidably movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said slidably movable die block being movable along said shear plane transversely relative to said feedstock, (b) a ram movable along said shear plane in a direction corresponding to the direction of movement of said movable die block for engaging said movable die block, and associated ram operating means for applying a force to said movable die block whereby said movable die block, while coacting with said fixed die block, responsive to said force, functions to sever said feedstock at said shear plane in less than about one millisecond after said ram is so impacted, thereby shearing said feedstock along said shear plane;
   (c) power and regulating means for operating said cut-off means; and
   (d) advancing means associated with said adiabatic cut-off means including:
      (1) means for feeding, positioning and holding said feedstock at a predetermined first location in said adiabatic cut-off means for adiabatic cut-off of a said blank at said shear plane,
      (2) means for moving said feedstock forwardly after each individual said blank is so cut-off, thereby to separate each said blank from said adiabatic cut-off means, and move each said blank after said blank cut-off to a preset location;
      (3) means for retracting and repositioning thereafter said feedstock at said predetermined first location relative to said adiabatic cut-off means for adiabatic cut-off of another said blank at said shear plane; and
      (4) power and regulating means for operating said advancing means.

15. The apparatus of claim 12 wherein said adiabatic cut-off means is adapted for sequential predetermined incremental cut-off of said elongated feedstock into said blanks, and said adiabatic cut-off means includes:
   (a) a spatially fixed die block and an adjacent slidably movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said slidably movable die block being movable along said shear plane transversely relative to said feedstock,
   (b) a ram movable along said shear plane in a direction corresponding to the direction of movement of said movable die block for engaging said movable die block, and associated ram operating assembly for applying a force to said movable die block whereby said movable die block, while coacting with said fixed die block, responsive to said force, functions to sever said feedstock at said shear plane in less than about one millisecond after said ram is so impacted, thereby shearing said feedstock along said shear plane;
   (c) power and regulating assembly for operating said cut-off assembly; and
   (d) advancing assembly associated with said adiabatic cut-off assembly including:
      (1) assembly for feeding, positioning, and holding said feedstock at a predetermined first location in said adiabatic cut-off assembly for adiabatic cut-off of a said blank at said shear plane,
      (2) assembly for moving said feedstock forwardly after each individual said blank is so cut-off, thereby to separate each said blank from said adiabatic cut-off assembly, and move each said blank after said blank cut-off to a preset location;
      (3) assembly for retracting and repositioning thereafter said feedstock at said predetermined first location relative to said adiabatic cut-off assembly for adiabatic cut-off of another said blank at said shear plane; and
      (4) power and regulating assembly for operating said advancing assembly.

16. The apparatus of claim 12 wherein said adiabatic forming means includes:
   (a) first and second mutually engageable forming cartridges that, when mutually engaged, define a walled forming cavity having in one wall thereof a defined window located at a predetermined location whereat a side portion of one said blank is positionable, and including means for engaging and disengaging said cartridges,
   (b) a ram movable against an opposite side portion of said associated blank in a direction towards said blank side portion for engaging an opposite side portion of said so positioned blank, and associated ram operating means for applying in immediate succession to said ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form said part from said blank;

(c) rejection means for separating said part from said forming cartridges; and (d) power and regulating means for operating said adiabatic forming means.

17. The apparatus of claim 12 wherein said adiabatic forming means includes:

(a) first and second mutually engageable forming cartridges that, when mutually engaged, define a walled forming cavity having in one wall thereof a defined window located at a predetermined location whereat a side portion of one said blank is positionable, and including assembly for engaging and disengaging said cartridges, (b) a ram movable against an opposite side portion of said associated blank in a direction towards said blank side portion for engaging an opposite side portion of said so positioned blank, and associated ram operating assembly for applying in immediate succession to said ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form said part from said blank;

(c) rejection assembly for separating said part from said forming cartridges; and (d) power and regulating assembly for operating said adiabatic forming assembly.

18. The apparatus of claim 12 wherein said transfer means successively transfers individual said blanks from said predetermined location to said second predetermined location and said transfer means includes (a) capsule means for receiving successively each said so cut-off blank at said preset location, for transferring each said so received blank to said predetermined second location, and for discharging each said so transferred blank at said predetermined second location, (b) arm means for moving said capsule means from said preset location to said predetermined second location, and thereafter for moving said capsule means from said predetermined second location back to said preset location for receiving another said blank, and (c) power and regulating means for operating said transfer means.

19. The apparatus of claim 12 wherein said transfer means successively transfers individual said blanks from said predetermined location to said second predetermined location and said transfer means includes:

(a) a capsule for receiving successively each said so cut-off blank at said preset location, for transferring each said so received blank to said predetermined second location, and for discharging each said so transferred blank at said predetermined second location, (b) an arm for moving said capsule from said preset location to said predetermined second location, and thereafter for moving said capsule from said predetermined second location back to said preset location for receiving another said blank, and (c) power and regulating assembly for operating said transfer assembly.

20. Apparatus for adiabatically forming an elongated feedstock into parts, said apparatus comprising in combination:

(a) an adiabatic cut-off means for sequential predetermined incremental cut-off of said feedstock into blanks, said adiabatic cut-off means including:

a spatially fixed die block and an adjacent movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said movable die block being movable along said shear plane transversely relative to said feedstock, and a first ram movable along said shear plane in a direction corresponding to the direction of movement of said movable die block for engaging said movable die block, and associated first ram operating means for applying a force to said movable die block whereby said movable die block, while coacting with said fixed die block, responsive to said so applied force, functions to sever said feedstock at said shear plane in less than about one millisecond after said first ram is so impacted, thereby shearing said feedstock along said shear plane; and power and regulating means for operating said cut-off means;

(b) advancing means associated with said adiabatic cut-off means, said advancing means including:

means for feeding, positioning, and holding said feedstock at a predetermined first location in said adiabatic cut-off means for adiabatic cut-off of a said blank at said shear plane, means for moving said feedstock forwardly after each individual said blank is so cut-off, thereby to separate each said blank from said adiabatic cut-off means, and move each said blank after said blank cut-off to a preset location;

means for retracting and repositioning thereafter said feedstock at said predetermined first location relative to said adiabatic cut-off means for adiabatic cut-off of another said blank at said shear plane;

(c) an adiabatic forming means for sequential forming of individual parts of said blanks into a predetermined formed part, said forming means including:

first and second mutually engagable forming cartridges that, when mutually engaged, define a walled forming cavity having in one wall thereof a defined window located at a predetermined second location whereat a side portion of one said blank is positionable, and including means for engaging and disengaging said cartridges, a second ram movable against an opposite side portion of said associated blank in a direction towards said blank side portion for engaging an opposite side portion of said so positioned blank, and associated second ram operating means for applying in immediate succession to said second ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form a said part from said blank; ejection means for separating said part from said forming cartridges;

power and regulating means for operating said adiabatic forming means; and (d) transfer means for successive transfer of individual blanks from said preset location to said predetermined second location at said adiabatic forming means, said transfer means including:

capsule means for receiving successively each said so cut-off blank at said preset location, for transferring each said so received blank to said predetermined second location, and for discharging each said so transferred blank at said predetermined second location, arm means for moving said capsule means from said preset location to said predetermined second location, and thereafter for moving said capsule means from said predetermined second location back to said preset location for receiving another said blank, and power and regulating means for operating said transfer means; and (e) control means for operating and synchronizing operations of said adiabatic cut-off means, said advancing means, said adiabatic forming means, and said transfer means.

21. The apparatus of claim 20 wherein said capsule means include means for separating a blank therefrom into said adiabatic forming means.

22. The apparatus of claim 21 wherein said adiabatic forming means includes means for moving and positioning said first and second forming cartridges relative to each other and to each blank so that, when said forming cartridges are so engaged, each said succeeding blank is located at said predetermined second location.

23. The apparatus of claim 22 wherein said means for moving and positioning further includes means for separating said forming cartridges from one another after part formation.

24. An adiabatic cut-off means for sequential predetermined incremental cut-off of elongated feedstock into blanks, said adiabatic cut-off means including:

(a) a spatially fixed die block and an adjacent slidably movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said slidably movable die block being movable along said shear plane transversely relative to said feedstock, (b) a ram movable along said shear plane in a direction corresponding to the direction of movement of said movable die block for engaging said movable die block, and associated ram operating means for applying a force to said movable die block whereby said movable die block, while coacting with said fixed die block, responsive to said force, functions to sever said feedstock at said shear plane in less than about one millisecond after said ram is so impacted, thereby shearing said feedstock along said shear plane;

(c) power and regulating means for operating said cut-off means; and (d) advancing means associated with said adiabatic cut-off means including:

(1) means for feeding, positioning, and holding said feedstock at a predetermined first location in said adiabatic cut-off means for adiabatic cut-off of a said blank at said shear plane, (2) means for moving said feedstock forwardly after each individual said blank is so cut-off, thereby to separate each said blank from said adiabatic cut-off means, and move each said blank after said blank cut-off to a preset location;

(3) means for retracting and repositioning thereafter said feedstock at said predetermined first location relative to said adiabatic cut-off means for adiabatic cut-off of another said blank at said shear plane; and (4) power and regulating means for operating said advancing means.

25. An adiabatic forming means for forming a blank into a predetermined formed part, said forming means including:

(a) first and second mutually engagable forming cartridges that, when mutually engaged, define a walled forming cavity having in one wall thereof a defined window located at a predetermined location whereat a side portion of one said blank is positionable, and including means for engaging and disengaging said cartridges, (b) a ram movable against an opposite side portion of said associated blank in a direction towards said blank side portion for engaging an opposite side portion of said so positioned blank, and associated ram operating means for applying in immediate succession to said ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form said part from said blank;

(c) rejection means for separating said part from said forming cartridges; and (d) power and regulating means for operating said adiabatic forming means.

26. Transfer means for successive transfer of individual cut-off blanks, after said cut-off blanks have been cut from feedstock, from a preset location to a predetermined second location, said transfer means including:

(a) capsule means for receiving successively at said preset location each said cut-off blank after said cut-off blank has been cut from feedstock, and for transferring each said cut-off blank to said predetermined second location, said capsule means including therein fluidic-controlled piston means for discharging each said cut-off blank at said predetermined second location, (b) arm means for moving said capsule means from said preset location to said predetermined second location, and thereafter for moving said capsule means from said predetermined second location back to said preset location for receiving another said cut-off blank, and (c) power and regulating means for operating said transfer means.

27. An apparatus for adiabatic processing of an elongated feedstock into parts, said apparatus comprising in combination:
an adiabatic cut-off assembly for cut-off of blanks from elongated feedstock;
a feedstock advancing and positioning assembly for charging, positioning and holding said feedstock during said cut-off of blanks by said adiabatic cut-off assembly, and for moving blanks from said adiabatic cut-off assembly to a first predetermined location;
an adiabatic forming assembly for forming said parts from said blanks and for ejecting said parts;
transfer assembly for receiving blanks from said predetermined location and for moving said blanks to a second predetermined location in said adiabatic forming for utilization by said adiabatic forming assembly; and
a controller for sequencing operations of said adiabatic cut-off assembly, said feedstock advancing and positioning assembly, said adiabatic forming assembly, and said transfer assembly.

28. The apparatus of claim 27 wherein each of said adiabatic cut-off assembly and said adiabatic forming assembly includes an assembly for impacting and for applying force whereby the operation of each individual blank cut-off and each individual part forming is accomplished in less than about one millisecond.

29. Apparatus for adiabatically forming an elongated feedstock into parts, said apparatus comprising in combination:

(a) an adiabatic cut-off assembly for sequential predetermined incremental cut-off of said feedstock into blanks, said adiabatic cut-off assembly including:
a spatially fixed die block and an adjacent movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said movable die block being movable along said shear plane transversely relative to said feedstock, and
a first ram movable along said shear plane in a direction corresponding to the direction of movement of said movable die block for engaging said movable die block, and associated first ram operating assembly for applying a force to said movable die block whereby said movable die block, while coacting with said fixed die block, responsive to said so applied force, functions to sever said feedstock at said shear plane in less than about one millisecond after said first ram is so impacted, thereby shearing said feedstock along said shear plane; and
power and regulating assembly for operating said cut-off assembly;

(b) advancing assembly associated with said adiabatic cut-off assembly, said advancing assembly including:
assembly for feeding, positioning, and holding said feedstock at a predetermined first location in said adiabatic cut-off assembly for adiabatic cut-off of a said blank at said shear plane,
assembly for moving said feedstock forwardly after each individual said blank is so cut-off, thereby to separate each said blank from said adiabatic cut-off assembly, and move each said blank after said blank cut-off to a preset location;
assembly for retracting and repositioning thereafter said feedstock at said predetermined first location relative to said adiabatic cut-off assembly for adiabatic cut-off of another said blank at said shear plane;

(c) an adiabatic forming assembly for sequential forming of individual parts of said blanks into a predetermined formed part, said forming assembly including:
first and second mutually engagable forming cartridges that, when mutually engaged, define a walled forming cavity having in one wall thereof a defined window located at a predetermined second location whereat a side portion of one said blank is positionable, and including an assembly for engaging and disengaging said cartridges,
a second ram movable against an opposite side portion of said associated blank in a direction towards said blank side portion for engaging an opposite side portion of said so positioned blank, and associated second ram operating assembly for applying in immediate succession to said second ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form a said part from said blank;
ejection assembly for separating said part from said forming cartridges;
power and regulating assembly for operating said adiabatic forming assembly; and (d) transfer assembly for successive transfer of individual blanks from said preset location to said predetermined second location at said adiabatic forming assembly, said transfer assembly including:
a capsule for receiving successively each said so cut-off blank at said preset location, for transferring each said so received blank to said predetermined second location, and for discharging each said so transferred blank at said predetermined second location,
an arm for moving said capsule from said preset location to said predetermined second location, and thereafter for moving said capsule from said predetermined second location back to said preset location for receiving another said blank, and
power and regulating assembly for operating said transfer assembly; and (e) a controller for operating and synchronizing operations of said adiabatic cut-off assembly, said advancing assembly, said adiabatic forming assembly, and said transfer assembly.

30. The apparatus of claim 29 wherein said capsule includes an assembly for separating a blank therefrom into said adiabatic forming assembly.

31. The apparatus of claim 30 wherein said diabatic forming assembly includes an assembly for moving and positioning said first and second forming cartridges relative to each other and to each blank so that, when said forming cartridges are so engaged, each said succeeding blank is located at said predetermined second location.

32. The apparatus of claim 31 wherein said assembly for moving and positioning further includes an assembly for separating said forming cartridges from one another after part formation.

33. An adiabatic cut-off assembly for sequential predetermined incremental cut-off of elongated feedstock into blanks, said adiabatic cut-off assembly including:
  (a) a spatially fixed die block and an adjacent slidably movable die block, each said die block defining a channel therethrough, said channels being normally longitudinally aligned with one another and configured when so aligned for slidable longitudinal passage therethrough of said feedstock, said die blocks defining therebetween a shear plane that extends in a direction transverse to said feedstock, said slidably movable die block being movable along said shear plane transversely relative to said feedstock,
  (b) a ram movable along said shear plane in a direction corresponding to the direction of movement of said movable die block for engaging said movable die block, and associated ram operating assembly for applying a force to said movable die block whereby said movable die block, while coacting with said fixed die block, responsive to said force, functions to sever said feedstock at said shear plane in less than about one millisecond after said ram is so impacted, thereby shearing said feedstock along said shear plane;
  (c) power and regulating assembly for operating said cut-off assembly; and
  (d) advancing assembly associated with said adiabatic cut-off assembly including:
    (1) assembly for feeding, positioning, and holding said feedstock at a predetermined first location in said adiabatic cut-off assembly for adiabatic cut-off of a said blank at said shear plane,
    (2) assembly for moving said feedstock forwardly after each individual said blank is so cut-off, thereby to separate each said blank from said adiabatic cut-off assembly, and move each said blank after said blank cut-off to a preset location;
    (3) assembly for retracting and repositioning thereafter said feedstock at said predetermined first location relative to said adiabatic cut-off assembly for adiabatic cut-off of another said blank at said shear plane; and
    (4) power and regulating assembly for operating said advancing assembly.

34. An adiabatic forming assembly for forming a blank into a predetermined formed part, said forming assembly including:
  (a) first and second mutually engagable forming cartridges that, when mutually engaged, define a walled forming cavity having in one wall thereof a defined window located at a predetermined location whereat a side portion of one said blank is positionable, and including assembly for engaging and disengaging said cartridges,
  (b) a ram movable against an opposite side portion of said associated blank in a direction towards said blank side portion for engaging an opposite side portion of said so positioned blank, and associated ram operating assembly for applying in immediate succession to said ram a first impact force and a second power stroke force whereby said blank as so positioned at said window is responsive to said so applied forces and is responsively moved into said forming cavity and is conformed to the interior configuration of said forming cavity in milliseconds after application of said first impact force, followed by application of said second power stroke force, thereby to form said part from said blank;
  (c) rejection assembly for separating said part from said forming cartridges; and
  (d) power and regulating assembly for operating said adiabatic forming assembly.

35. Transfer assembly for successive transfer of individual cut-off blanks, after said cut-off blanks have been cut from feedstock, from a preset location to a predetermined second location, said transfer assembly including:
  (a) a capsule for receiving successively at said preset location each said cut-off blank after said cut-off blank has been cut from feedstock, and for transferring each said cut-off blank to said predetermined second location, said capsule including therein a fluidic-controlled piston for discharging each said cut-off blank at said predetermined second location,
  (b) an arm for moving said capsule from said preset location to said predetermined second location, and thereafter for moving said capsule from said predetermined second location back to said preset location for receiving another said cut-off blank, and
  (c) power and regulating assembly for operating said transfer assembly.

* * * * *